US006685313B2

(12) United States Patent
Scofield et al.

(10) Patent No.: US 6,685,313 B2
(45) Date of Patent: Feb. 3, 2004

(54) EARLY TRANSPARENCY DETECTION ROUTINE FOR INKJET PRINTING

(75) Inventors: Stuart A. Scofield, Battle Ground, WA (US); Steven H. Walker, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/000,735

(22) Filed: Oct. 31, 2001

(65) Prior Publication Data

US 2003/0001939 A1 Jan. 2, 2003

Related U.S. Application Data

(63) Continuation-in-part of application No. 09/607,206, filed on Jun. 28, 2000, now Pat. No. 6,561,643, which is a continuation-in-part of application No. 09/430,487, filed on Oct. 29, 1999, now Pat. No. 6,325,505, which is a continuation-in-part of application No. 09/183,086, filed on Oct. 29, 1998, now Pat. No. 6,322,192, which is a continuation-in-part of application No. 08/885,486, filed on Jun. 30, 1997, now Pat. No. 6,036,298.

(51) Int. Cl.[7] .............................................. G01N 21/958

(52) U.S. Cl. .................... 347/105; 347/19; 250/559.01; 250/559.11

(58) Field of Search ............................ 347/14, 16, 105, 347/101, 106; 356/446; 250/559.01, 559.2, 559.4, 559.07, 559.11, 559.16, 559.19, 559.31; 399/45, 389; 358/488

(56) References Cited

U.S. PATENT DOCUMENTS

| | | | | | |
|---|---|---|---|---|---|
| 4,540,887 | A | | 9/1985 | Minerd et al. | 250/559.4 |
| 4,617,580 | A | | 10/1986 | Miyakawa | 347/105 |
| 4,752,689 | A | * | 6/1988 | Satake | 250/339.07 |
| 5,119,132 | A | | 6/1992 | Butler | 399/49 |
| 5,139,339 | A | | 8/1992 | Courtney et al. | 356/446 |
| 5,336,714 | A | | 8/1994 | Krutak et al. | 524/608 |
| 5,386,284 | A | * | 1/1995 | Kasahara et al. | 399/45 |
| 5,488,223 | A | | 1/1996 | Austin et al. | 347/105 |
| 5,724,259 | A | | 3/1998 | Seymour et al. | 382/199 |
| 5,764,251 | A | | 6/1998 | Hashimoto | 347/105 |
| 5,774,146 | A | | 6/1998 | Mizutani | 347/43 |
| 5,929,432 | A | | 7/1999 | Yamakawa | 250/208.1 |
| 6,130,437 | A | * | 10/2000 | Cerny et al. | 250/559.4 |
| 6,310,348 | B1 | * | 10/2001 | Melling et al. | 250/341 |

* cited by examiner

*Primary Examiner*—Stephen D. Meier
*Assistant Examiner*—Julian D. Huffman

(57) ABSTRACT

A system of classifying incoming media entering an inkjet printing mechanism identifies transparency media without requiring any special manufacturer markings. The media is first optically scanned using a blue-violet light at an initial intensity to obtain both diffuse and specular reflectance data. If useable, the data is compared with known values to classify the media so an optimum print mode tailored for the particular media is used. The early transparency detection system avoids time-consuming further steps trying to classify the media as photo media, plain paper, and the like, and facilitates fast printing of transparencies, which can be critical in the business environment when making last minute changes for a presentation. A printing mechanism constructed to implement this method is also provided.

18 Claims, 41 Drawing Sheets

GENERIC DIFFUSE SPATIAL FREQUENCY

GENERIC SPECULAR SPATIAL FREQUENCY

GENERIC DIFFUSE
SPATIAL FREQUENCY

GENERIC SPECULAR
SPATIAL FREQUENCY

EARLY TRANSPARENCY DETECTION ROUTINE FOR INKJET PRINTING

RELATED APPLICATIONS

This is a continuation-in-part application of U.S. patent application Ser. No. 09/607,206, filed on Jun. 28, 2000, now U.S. Pat. No. 6,561,643 which is a continuation-in-part application of U.S. application Ser. No. 09/430,487, filed on Oct. 29, 1999, now U.S. Pat. No. 6,325,505, which is a continuation-in-part application of U.S. application Ser. No. 09/183,086 now U.S. Pat. No. 6,322,192 filed on Oct. 29, 1998, which is a continuation-in-part application of application Ser. No. 08/885,486 filed Jun. 30,1997, now U.S. Pat. No. 6,036,298, issued on Mar. 14, 2000, all having one inventor in common.

INTRODUCTION

The present invention relates generally to inkjet printing mechanisms, and more particularly to an optical sensing system for determining information about the type of print media entering the printzone (e.g. transparencies, plain paper, premium paper, photographic paper, etc.), so the printing mechanism can automatically tailor the print mode to generate optimal images on the specific type of incoming media without requiring bothersome user intervention.

Inkjet printing mechanisms use cartridges, often called "pens," which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

In closed loop inkjet printing, sensors are used to determine a particular attribute of interest, with the printer then using the sensor signal as an input to adjust the particular attribute. For pen alignment, a sensor may be used to measure the position of ink drops produced from each printhead. The printer then uses this information to adjust the timing of energizing the firing resistors to bring the resulting droplets into alignment. In such a closed loop system, user intervention is no longer required, so ease of use is maximized.

In the past, closed loop inkjet printing systems have been too costly for the home printer market, although they have proved feasible on higher end products. For example, in the DesignJet® 755 inkjet plotter, and the HP Color Copier 210 machine, both produced by the Hewlett-Packard Company of Palo Alto, Calif., the pens have been aligned using an optical sensor. The DesignJet® 755 plotter used an optical sensor which may be purchased from the Hewlett-Packard Company of Palo Alto, Calif., as part no. C3195-60002, referred to herein as the "HP '002" sensor. The HP Color Copier 210 machine uses an optical sensor which may be purchased from the Hewlett-Packard Company as part no. C5302-60014, referred to herein as the "HP '014" sensor. The HP '014 sensor is similar in function to the HP '002 sensor, but the HP '014 sensor uses an additional green light emitting diode (LED) and a more product-specific packaging to better fit the design of the HP Color Copier 210 machine. Both of these higher end machines have relatively low production volumes, but their higher market costs justify the addition of these relatively expensive sensors.

In the home printer market, the media may range from a special photo quality glossy paper, down to a brown lunch sack, fabric, or anything in between. To address this media identification problem, a media detect sensor was placed adjacent to the media path through the printer, such as on the media pick pivoting mechanism or on the media input tray. The media detect sensor read an invisible-ink code preprinted on the printing side of the media. This code enables the printer to compensate for the orientation, size and type of media by adjusting print modes for optimum print quality to compensate for these variances in the media supply, without requiring any customer intervention.

However, media type detection is not present in the majority of inkjet printers on the commercial market today. Most printers use an open-loop process, relying on an operator to select the type of media through the software driver of their computer. Thus there is no assurance that the media actually in the input tray corresponds to the type selected for a particular print request, and unfortunately, printing with an incorrectly selected media often produces poor quality images. Compounding this problem is the fact that most users never change the media type settings at all, and most are not even aware that these settings even exist. Therefore, the typical user always prints with a default setting of the plain paper-normal mode. This is unfortunate because if a user inserts expensive photo media into the printer, the resulting images are substandard when the normal mode rather than a photo mode is selected, leaving the user effectively wasting the expensive photo media. Besides photo media, transparencies also yield particularly poor image quality when they are printed on in the plain paper-normal mode.

The problem of distinguishing transparencies from paper was addressed in the Hewlett-Packard Company's DeskJet® 2000C Professional Series Color Inkjet Printer, which uses an infrared reflective sensor to determine the presence of transparencies. This system uses the fact the light passes through the transparencies to distinguish them from photo media and plain paper. While this identification system is simple and relatively low cost, it offers limited identification of the varying types of media available to users.

Another sensor system for media type determination used a combination transmissive/reflective sensor. The reflective portion of the sensor had two receptors at differing angles with respect to the surface of the media. By looking at the transmissive detector, a transparency could be detected due to the passage of light through the transparency. The two reflective sensors were used to measure the specular reflectance of the media and the diffuse reflectance of the media, respectively. By analyzing the ratio of these two reflectance values, specific media types were identified. To implement this system, a database was required comprising a look-up table of the reflective ratios which were correlated with the various types of media. Unfortunately, new, noncharacterized media was often misidentified, leading to print quality degradation. Finally, one of the worst shortcomings of this system was that several different types of media could generate the same reflectance ratio, yet have totally different print mode classifications.

One proposed system offered what was thought to be an ultimate solution to media type identification. In this system an invisible ink code was printed on the front side of each sheet of the media in a location where it was read by a sensor onboard the printer. This code supplied the printer driver with a wealth of information concerning the media type, manufacturer, orientation and properties. The sensor was low in cost, and the system was very reliable in that it totally unburdened the user from media selection through the driver, and insured that the loaded media was correctly identified. Unfortunately, these pre-printed invisible ink codes became visible when they were printed over. The code was then placed in the media margins to avoid this problem, for instance as discussed in U.S. Pat. No. 5,984,193, assigned to the present assignee, the Hewlett-Packard Company; however market demand is pushing inkjet printers into becoming photo generators. Thus, the margins became undesirable artifacts for photographs with a "full-bleed" printing scheme where the printed image extends all the way to the edge of the paper. Thus, even placing the code in what used to have been a margin when printed over in full-bleed printing mode created severe print defects.

Still another media identification system marked the edge of the media by deforming the leading edge of the media. These edge deformations took the form of edge cuts, punched holes, scallops, etc. to make the leading edge no longer straight, with a straight edge being the plain paper default indicator. Unfortunately these edge deformation schemes required additional media processing steps to make the media. Moreover, a deformed edge lacks consumer appeal, appearing to most consumers as media which was damaged in shipping or handling.

BRIEF DESCRIPTION OF THE DRAWINGS

FIGS. 20–23 together form a flowchart which illustrates the "major category determination" and "specific type determination" portions of the method of FIG. 15, specifically with:

FIG. 20 showing transparency determination;

FIG. 21 showing glossy photo determination;

FIG. 22 showing matte photo determination; and

FIG. 23 showing plain paper and premium paper determination.

FIGS. 27–33 are graphs of the raw data accumulated during the "collect raw data" portion of the method of FIG. 15, specifically with:

FIG. 27 showing data for a very glossy photo media;

FIG. 28 showing data for a glossy photo media;

FIG. 29 showing data for a matte photo media;

FIG. 30 showing data for a plain paper media, specifically, a Gilbert® Bond;

FIG. 31 showing data for a premium media;

FIG. 32 showing data for HP transparency media with a tape header; and

FIG. 33 showing data for transparency media without a tape header.

FIGS. 34–39 are graphs of the Fourier spectrum components, up to component 100, specifically with:

FIG. 34 showing the matte photo media diffuse reflection;

FIG. 35 showing the matte photo media specular reflection;

FIG. 36 showing the very glossy photo media diffuse reflection;

FIG. 37 showing the very glossy photo media specular reflection;

FIG. 38 showing the plain paper media diffuse reflection; and

FIG. 39 showing the plain paper media specular reflection.

DETAILED DESCRIPTION OF A PREFERRED EMBODIMENT

Figure 1:
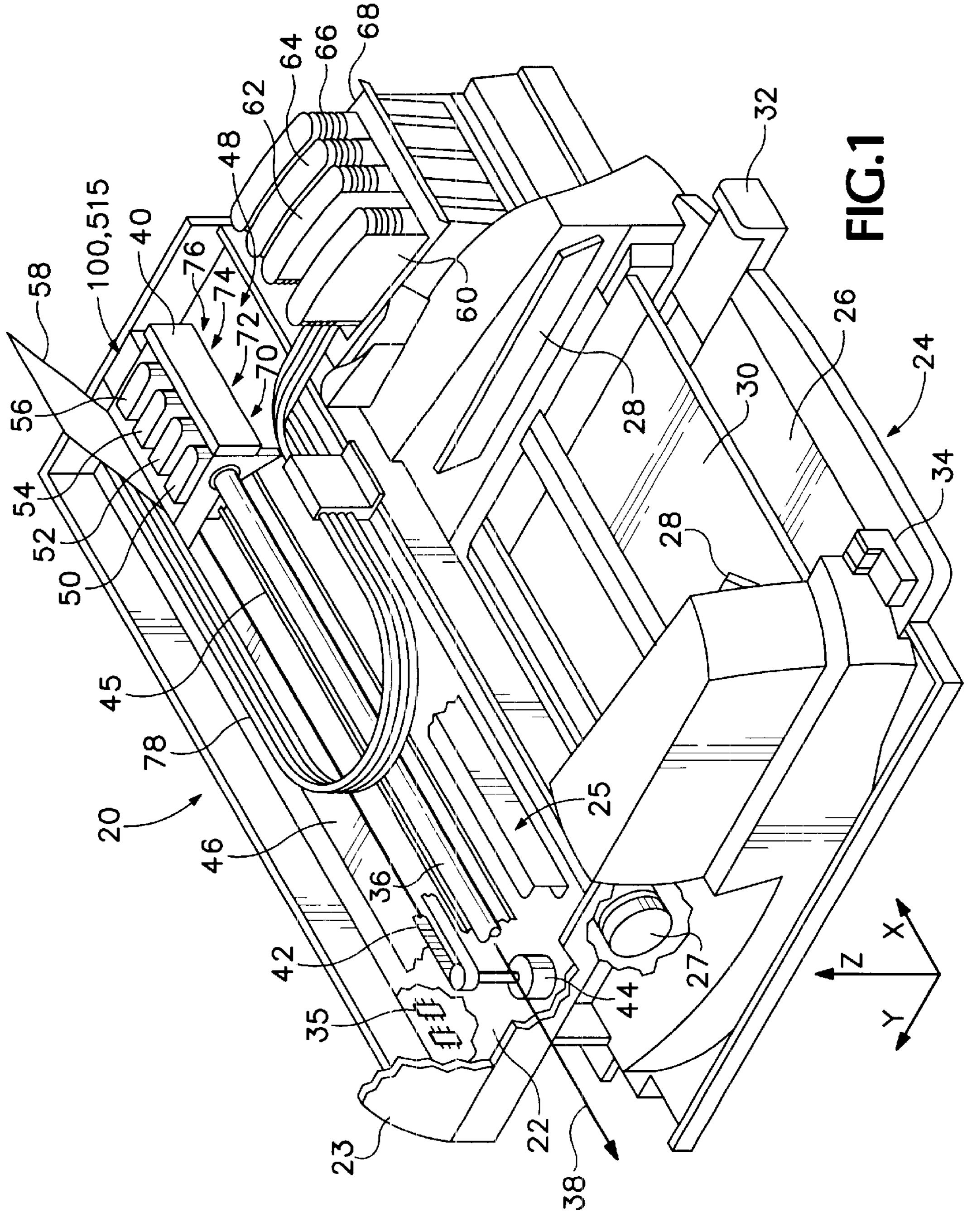
FIG. 1 is a fragmented perspective view of one form of an inkjet printing mechanism, here an inkjet printer, including one form of an optical sensing system of the present invention for gathering information about an incoming sheet of media entering a printzone portion of the printing mechanism.

FIG. 1 illustrates an embodiment of an inkjet printing mechanism, here shown as an inkjet printer 20, constructed in accordance with the present invention, which may be used for printing for business reports, correspondence, desktop publishing, artwork, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20 which may find particular usefulness in the home environment.

While it is apparent that the printer components may vary from model to model, the typical inkjet printer 20 includes a chassis 22 surrounded by a housing or casing enclosure 23, the majority of which has been omitted for clarity in viewing the internal components. A print media handling system 24 feeds sheets of print media through a printzone 25. The print media may be any type of suitable sheet material, such as paper, card-stock, envelopes, fabric, transparencies, mylar, and the like, with plain paper typically being the most commonly used print medium. The print media handling system 24 has a media input, such as a supply or feed tray 26 into which a supply of media is loaded and stored before printing. A series of conventional media advance or drive rollers (not shown) powered by a motor and gear assembly 27 may be used to move the print media from the supply tray 26 into the printzone 25 for printing. After printing, the media sheet then lands on a pair of retractable output drying wing members 28, shown extended to receive the printed sheet. The wings 28 momentarily hold the newly printed sheet above any previously printed sheets still drying in an output tray portion 30 before retracting to the sides to drop the newly printed sheet into the output tray 30. The media handling system 24 may include a series of adjustment mechanisms for accommodating different sizes of print media, including letter, legal, A-4, envelopes, etc. To secure the generally rectangular media sheet in a lengthwise direction along the media length, the handling system 24 may include a sliding length adjustment lever 32, and a sliding width adjustment lever 34 to secure the media sheet in a width direction across the media width.

The printer 20 also has a printer controller, illustrated schematically as a microprocessor 35, that receives instructions from a host device, typically a computer, such as a personal computer (not shown). Indeed, many of the printer controller functions may be performed by the host computer, by the electronics on board the printer, or by interactions therebetween. As used herein, the term "printer controller 35" encompasses these functions, whether performed by the host computer, the printer, an intermediary device therebetween, or by a combined interaction of such elements. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

The chassis 22 supports a guide rod 36 that defines a scan axis 38 and slideably supports an inkjet printhead carriage 40 for reciprocal movement along the scan axis 38, back and forth across the printzone 25. The carriage 40 is driven by a carriage propulsion system, here shown as including an endless belt 42 coupled to a carriage drive DC motor 44. The carriage propulsion system also has a position feedback system, such as a conventional optical encoder system, which communicates carriage position signals to the controller 35. An optical encoder reader may be mounted to carriage 40 to read an encoder strip 45 extending along the path of carriage travel. The carriage drive motor 44 then operates in response to control signals received from the printer controller 35. A conventional flexible, multi-conductor strip 46 may be used to deliver enabling or firing command control signals from the controller 35 to the printhead carriage 40 for printing, as described further below.

The carriage 40 is propelled along guide rod 36 into a servicing region 48, which may house a service station unit (not shown) that provides various conventional printhead servicing functions. To clean and protect the printhead, typically a "service station" mechanism is mounted within the printer chassis so the printhead can be moved over the station for maintenance. For storage, or during non-printing periods, the service stations usually include a capping system which hermetically seals the printhead nozzles from contaminants and drying. Some caps are also designed to facilitate priming by being connected to a pumping unit that draws a vacuum on the printhead. During operation, clogs in the printhead are periodically cleared by firing a number of drops of ink through each of the nozzles in a process known as "spitting," with the waste ink being collected in a "spittoon" reservoir portion of the service station. After spitting, uncapping, or occasionally during printing, most service stations have an elastomeric wiper that wipes the printhead surface to remove ink residue, as well as any paper dust or other debris that has collected on the printhead.

In the printzone 25, the media receives ink from an inkjet cartridge, such as a black ink cartridge 50 and three monochrome color ink cartridges 52, 54 and 56, secured in the carriage 40 by a latching mechanism 58, shown open in FIG. 1. The cartridges 50–56 are also commonly called "pens" by those in the industry. The inks dispensed by the pens 50–56 may be pigment-based inks, dye-based inks, or combinations thereof, as well as paraffin-based inks, hybrid or composite inks having both dye and pigment characteristics.

The illustrated pens 50–56 each include reservoirs for storing a supply of ink therein. The reservoirs for each pen 50–56 may contain the entire ink supply on board the printer for each color, which is typical of a replaceable cartridge, or they may store only a small supply of ink in what is known as an "off-axis" ink delivery system. The replaceable cartridge systems carry the entire ink supply as the pen reciprocates over the printzone 25 along the scanning axis 38. Hence, the replaceable cartridge system may be considered as an "on-axis" system, whereas systems which store the main ink supply at a stationary location remote from the printzone scanning axis are called "off-axis" systems. In an off-axis system, the main ink supply for each color is stored at a stationary location in the printer, such as four refillable or replaceable main reservoirs 60, 62, 64 and 66, which are received in a stationary ink supply receptacle 68 supported by the chassis 22. The pens 50, 52, 54 and 56 have printheads 70, 72, 74 and 76, respectively, which eject ink delivered via a conduit or tubing system 78 from the stationary reservoirs 60–66 to the on-board reservoirs adjacent the printheads 70–76.

The printheads 70–76 each have an orifice plate with a plurality of nozzles formed therethrough in a manner well known to those skilled in the art. The nozzles of each printhead 70–76 are typically formed in at least one, but typically two linear arrays along the orifice plate, aligned in a longitudinal direction perpendicular to the scanning axis 38. The illustrated printheads 70–76 are thermal inkjet printheads, although other types of printheads may be used, such as piezoelectric printheads. The thermal printheads 70–76 typically include a plurality of resistors which are associated with the nozzles. Upon energizing a selected resistor, a bubble of gas is formed which ejects a droplet of ink from the nozzle and onto a sheet of paper in the printzone 25 under the nozzle. The printhead resistors are selectively energized in response to firing command control signals received via the multi-conductor strip 46 from the controller 35.

Optical Media Type
Determination Sensor

Figure 2:
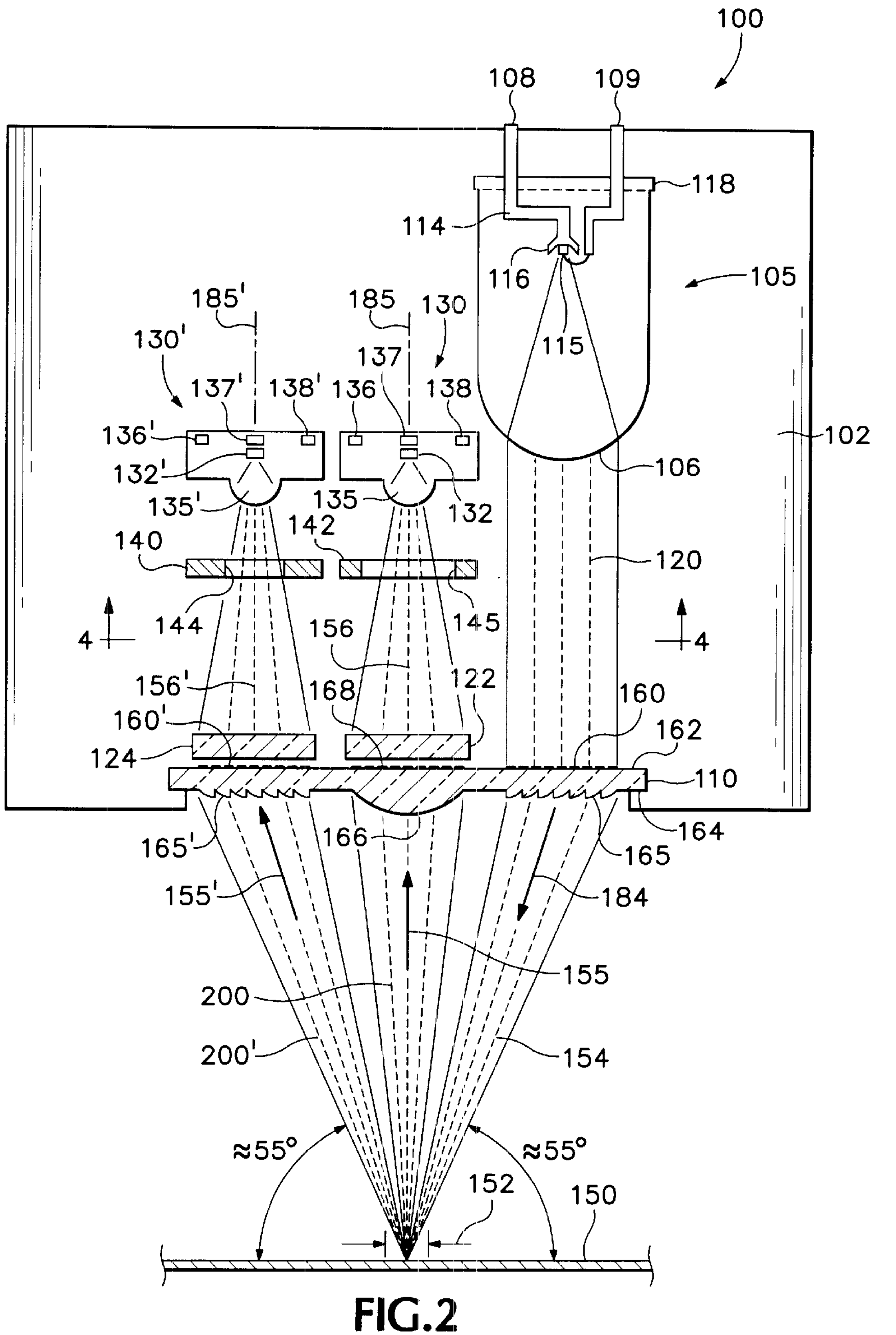
FIG. 2 is a schematic side elevational view of one form of an advanced media type determination optical sensor of the printer of FIG. 1.

FIG. 2 illustrates one form of an optical media type determination sensor or "media sensor" 100 constructed in accordance with the present invention. The sensor 100 includes a casing or base unit 102 may be supported by the printhead carriage 40 in a variety different ways known to those skilled in the art. The sensor 100 has an illuminating element, here, a blue-violet light emitting diode (LED) 105 which has an output lens 106. Extending from the LED 105 are two input leads 108 and 109 which may be electrically coupled to conductors in a printed circuit board (not shown) secured to an exterior portion of the body 102 to deliver sensor signals back to the printer controller 35. The printed circuit board and flexible conductors may be used to couple the sensor 100 to an electronics portion (not shown) of the carriage 40. The sensor signals then pass from the carriage 40 through the multi-conductor strip 46, which carries power and communication signals between the controller 35 and the carriage 40. A lens assembly 110 is supported by the casing 102, with the lens assembly 110 being described in greater detail below with respect to FIGS. 5–7.

Figure 3:
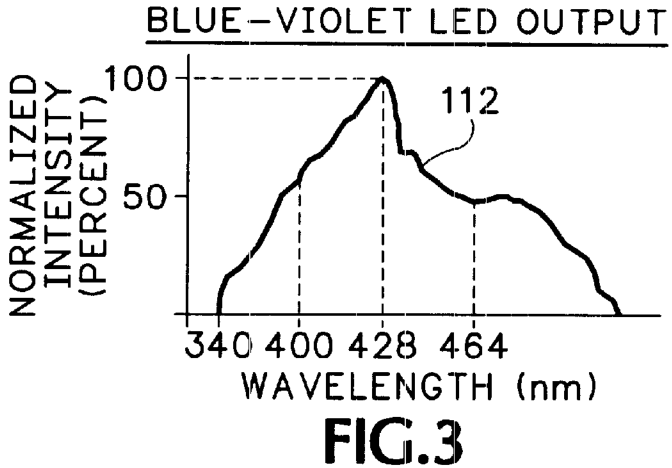
FIG. 3 is a graph of the specular light output of the media type determination of sensor FIG. 2, which uses a blue-violet colored LED.

The media sensor 100 preferably uses a blue-violet LED 105 which emits an output spectrum shown in FIG. 3 as graph 112. The blue-violet LED 105 has a peak wavelength of around 428 nanometers, and a dominant wavelength of 464 nanometers, yielding a more violet output than the blue LED described in U.S. Pat. No. 6,036,298, recited in the Related Applications section above, which had a peak wavelength of around 470 nanometers. Several reasons for this change in the illumination component of the media sensor 100 will be described near the end of the Detailed Description section. The LED 105 includes a negative lead frame 114 which is electrically coupled to the conductor 108. The LED 105 also has a die 115 mounted within a reflector cup 116, which is supported by the negative lead frame 114. The die 115 is used to produce the blue-violet wavelength light of graph 112 emitted by the LED 105 when energized. A positive lead frame 118 is electrically coupled to conductor 109, and serves to carry current therethrough when the LED 105 is turned on. Preferably, the negative lead frame 114, the die 115, the cup 116, and the positive lead frame 118 are all encapsulated in a transparent epoxy resin body which is conformed to define the output lens 106 as an integral dome lens that directs light from the die 115 into rays which form an illuminating beam 120. One preferred manner of operating the LED 105, including illumination routines, is described in detail in U.S. Pat. No. 6,036,298, recited in the Related Applications section above The media sensor 100 also has two filter elements 122 and 124, which lay over portions of the lens assembly 110. These filters 122 and 124 may be constructed as a singular piece, although in the illustrated embodiment two separate filters are shown. The filters 122 and 124 have a blue pass region where the low wavelength blue-violet LED light, with a wavelength of 360–510 nm, passes freely through the filters 122 and 124, but light of other wavelengths from other sources are blocked out. Preferably, the filter elements 122 and 124 are constructed of a 1 mm (one millimeter) thick sheet of silicon dioxide (glass) using conventional thin film deposition techniques, as known to those skilled in the art.

The optical sensor 100 also includes a diffuse photodiode 130 that includes a light sensitive photocell 132 which is electrically coupled to an amplifier portion (not shown) of the photodiode 130. The photodiode 130 has input lens 135, which emits light to the light sensitive photocell 132. The photocell 132 is preferably encapsulated as a package fabricated to include the curved lens 135 which concentrates incoming light onto the photocell 132. The photodiode 130 also has three output leads 136, 137 and 138 which couple the output from amplifier 134 to electrical conductors on the printed circuit board (not shown) to supply photodiode sensor signals to the controller 35, via electronics on the carriage 40 and the multi-conductor flex strip 46. While a variety of different photodiodes may be used, one preferred photodiode is a light-to-voltage converter, which may be obtained as part no. TSL257 from Texas Analog Optical Systems (TAOS) of Dallas, Tex.

The optical sensor 100 also includes a second specular photodiode 130' that may be constructed as described for the diffuse photodiode 130, with like components on the specular photodiode having the same item numbers as the diffuse photodiode, by carrying a "prime" designator (') similar to an apostrophe. Preferably, the casing 102 is constructed so that the LED 120 is optically isolated from the photodiodes 130, 130' to prevent light emitted directly from the LED 120 from being perceived by the photocells 132, 132'. Thus, the outbound light path of the LED 120 is optically isolated from the inbound light path of the photodiode 130.

The media sensor 100 also has two field of view controlling elements, such as field stops 140 and 142. The field stops 140 and 142, as well as the filters 122 and 124, are held in place by various portions of the casing 102, and preferably, the field stops 140 and 142 are molded integrally with a portion of the casing 102. The field stops 140 and 142 are preferably located approximately tangent to the apex of the input lenses 135, 135' of the photodiodes 130, 130', respectively. In the illustrated embodiment, the field stops 140, 142 define field of view openings or windows 144 and 145, respectively.

Figure 4:
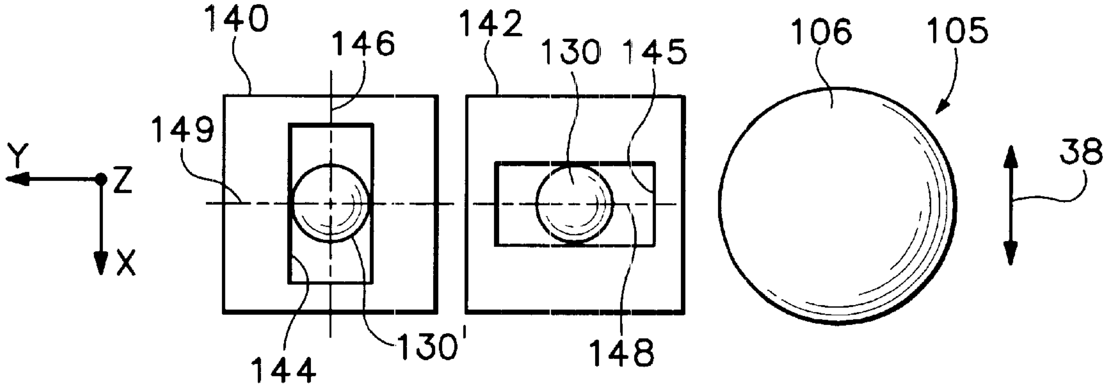
FIG. 4 is a bottom plan view of the media type optical sensor of FIG. 2, taken along lines 4—4 thereof.

FIG. 4 shows the orientation of the field stop windows 144 and 145 with respect to the scanning axis 38. In the illustrated embodiment, the field stop windows 144 and 145 are rectangular in shape, with the specular window 144 having a major axis 146 which is approximately parallel to the scanning axis 38, and the diffuse field stop window 145 having a major axis 148 which is substantially perpendicular to the scanning axis 38. The specular field stop 144 has window 144 oriented with a minor axis 149 which in the illustrated embodiment is colinear with the major axis 148 of the diffuse field stop window 145. This orientation of the field stop windows 144, 145 allows the diffuse photodiode 130 to collect data which may be distinguished from that collected by the specular photodiode 130'.

FIG. 2 illustrates the light paths through the lens assembly 110 as a sheet of media 150, here illustrated as paper, is scanned by sensor 100. The LED 105 generates the output beam 120, which is aimed toward an illuminated area 152 of the media 150 by first passing through the lens assembly 110 as an illuminating beam 154. The media 150 produces two reflected beams, one, a diffuse reflected beam 155 and a specular reflected beam 155'. The diffuse and specular reflected beams 155, 155' pass through the filter elements 122, 124, respectively to form the respective diffuse and specular filtered beams 156 and 156'. The diffuse reflected light beam 155 has a flame-like scattering of rays arranged in a Lambertian distribution. The specular beam 155' is reflected off the media 150 at the same angle that the incoming light beam 154 impacts the media, according to the well known principle of optics: "angle of incidence equals angle of reflection." In the illustrated embodiment, the angle of incidence and the angle reflection are selected to be around 55°.

Figure 5:
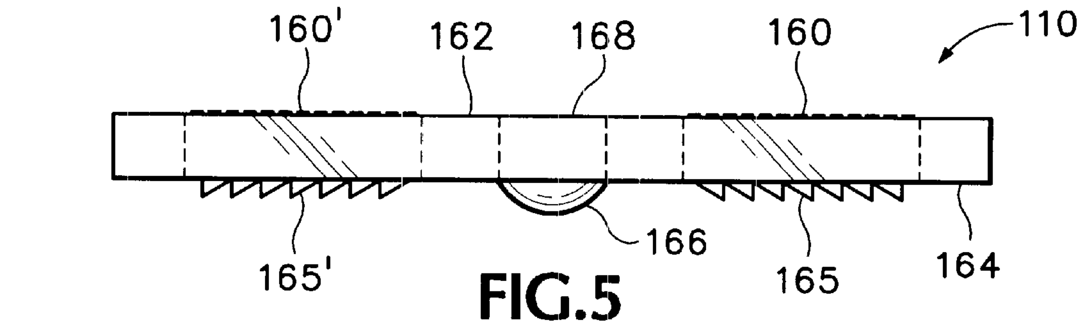
FIG. 5 is a side elevational view of the lens assembly of FIG. 2.
Figure 6:
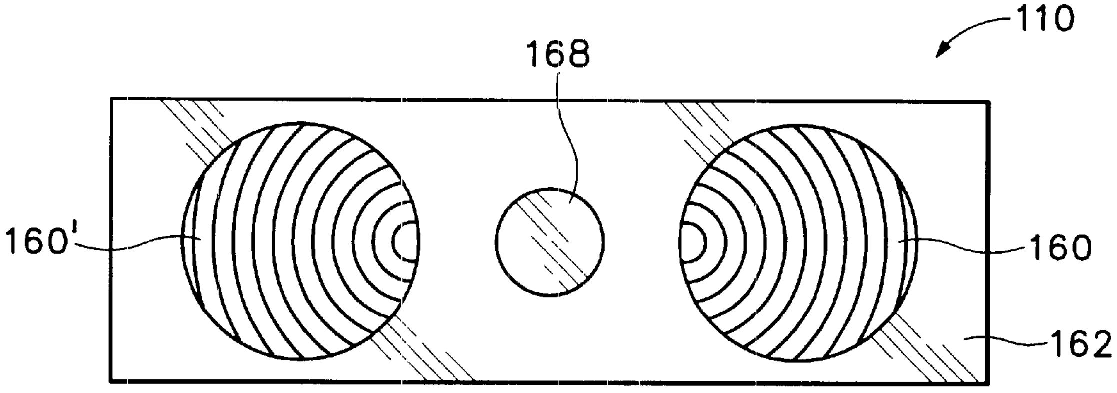
FIG. 6 is a top plan view of one form of a lens assembly of the media optical sensor of FIG. 2.
Figure 7:
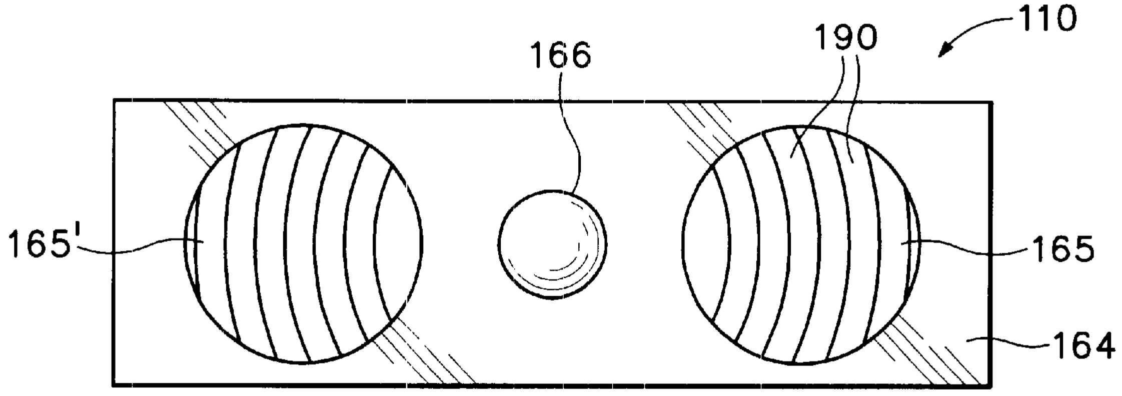
FIG. 7 is a bottom plan view of the lens assembly of FIG. 2.

FIGS. 5–7 illustrate the construction of the lens assembly 110, which may be made of an optical plastic material molded with lens elements formed therein. FIG. 5 shows an LED output lens as having a diffractive lens element 160 formed along a top surface 162 of the lens 110. The diffractive lens 160 is located directly beneath the LED output beam 120. FIG. 6 illustrates a bottom view of the lens assembly 110 which has a bottom surface 164 facing down toward the media 150. Opposite the diffractive lens element 160, the LED output lens has a Fresnel lens element 165 formed along the lower surface 164. FIG. 5 best shows a diffuse lens as having a photodiode input lens element 166 projecting outwardly from the lower surface 164. Preferably, the lens 166 is a convex aspheric condenser lens. FIG. 6 illustrates another portion of the diffuse lens as having an upper or output lens element 168 which is directly opposite the input element 166. While the output element 168 may be a flat extension of the upper surface 162 of the lens 110, in some embodiments, contouring of the upper surface 168 may be desired to improve the optical input to the photodiode lens 135. Preferably, the photodiode output element 168 is also a diffractive lens, which may be constructed as described above for the upper diode lens element 160 to provide correction of chromatic aberrations of the primary input lens element 166.

The specular photodiode 130' receives the filtered specular beam 156'. To accommodate this incoming specular reflectance beam 155' the lens assembly has a specular lens with an incoming Fresnel lens element 165', and an outgoing diffractive lens element 160', which may be constructed as described above for lens elements 165 and 160, respectively. It is apparent to those skilled in the art that other types of lens assemblies may be used to provide the same operation as lens assembly 110. For instance, the specular lens element 165' may be constructed with an aspheric refractive incoming lens element, and an outgoing aspheric refractive lens element or an outgoing micro-Fresnel lens. A detailed discussion of the operation of these lens elements is described in U.S. Pat. No. 6,036,298, recited in the Related Applications section above, or may be found in most basic optics textbooks.

A few definitions may be helpful at this point:

"Radiance" is the measure of the power emitted by a light source of finite size expressed in W/sr-cm2 (watts per steradian—centimeters squared).

"Transmission" is measure of the power that passes through a lens in terms of the ratio of the radiance of the lens image to the radiance of the original object, expressed in percent.

"Transmittance" is a spectrally weighted transmission, here, the ratio of the transmitted spectral reflectance going through the lens, e.g. beam 154, to the incident spectral reflectance, e.g. beam 155'.

"Specular reflection" is that portion of the incident light that reflects off the media at an angle equal to the angle at which the light struck the media, the angle of incidence.

"Reflectance" is the ratio of the specular reflection to the incident light, expressed in percent.

"Absorbance" is the converse of reflectance, that is, the amount of light which is not reflected but instead absorbed by the object, expressed in percent as a ratio of the difference of the incident light minus the specular reflection, with respect to the incident light.

"Diffuse reflection" is that portion of the incident light that is scattered off the surface of the media 150 at a more or less equal intensity with respect to the viewing angle, as opposed to the specular reflectance which has the greatest intensity only at the angle of reflectance.

"Refraction" is the deflection of a propagating wave accomplished by modulating the speed of portions of the wave by passing them through different materials.

"Index of refraction" is the ratio of the speed of light in air versus the speed of light in a particular media, such as glass, quartz, water, etc.

"Dispersion" is the change in the index of refraction with changes in the wavelength of light.

Basic Media Type Determination System

Figure 8:
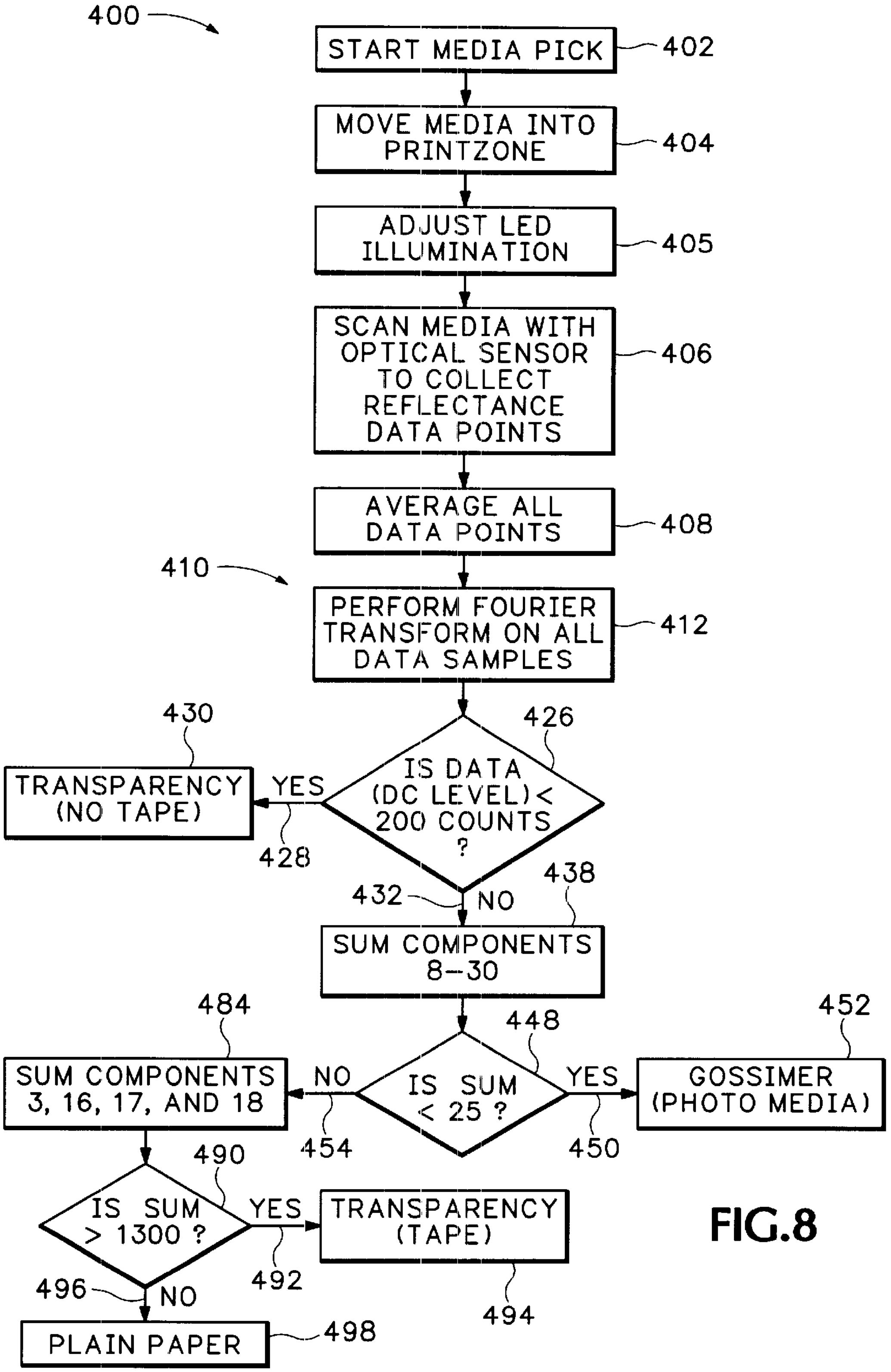
FIG. 8 is a flowchart illustrating the manner in which the optical sensor of FIG. 2 may be used to distinguish transparency media without tape, GOSSIMER photo media, transparency media with a tape header, and plain paper from each other.

FIG. 8 illustrates one form of a preferred basic media type determination system 400 as a flowchart, constructed in accordance with the present invention, which may be used in conjunction with the optical sensor 100 of FIG. 2. The first step of this media-type determination method 400 consists of starting the media pick routine 402 where a fresh sheet of media is picked by the media handling system 24 from the input tray 26. This fresh sheet of media is then moved into the printzone in step 404. After the media pick routine is completed, the LED 105 of the optical sensor 100 is illuminated, and in step 405 this illumination is adjusted to bring the signal received from an unprinted portion of the media up to a near-saturation level of the analog to digital (A/D) converter, which is on the order of 5 volts. This A/D converter is within the controller 35, and during data acquisition this A/D converter is enabled and allowed to acquire the output signal of the photodiode 130.

Once the illumination of the LED 105 has been adjusted in a scanning step 406, the optical sensor 100 is scanned across the media by carriage 40 to collect reflectance data points and preferably, to record these data points at every positional encoder transition along the way, with this positional information being obtained through use of the optical encoder strip 45 (FIG. 1). Thus, the data generated in the scanning and collecting step 406 consists of both positional data and the corresponding reflectance data, with the reflectance and position being in counts. For instance, for the reflectance, twelve bits, or 212 which equals 4096 counts, are equally distributed over a 0–5 Volt range of the A/D converter. Thus, each count is equal to 5/4096, or 1.2 mV (millivolts). The light (reflectance from the media is captured by the LVC (light-to-voltage converter) and provides as an output an analog voltage signal which is translated by the analog-to-digital converter into a digital signal expressed in counts. The position on the media (e.g., paper) is also expressed in counts derived from the 600 quadrature transitions per inch of the encoder in the illustrated embodiment, although it is apparent to those skilled in the art that other transitions per inch, or per some other linear measurement, such as centimeters, may also be used. Thus, a position count of 1200 in the illustrated embodiment translates to a location on the paper or other media of 1200/600 position counts, or 2.0 inches (5.08 centimeters) from the start of the scan. Preferably, the media is scanned a single time and then the data is averaged in step 408. During the scanning and collecting step 406, the field of view of the optical sensor 100 is placed over the media with the media resting at the top of form position. In this top of form position, for a transparency supplied by the Hewlett-Packard Company, which has a tape header across the top of the transparency, this implies that the tape header is being scanned by the sensor 100.

Since the A-D conversions used during the scanning and collecting step 406 is triggered at each state transition of the encoder strip 45, the sampling rate has spatial characteristics, and occurs typically at 600 samples per inch in the illustrated printer 20. During the scan, the carriage speed is preferably between 2 and 30 inches per second. The data collected during step 406 is then stored in the printer controller 35, and is typically in the range of a 0–5 volt input, with 9-bit resolution. At the conclusion of the scanning, the data acquisition hardware signals the controller 35 that the data collection is complete and that the step of averaging the data points 408 may then be performed.

The media type determination system 400 then performs a spatial frequency media identification routine 410 to distinguish whether the media sheet that has been scanned is either a transparency without a header tape, photo quality media, a transparency with a header tape, or plain paper. The first step in the spatial frequency media identification routine 410 is step 412, where a Fourier transform is performed on all of the data to determine both the magnitude and phase of each of the discrete spatial frequency components of the data recorded in step 406. In the illustrated embodiment for printer 20, the data record consists of 4000 samples, so the Fourier components range from 0–4000. The magnitude of the first sorted component is the direct current (DC) level of the data.

Figure 9:
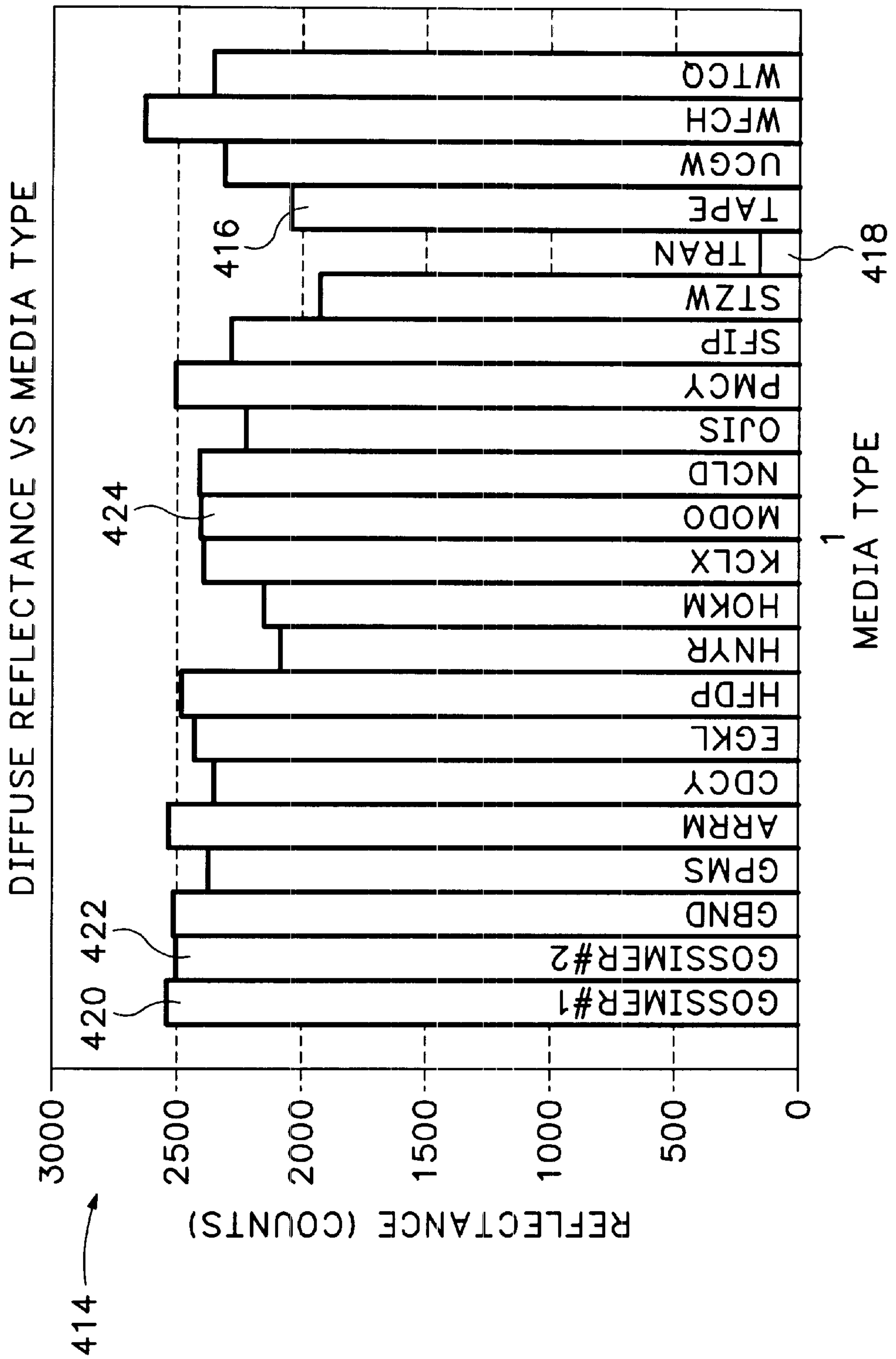
FIG. 9 is a graph of the direct current (DC) level diffuse reflectance versus media type for all plain papers, including an entry for transparencies ("TRAN") and one without the tape header, labeled "TAPE," as well as GOSSIMER photo papers, labeled "GOSSIMER#1 and GOSSIMER #2.

If a transparency without a tape header is being examined, this DC level of the data will be low. FIG. 9 is a graph 414 of the DC level of reflectance for a group of plain papers which were studied, with the abbreviation key being shown in Table 1 below. Also shown in FIG. 9 are the DC levels of reflectance for transparencies with a header tape, labeled "TAPE," as shown by bar 416 and for that without the tape header, labeled as "TRAN", as shown by bar 418 in graph 414.

TABLE 1

Graph Abbreviations

| Label | Media Type Archive |
|---|---|
| GOSSIMER | Gossimer (HP Photo Glossy) |
| GBND | Gilbert Bond |
| GPMS | Georgia-Pacific Multi-System |
| ARRM | Aussedat-Rey-Reymat |
| CDCY | Champion DataCopy |
| EGKL | Enso-Gutzeit Berga Laser |
| HFDP | Hammermill Fore DP |
| HNYR | Honshu New Yamayuri |
| HOKM | Hokuestsu kin-Mari |
| KCLX | KymCopy Lux |
| MODO | MoDo DataCopy |
| NCLD | Neenah Classic Laid |
| OJIS | Oji Sunace PPC |
| PMCY | Stora Papyrus MultiCopy |
| SFIP | SFI-PPC |
| STZW | Steinbeis/Zweckform |
| TAPE | HP transparency (Scotty) WITH paper tape |
| TRAN | HP transparency (Scotty) NO Tape |
| UCGW | Union Camp Great White |
| WFCH | Weyerhauser First Choice |
| WTCQ | Wiggens Teape Conqueror |

Also included in the DC level reflectance graph of FIG. 9 are two types of Gossimer photo paper, labeled GOSSIMER#1 and GOSSIMER#2, as shown by bars 420 and 422, respectively in graph 414. The remainder of the bars in graph 414 indicate varying types of plain paper, as shown in Table 1 below, of which bar 424 is used for MoDo DataCopy plain paper media, labeled as "MODO". From a review of graph 414, it is seen that the low level of light passing through the transparency without a tape header at bar 414 is readily distinguishable from the remainder of the reflectance values for the other types of media, which is because rather than the light being reflected back to the photo sensor 130, it passes through the transparency. Thus, in step 426, a determination is made based on the DC level of the reflectance data which, if it is under a reflectance of 200 counts then a YES signal 428 is generated to provide a transparency without tape signal 430 to the controller 35, which then adjusts the printing routine accordingly for a transparency. If instead, the DC level of the data collected is greater than 200 counts, then a NO signal 432 is generated and further investigation takes place to determine which of the other types of media may be present in the printzone. Note that step 426 of comparing the reflectance data may also be performed before the Fourier transform step 412, since the Fourier spectrum values are not needed to determine whether or not the media is a regular transparency without tape.

Figure 10:
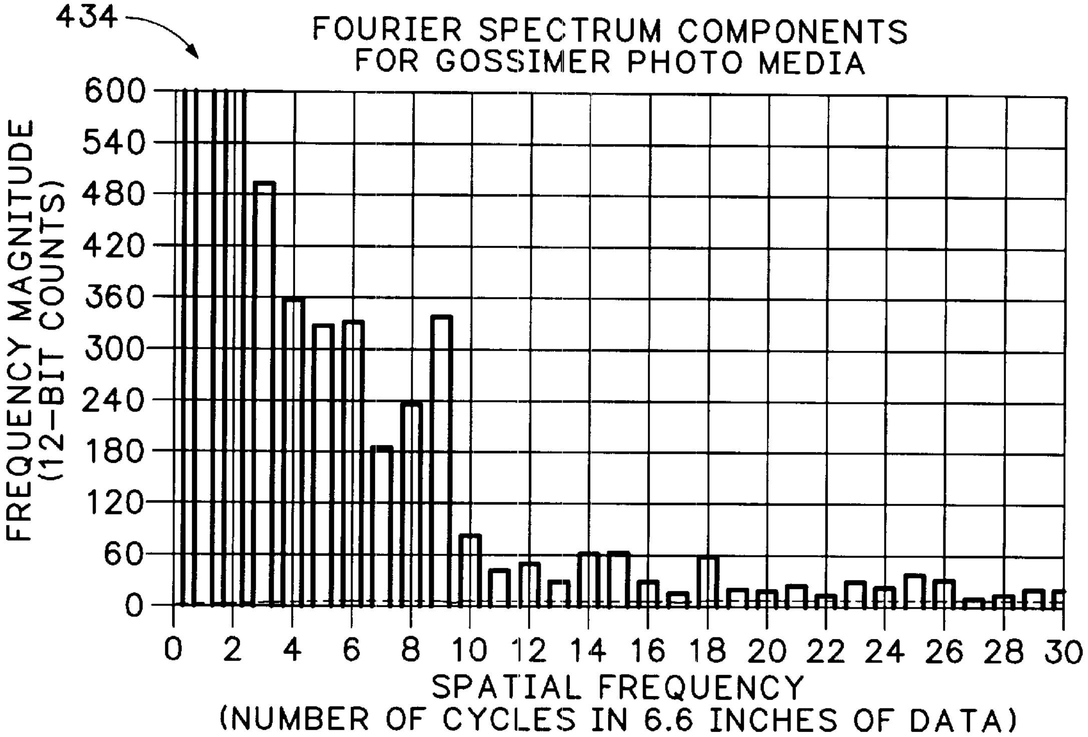
FIG. 10 is a graph of the Fourier spectrum components, up to component 30 for the GOSSIMER photo media.
Figure 11:
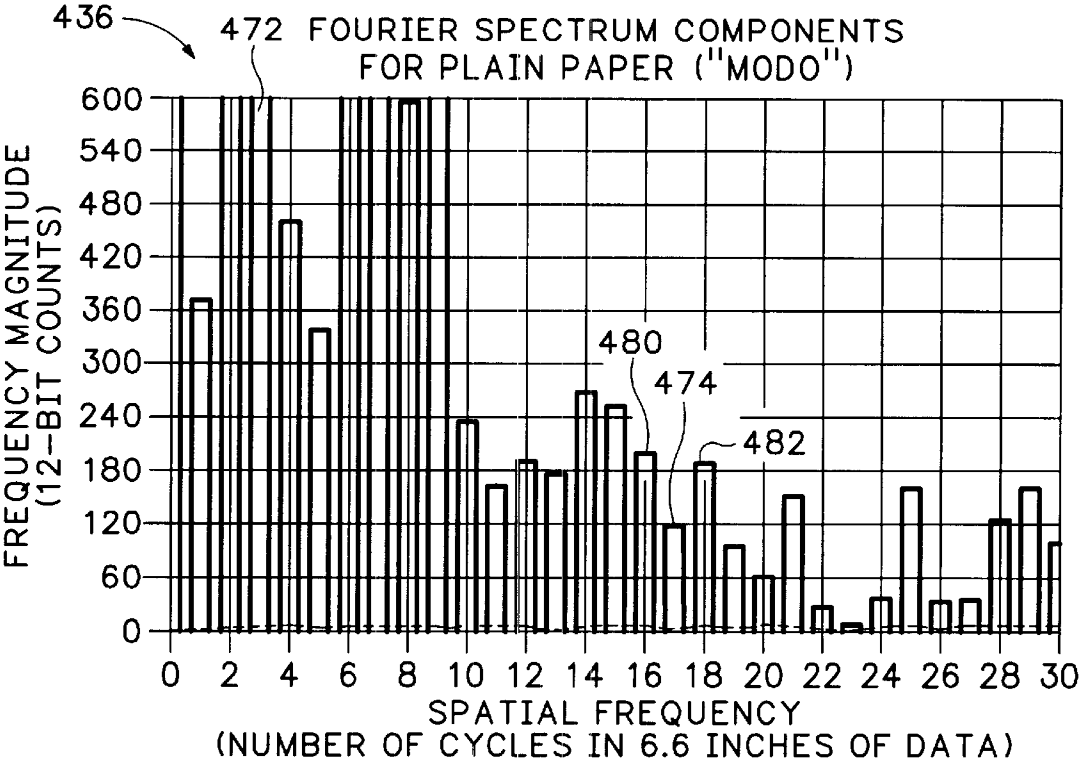
FIG. 11 is a graph of the Fourier spectrum components, up to component 30 for the representative plain paper provided by MoDo Datacopy, labeled "MODO" in FIG. 9.

So if the media is not a transparency without a tape header, a determination is then made whether the media is a photo quality media. To do this, a Fourier spectrum component graph 434 is used, as shown in FIG. 10, along with a Fourier spectrum component graph 436 for plain paper, here the MoDo Datacopy brand of plain paper shown in FIG. 11. Before delving into an explanation of this analysis, an explanation of the units for the spatial frequency label along the horizontal axis of these graphs (as well as for the graph in FIG. 13) is in order. The spatial frequency components are the number of cycles that occur within the scan data collected in the scan media step 406 of FIG. 8. For the examples illustrated herein, the length of the data sample was selected to be 4000 samples. As discussed above, in the illustrated embodiment, the data is sampled at 600 samples per inch of movement of the sensor 100. A spatial frequency that completes 30 cycles within the length of the scan data would therefore have an equivalent spatial frequency found according to the equation:

$$\frac{(30\ \text{cycles})\times(600\ \text{samples/inch})}{(4000\ \text{samples})}=4.5\ \text{cycles/inch}$$

In the illustrated embodiment, a data scan of 4000 samples is equivalent to a traverse of 6.6 inches across the media which is the scan distance used herein, from the equation:

$$\frac{(4000\ \text{samples})}{(600\ \text{samples/inch})}=6.6\ \text{inches}$$

From the comparison of graphs 434 and 436, it is seen that the magnitudes of the spectrum components above the count n equals eight (n=8) are much greater in the plain paper spectrum of graph 436 then for the photo media in graph 434. Thus, in step 438 the spectral components from 8–30 are summed and in a comparison step 448, it is determined that if the sum of the components 8–30 is less than a value, here a value of 25, a YES signal 450 is generated. In response to the YES signal, step 452 generates a signal which is provided to the controller 35 so the printing routines may be adjusted to accommodate for the photo media. Note that in FIGS. 10 and 11, several of the components having a count of less than eight (n<8) have frequency magnitudes which are greater than the maximum value shown on graphs 434 and 436, but they are not of interest in this particular study, so their exact values are immaterial to our discussion here.

Figure 12:
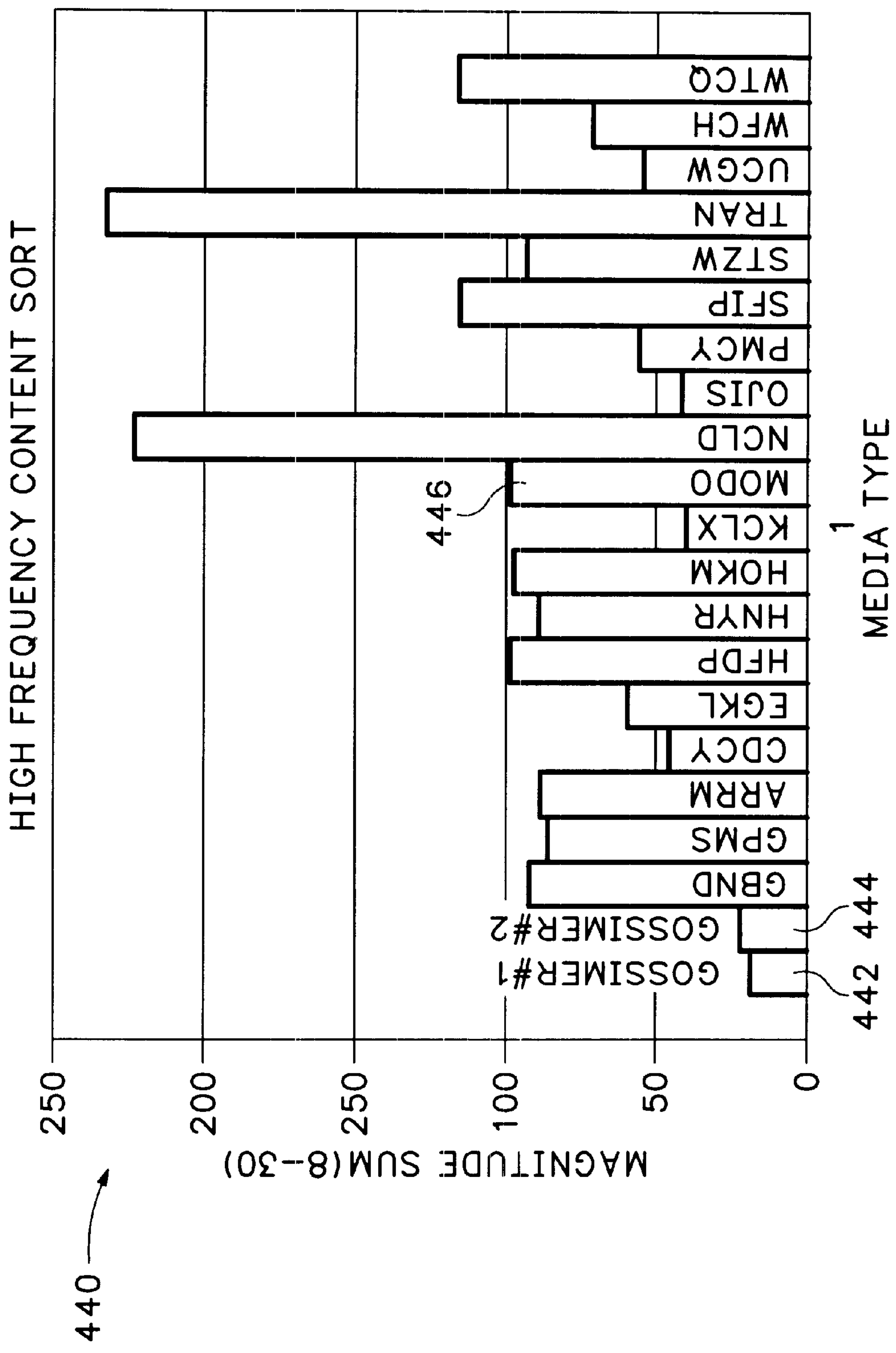
FIG. 12 is a graph of the sum of the Fourier spectrum components for all of the media shown in FIG. 9.

Fourier spectrum component graphs such as 434 and 436 may be constructed for all of the different types of media under study. FIG. 12 shows a graph 440 of the sum of the magnitude of components 8–30 for each of the different types of plain paper and photo media. Here we see the GOSSIMER#1 and GOSSIMER#2 photo medias having their summed components shown by bars 442 and 444. It is apparent that the magnitude of the photo media summed components 442 and 444 is much less than that for any of the remaining plain paper medias, including the bar 446 for the MoDo Datacopy media. Thus, returning to the flowchart of FIG. 8, in response to the sum components step 438 in a comparison step 448 the magnitude of the sum of components 8–30 is compared, and if less than the value of 25 a YES signal 450 is generated.

Figure 13:
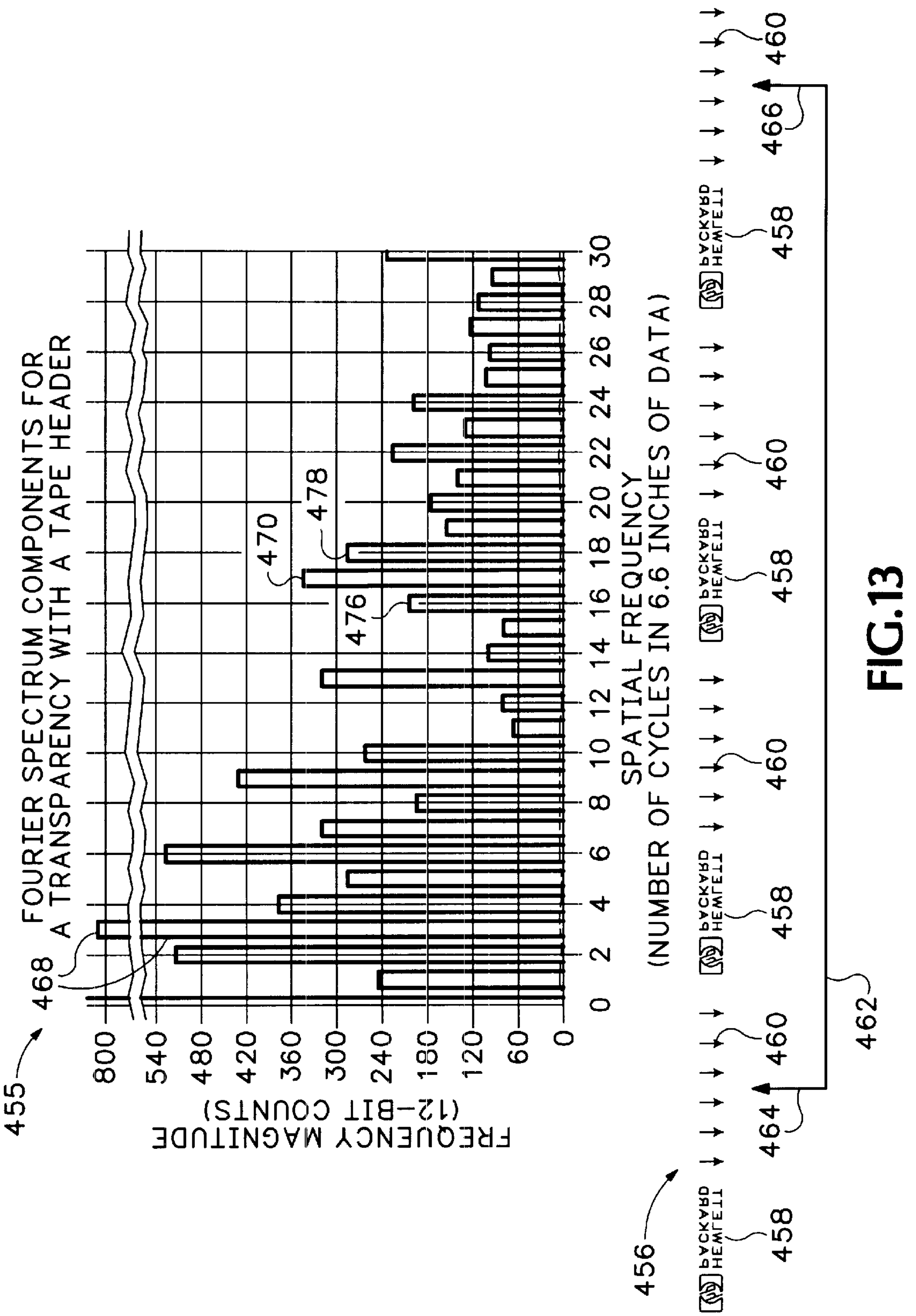
FIG. 13 is a graph of the Fourier spectrum components, up to component 30 for a transparency with a tape header, indicated as "TAPE" in FIG. 9.

However, if the media in printzone 25 is not photo media, the decision step 448 generates a NO signal 454 having determined that the media is not a transparency without a header tape and not photo media it then remains to be determined whether the media is either a transparency with a header tape or plain paper. FIG. 13 is a graph 455 of the Fourier spectrum components for a transparency with a tape header, with a tape header 456 being shown below the graph and having starting and ending points 464 and 466 also being indicated. Over the duration of the scan, there are three HP logos 458 encountered and roughly seventeen directional arrows 460, indicating which way a user should insert the media into the printer. These logos and arrows create a media signature in the spectrum as can be seen from an analysis of graph 455. As can be seen from a review of the graph 455, the third component 468 and seventeenth component 470 are much larger than those in the plain paper spectrum of the respective third and seventeenth components 472 and 474 in graph 436 of FIG. 11 (note that the vertical scale on graph 455 in FIG. 13 is fragmented, and the magnitude of the third component 468 is at a value above 800.). Due to positioning errors at the beginning of the scan, which are compensated in step 408 where the data points are averaged, the sixteenth and eighteenth components 476 and 478, respectively, of graph 455 are much larger than the sixteenth and eighteenth components 480 and 482, for the plain paper in graph 436. Consequently, the sixteenth and eighteenth components are also contained within this unique frequency signature.

Figure 14:
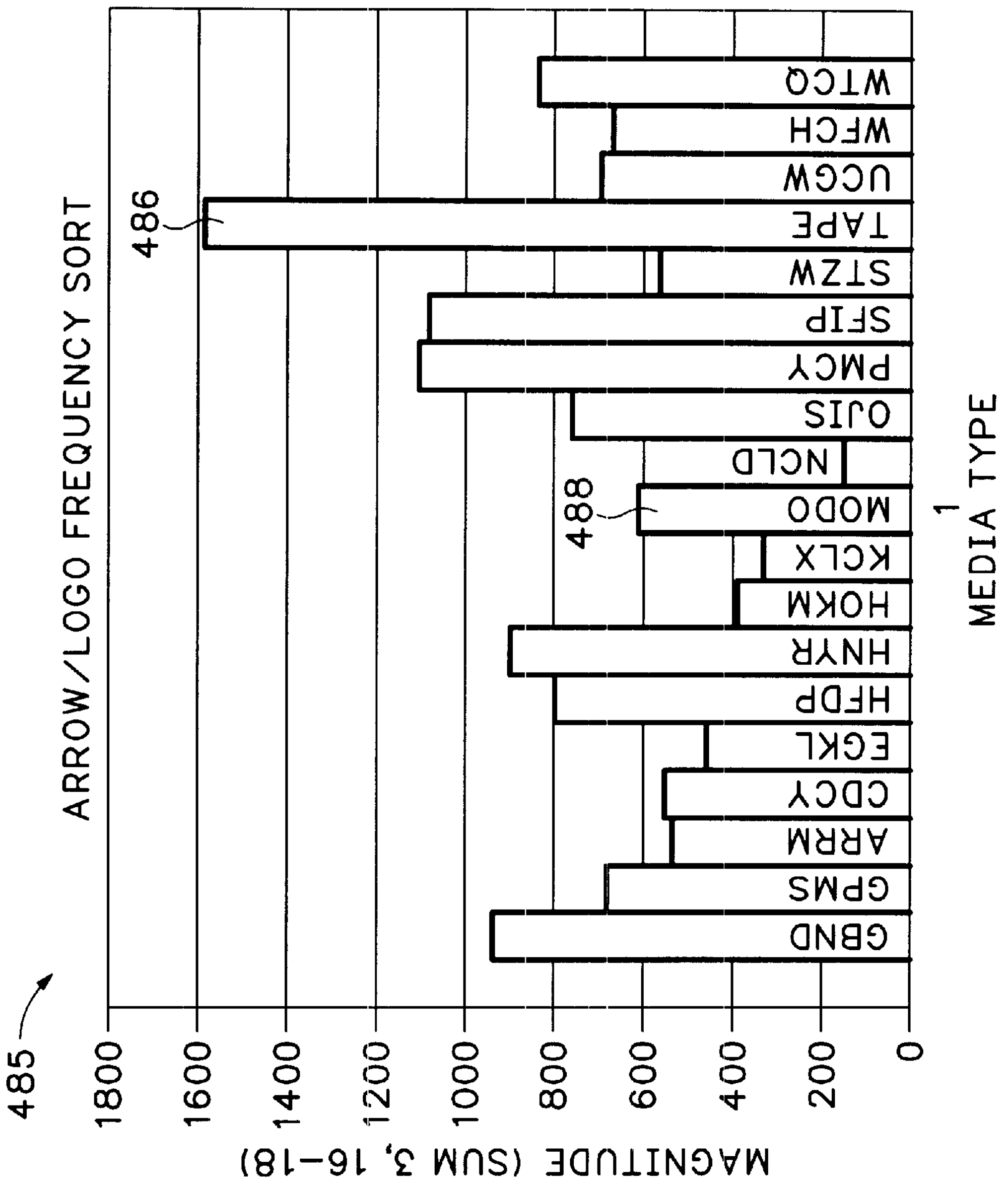
FIG. 14 is a graph of the summed third, sixteenth, seventeenth and eighteenth Fourier spectrum components for the plain paper media shown in FIG. 9, in addition to that of the TAPE header across a transparency indicated as "TRAN."

Returning to flowchart 400 of FIG. 8, in step 484 the magnitude of the components of the third, sixteenth, seventeenth and eighteenth spectrums are summed, with these resulting sums being shown in graph 485 of FIG. 14. The sum for the tape is shown as bar 486, which is clearly of a much greater magnitude than the various plain papers, such as bar 488 for the MoDo Datacopy plain paper. Thus, a decision may then be made in step 490, to determine whether the sum of the frequency sub-components 3, 16, 17 and 18 performed by step 484 is greater than 1300 if so, a YES signal 492 is delivered to indicate that the media is a transparency with a tape header, and this information is then transferred by step 494 to the printer controller 35 for subsequent processing and adjustment of the printing routines. However, if the decision by step 490 is that the sum is less than 1300, then a NO signal 496 is generated which is then sent to a decision block 498 indicating plain paper is in the printer, and the default plain paper print mode may be used by the controller 35.

Advanced Media Determination System

Figure 15:
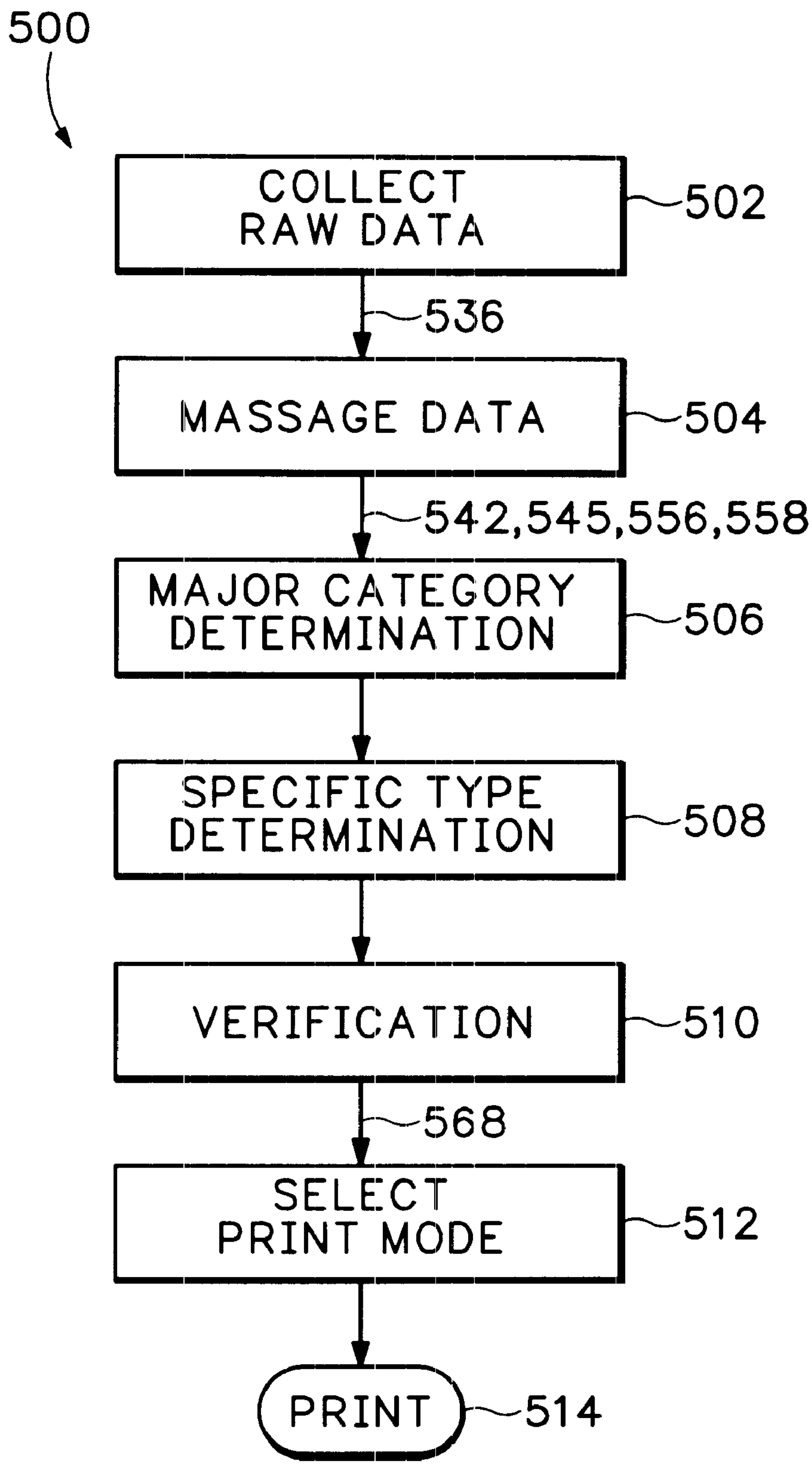
FIG. 15 is a flowchart of one form of a method for determining which major category of media, e.g., plain paper, premium paper, photo paper or transparency, is entering the printzone of the printer of FIG. 1, as well as determining specific types of media within major media categories, such as distinguishing between generic premium paper, matte photo premium paper, and prescored heavy greeting card stock.

FIG. 15 illustrates one form of a preferred advanced media type determination system 500 as a flowchart, constructed in accordance with the present invention. In describing this advanced media determination system 500, first an overview of the system operation will begin with respect to FIG. 15. Next will be a description of several more general portions of the determination system 500 with respect to FIGS. 16–19, followed by a detailed description of the heart of the determination method with respect to FIGS. 20–23. Following a description of the method, FIGS. 24–26 will be used to explain how the media sensor of FIG. 2 is used in the determination routines of FIGS. 20–23, followed by graphical examples of several different types of media studied, with respect to FIGS. 27–39. In FIGS. 40 through 43, the spatial frequencies of light collected by the media type determination sensor are studied to show how system 500 determines which type of media is entering the printzone 25 of printer 20. Finally, FIGS. 44–48 will be used to describe a early transparent media determination system which speeds printer throughput (pages per minute) when printing on transparencies and avoids using heavy ink transparency printing routines on non-transparency media.

1. System Overview

Returning to FIG. 15, the advanced media determination system 500 is shown in overview as having a first collect raw data step 502. Following collection of the raw data, a massage data routine 504 is performed to place the data collected in step 502 into a suitable format for further analysis. Following the massaging data step, comes a major category determination step 506 and a specific type determination step 508. The major and specific determination steps 506 and 508 are interlaced, as will be seen with respect to FIGS. 20–23. For instance, once a major category determination is made, such as for premium paper media, then a further determination may be made as to which specific type of premium media is used. However, to arrive at the major determination step for premium media, the routine must first have discarded the possibilities that the media might be a transparency, a glossy photo, a matte photo, or a plain paper media. After the method has made a specific type determination in step 508, a verification step 510 is performed to assure that the correct specific determination has been made. Following the verification step 510, the determination system 500 then has a select print mode step 512, which correlates the print mode to the specific type of media which is entering the printzone 25. In response to the selection of print mode step 512, the system then concludes with a print step 514, where printing instructions are sent to the printheads 70–76 to print an image in accordance with the print modes selected instep 512.

2. Collect Raw Data Routine

Figure 16:
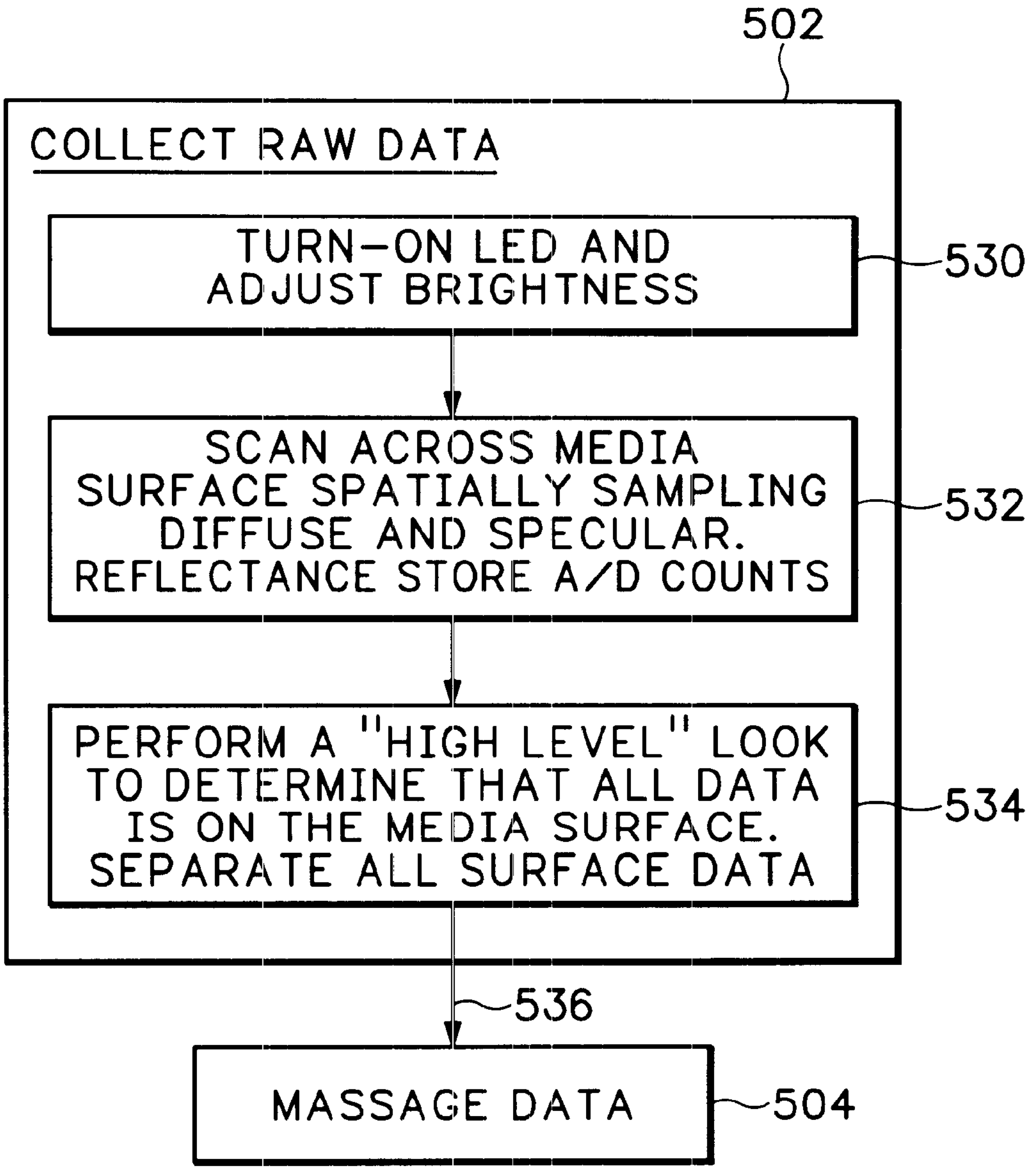
FIG. 16 is a flowchart of the "collect raw data" portion of the method of FIG. 15.

Now that the construction of the media sensor 100 is understood, its use will be described with respect to the collection of raw data routine 502, which is illustrated in detail in FIG. 16. In a first step 530 of routine 502, the blue-violet LED 105 is turned on, and the brightness of the LED 105 is adjusted. Following step 530, in a scanning step 532, the printhead carriage 40 transports the media sensor 100 across the printzone 25, parallel to the scanning axis 38. During the scanning step 532, the media surface is spatially sampled and both the diffuse reflected light components 200, and the specular reflected light components 200' are collected at every state transition as the carriage optical encoder reads markings along the encoder strip 45. These diffuse and specular reflectance values are stored as analog-to-digital (A/D) counts to generate a set of values for the reflectances at each encoder position along the media. In some implementations, it may be desirable to scan the media several time to produce an averaged data set, although typically only one scan of the media is required to produce good results.

During this scanning step 532, the sheet of media 150 is placed under the media sensor 100 at the "top of form" position. For an HP transparency media with a tape header 456, as shown in FIG. 13, the tape 456 is within the field of view, even though at this point the tape is located along the undersurface of the media. Indeed, even though the tape header 456 is facing away from the sensor 100, as well as away from sensor 100 in the basic media type determination method 400 (FIG. 8), the markings 458, 460 on the tape header 456 are viewable by sensor 100, and may be used to identify this media as described above in method 400.

In a final checking step 534 of the raw data collection routine 502, a high level look or check is performed to determine whether all of the data collected during step 532 is actually data which lies on the media surface. For instance, if a narrower sheet of media is used (e.g. A-4 sized media or custom-sized greeting card media) than the standard letter-size media for which printer 20 is designed, some of the data points collected during the scanning step 532 will be of light reflected from the media support member, also known as a platen or "pivot," which forms a portion of the media handling system 24. Thus, any data corresponding to the pivot is separated in step 534 from the data corresponding to the sheet of media, which is then sent on as a collected raw data signal 536 to the massage data routine 504.

During the analog to digital conversion portion of the scanning step 532, the A-to-D conversion is triggered at each state transition of the carriage positional encoder which monitors the optical encoder strip 45. In this manner, the data is collected with a spatial reference, that is, spatial as in "space," so the data corresponds to a particular location in space as the carriage 40 moves sensor 100 across the printzone 25. For the illustrated printer 20 the sampling rate typically occurs at the rate of 600 samples per inch (1524 samples per centimeter). During this scanning step 532, preferably the speed of the carriage 40 is between two and thirty inches per second (5.08 to 76.2 centimeters per second). One preferred analog-to-digital conversion is over a 0–5 volt range, with a 9-bit resolution.

3. Massage Data Routine

Figure 17:
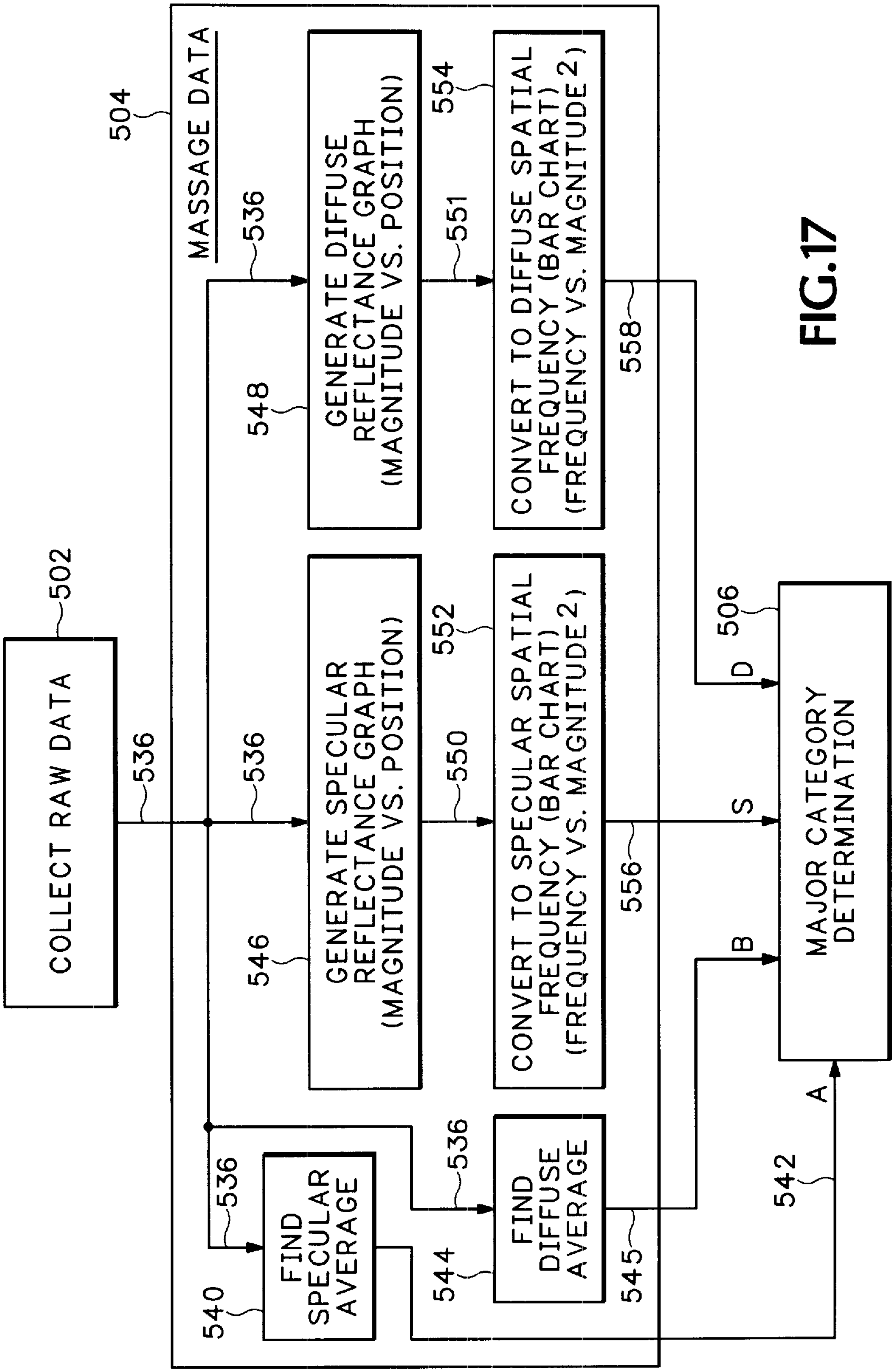
FIG. 17 is a flowchart of the "massage data" portion of the method of FIG. 15.

FIG. 17 illustrates the details of the massage data routine 504, which generates a set of four signals as outputs which are sent to the major category determination routine 506. In two steps, averages of the incoming data are found. Specifically, in a "find specular average" step 540, and a "find diffuse average" step 544, the averages for all of the incoming specular raw data and diffuse raw data, respectively, are found. The specular average step 540 produces a specular average signal 542, also indicated by the letter "A" in FIG. 17, which is provided as an input to the major category determination routine 506. The diffuse average step 544 produces a specular average signal 545, also indicated by the letter "B" in FIG. 17, which is provided as an input to the major category determination routine 506.

The other major operations performed by the massage data routine 504 are preformed in a "generate specular reflectance graph" step 546, and in a "generate diffuse reflectance graph" step 548. In step 548, the collected raw data is arranged with the diffuse and specular reflectance values referenced to the same spatial position with respect to the pivot or platen.

The steps of generating the specular and diffuse reflectance graphs 546, 548 each produce an output signal, 550 and 551, which are received by two conversion steps 552 and 554, respectively. In step 552, the aligned data 550 is passed through a Hanning or Welch's fourth power windowing function. Following this manipulation, a discrete fast Fourier transform may be performed on the windowed data to produce the frequency components for the sheet of media entering the printzone 25. In each of steps 546 and 548, the graphs are produced in terms of magnitude versus ("vs.") position, such as the graphs illustrated in FIGS. 27–33, discussed further below. The specular spatial frequency, shown as a bar chart of frequency versus the magnitude$^2$ (magnitude squared), which is an output signal 556, also labeled as letter "S," which is supplied to the major category determination routine 506. In step 554, the incoming data 551 is converted to a diffuse spatial frequency, shown as a bar chart of frequency versus the magnitudes, to produce an output signal 558, also labeled as letter "D," which is supplied to the major category determination routine 506. Examples of the graphical data provided by the conversion steps 552 and 554 are shown in FIGS. 34–39, discussed further below.

Thus, during the massage data routine 504, a Fourier transform is performed on the collected raw data to determine the magnitude and phase of each of the discrete spatial frequency components of the recorded data for each channel, that is, channels for the specular and diffuse photodiodes 130', 130. Typically this data consists of a record of 1000–4000 samples. The Fourier components of interest are limited by the response of the photodiodes 130, 130' to typically less than 100 cycles per inch. The magnitude of the first order component is the DC (direct current) level of the data. This DC level is then used to normalize the data to a predetermined value that was used in characterizing signatures of known media which has been studied. A known media signature is a pre-stored Fourier spectrum, typically in magnitude values, for both the specular and diffuse channels for each of the media types which are supported by a given inkjet printing mechanism, such as printer 20.

4. Verification and Selection of Print Mode Routines

Figure 18:
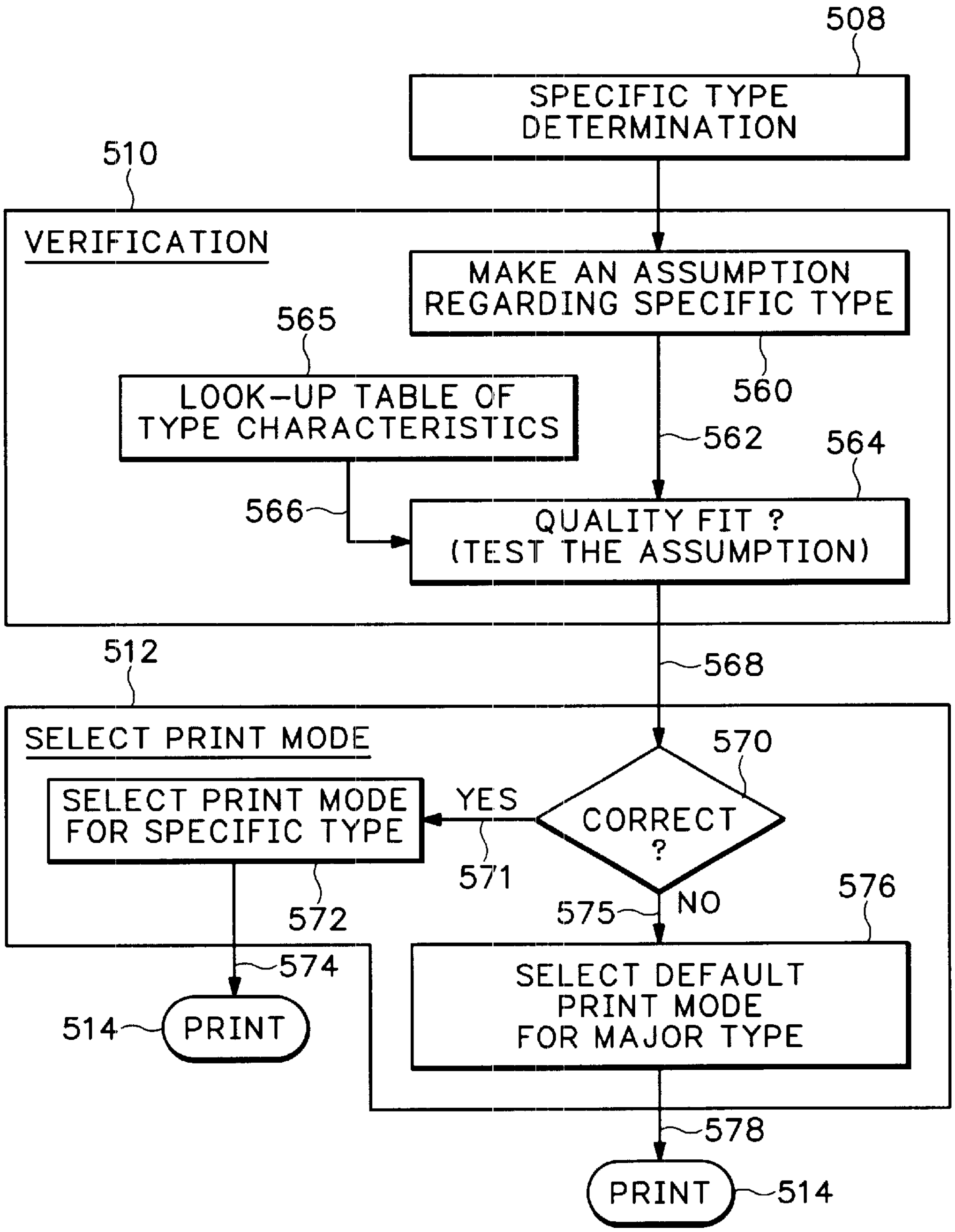
FIG. 18 is a flowchart of the "verification" and "select print mode" portions of the method of FIG. 15.

FIG. 18 illustrates the details of the verification and select print mode steps 510, 512 of the media determination system 500. Here we see the verification step 510 receiving incoming data from the specific type determination step 508. This incoming data is first received by a "make assumption" step 560, with this assumption regarding the specific media type. Step 560 yields an assumed specific type signal 562, which is received by a "determine the quality fit" step 564. The determine the quality fit step 564 is used to test the correctness of the assumption made in step 560. In a look-up step 565, a table of the various type characteristics for each specific type of media is consulted, and data corresponding to the assumed media type of signal 562 is provided to the quality fit step 564 as a reference data signal 566. The quality fit step 564 processes the reference values 566 and the assumed media type signal 562 and provides an output signal 568 to the select print mode routine 512.

The output signal 568 from the verification step 510 is received by a comparison step 570, where it is determined whether the assumption data 562 matches the reference data 566. If this data does indeed match, a YES signal 571 is issued by the comparison step 570 to a "select print mode" step 572. Step 572 then selects the correct print mode for the specific type of media and issues a specific print mode signal 574 to the print step 514. However, if the comparison step 570 determines that the media type assumed step 560 does not have characteristics which match the reference data 566, then a NO signal 575 is issued. The NO signal 575 is then sent to a "select default print mode" step 576. The default print mode selection step 576 then issues a default print mode signal 578, corresponding to the major type of media initially determined, and then the incoming sheet is printed in step 514 according to this default determination.

5. Types of Media

At this point, it may be helpful to describe the various major types of media which may be determined using system 500, along with giving specific examples of media which falls into the major type categories. It must be noted that only a few of the more popular medias have been studied, and their identification incorporated into the specifics of the illustrated determination system 500. Indeed, this is a new frontier for printing, and research is continuing to determine new ways to optically distinguish one type of media from another. The progress of this development routine is evidenced by the current patent application, which has progressed from a basic media determination routine 400 described in the parent application, to this more advanced routine 500 which we are now describing. Indeed, other medias remain yet to be studied, and further continuing patent applications are expected to cover these determination methods which are so far undeveloped.

Table 2 shows the print modes assigned by media type:

TABLE 2

| | Print Modes By Media Type | | | |
|---|---|---|---|---|
| Print Mode | PM = 0 Plain | PM = 2 Premium | PM = 3 Photo | PM = 4 Transp. |
| Default | Default (0, 0) | Default (2, 0) | Default (3, 0) | Default (4, 0) |
| Specific A | Plain A (0, 1) | Matte Photo (2, 1) | Gossimer (3, 0) | HP (Tape) (4, 1) |
| Specific B | | Clay Coated (2, 2) | Combined (3, 1) | |
| Specific C | | Slight Gloss (2, 3) | Very Glossy (3, 2) | |
| Specific D | | Greeting Card (2, 4) | | |

In the first major type category of plain paper, a variety of different plain papers have been listed previously with respect to Table 1, with the specific type of plain paper shown in graphs 42, 49 and 50 being a Gilbert® Bond media, as a representative of these various types of plain paper.

Several different types of media fall within the premium category, and several of these premium papers have coatings placed over an underlying substrate layer. The coatings applied over premium medias, as well as transparency medias and glossy photo medias, whether they are of a swellable variety or a porous variety, are known in the art as an ink retention layer ("IRL"). The premium coatings typically have porosities which allow the liquid ink to pool inside these porosities until the water or other volatile components within the ink evaporate, leaving the pigment or dye remaining clinging to the inside of each cavity. One group of premium papers having such porosities are formed by coating a heavy plain paper with a fine layer of clay. Premium papers with these clay coatings are printed using the "2,2" print mode.

Another type of premium paper has a slightly glossy appearance and is formed by coating a plain paper with a swellable polymer layer. Upon receiving ink, the coating layer swells. After the water or other volatile components in the ink composition have evaporated, the coating layer then retracts to its original conformation, retaining the ink dyes and pigments which are the colorant portions of the ink composition. This swellable type of media is printed with a "2,3" print mode. Another type of media which falls into the premium category is pre-scored greeting card stock, which is a heavy smooth paper without a coating. However, the heavy nature of the greeting card media allows it to hold more ink than plain paper before the greeting card stock begins to cockle (referring to the phenomenon where media buckles as the paper fibers become saturated, which can lead to printhead damage if the media buckles high enough to contact the printhead). Thus, greeting card stock may be printed with a heavier saturation of ink for more rich colors in the resulting image, than possible with plain paper. The print mode selected for greeting card stock is designated as "2,4".

The third major category used by the determination system 500 is photographic media. The various photo medias studied this far typically have a polymer coating which is hydroscopic, that is, the coating has an affinity for water. These hydroscopic coatings absorb water in the ink, and as these coating absorb the ink they swell and hold the water until it evaporates, as described above with respect to the slightly glossy premium media. The Gossimer paper which has a print mode selection of "3,0" is a glossy media, having a swellable polymer coating which is applied over a polymer photobase substrate, which feels like a thick plastic base. Another common type of photo media is a combination media, which has a print mode of "3,1". This combination media has the same swellable polymer coating as the Gossimer media, but instead, the combination media has this coating applied over a photo paper, rather than the polymer substrate used for Gossimer. Thus, this combination photo media has a shiny polymer side which should be printed as a photo type media, and a plain or dull side, which should be printed under a premium print mode to achieve the best image.

The very glossy photo media which is printed according to print mode "3,2" is similar to the Gossimer media. The very shiny media uses a plastic backing layer or substrate like the Gossimer, but instead applies two layers of the swellable polymer over the substrate, yielding a surface finish which is much more glossy than that of the Gossimer media.

The final major media type studied were transparencies, which have not been studied beyond the two major categories described with respect to the basic media determination system 400, specifically, HP transparencies or non-HP transparencies. Further research may study additional transparencies to determine their characteristics and methods of distinguishing such transparencies from one another but this study has yet to be undertaken.

Before returning to discussion of the determination method 500, it should be noted that the various print modes selected by this system do not affect the normal quality settings, e.g., Best, Normal, Draft, which a user may select. These Best/Normal/Draft quality choices affect the speed with which the printer operates, not the print mode or color map which is used to place the dots on the media. The Best/Normal/Draft selections are a balance between print quality versus speed, with lower quality and higher speed being obtained for draft mode, and higher quality at a lower speed being obtained for the Best mode. Indeed, one of the inventors herein prefers to leave his prototype printer set in draft mode for speed, and allow the media determination system 500 to operate to select the best print mode for the type of media being used.

For example, when preparing for a presentation and making last minute changes to a combination of transparencies for overhead projection, premium or photo media for handouts, and plain paper for notes which the presenter is using during a speech, all of these images on their varying media may be quickly generated at a high quality, without requiring the user to interrupt the printing sequence and adjust for each different type of media used. Indeed, the last statement assumes that the user may have the sophistication to go into the software driver program screen and manually select which type of media has been placed in the printer's supply tray 26. Unfortunately, the vast majority of users do not have this sophistication, and typically print with the default plain paper print mode on all types of media, yielding images of acceptable, but certainly not optimum print quality which the printer is fully capable of achieving if the printer has information input as to which type of media is to be printed upon. Thus, to allow all users to obtain optimum print quality matched to the specific type of media being used, the advanced media determination system 500 is the solution, at least with respect to the major types of media and the most popular specific types which have thus far been studied.

6. Weighting and Ranking Routine

Figure 19:
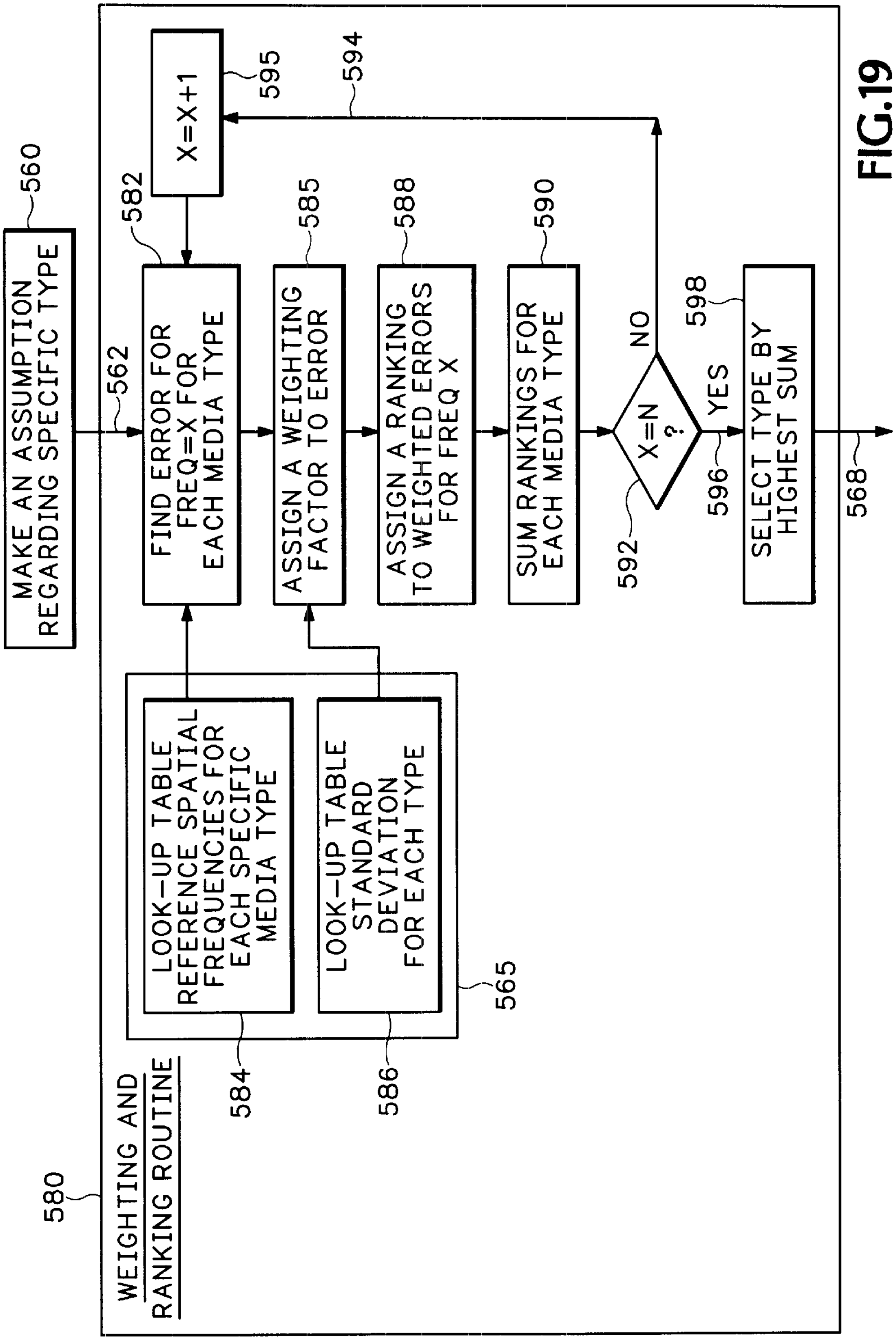
FIG. 19 is a flowchart of a data weighting and ranking routine used in both the "verification" and "select print mode" portions of the method of FIG. 15.

Before delving into the depths of the major and specific media type determination routines 506, 508 a weighting and ranking routine 580 will be described with respect to FIG. 19. This weighting and ranking routine 580 is performed during the quality fit step 564 of the verification routine 510. The specific type of assumption signal 562 is first received by a find error step 582. The find error step 582 refers to a subtable 584 of the type characteristics table 565. The subtable 584 contains the average or reference values for each spatial frequency, for each specific media type that has been studied. The find error step 582 then compares the value of the spatial frequency measured with the reference value of that spatial frequency with each of the values for a corresponding frequency stored in table 584 for each media type, and during this comparison generates an error value, that is, the difference between the frequency value measured versus the value of the corresponding frequency for each media type. The resulting error signals are sent to a weight assigning step 585.

The weight assigning step 585 then refers to another subtable 586 of the look-up table 565. The subtable 586 stores the standard deviation which has been found during study at each spatial frequency for each type of media. The assigning step 585 then uses the corresponding standard deviation stored in table 586 to each of the errors produced by step 582. Then all of the weighted errors produced by step 585 are ranked in a ranking step 588. After the ranking has been assigned by step 588, the ranking for each media type are summed in the summing step 590. Of course, on this first pass through the routine, no previous values have been accumulated by step 590.

Following the summing step 590, comes a counting step 592, or the particular frequency X under study is compared to the final frequency value n. If the particular frequency X under study has not yet reached the final frequency value n, the counting step 592 issues a NO signal 594. The NO signal 594 has been received by an incrementing step 595, where the frequency under study X is incremented by one ("X=X+1"). Following step 595, steps 582 through 592 are repeated until each of the frequencies for both the spatial reflectance and the diffuse reflectance have been compared with each media type by step 582, then assigned a weighting factor according to the standard deviation for each frequency and media type by step 585, ranked by step 588, and then having the ranking summed in step 590.

Upon reaching the final spatial frequency N, the counting step 592 finds that the last frequency N has been reached (X=N) and a YES signal 596 is issued. Upon receiving this YES signal 596, a selection step 598 then selects the specific type of media by selecting the highest number from the summed ranking step 590. This specific type is then output as signal 568 from the verification block 510. It is apparent that this weighting and ranking routine 580 may be used in conjunction with various portions of the determination method 500 to provide a more accurate guess as to the type of media entering the printzone 25.

During the weighting and ranking routine 580, for a standard letter-size sheet of media analyzing both the specular and diffuse readings for a given sheet of media, a total of 84 events are compared for both the specular and diffuse waveforms for each media type. It is apparent that, while the subject media entering the printzone has been compared to each media type by incrementing the frequency, other ways could be used to generate this data, for instance by looking at each media type separately, and then comparing the resulting ranking for each type of media rather than incrementing by frequency through each type of media. However, the illustrated method is preferred because it more readily lends itself to the addition of new classifications of media as their characteristics are studied and compiled.

Each component of the pre-stored Fourier spectrum for each media type has an associated deviation which was determined during the media study. The standard deviations stored in the look-up table 586 of FIG. 19 are preferably arrived at by analyzing the spectra over many hundreds of data scans for many hundreds of pages of each specific type of media studied. The difference between each component of the fresh sheet of media entering the printzone 25 and each component of the stored signatures is computed in the find error step 582 of FIG. 19. The ratio ("x") of the error to the standard deviation is then determined. If this ratio is found to be less than two (x<2), the error is then weighted by a factor of one (1). If this ratio is found to be between two and three (2<x<3), then the error is weighted by a factor of two (2). If this ratio is found to be greater then three (x>3), then the error is weighted by a factor of four (4). This "weighting" of step 585 then takes into account the statistical set for each of the characterized media types which have been studied. In the illustrated embodiment, the media type with the lowest weighted error is assigned a ranking of three (3) points. The media type with the second lowest error is assigned a ranking of two (2) points, and the media type with the third lowest error is given a ranking of one (1) point, as shown in FIG. 19.

The media type having the highest sum of the ranking points across all of the specular and diffuse frequency components is then selected as the best fit for characterizing the fresh sheet of media entering the printzone 25. The select print mode routine 512 then selects the best print mode, which is delivered to the printing routine 514 where the corresponding rendering and color mapping is performed to generate an optimum quality image on the particular type of media being used.

7. Major Category & Specific Type Media Type Determination Routines

Having dispensed with preliminary matters, our discussion will now turn to the major category determination and the specific type determination routines 506 and 508. This discussion will cover how the routines 506 and 508 are interwoven to provide information to multiple verification and select print mode steps, ultimately resulting in printing an image on the incoming sheet of media according to a print mode selected by routine 500 to produce an optimum image on the sheet, in light of the available information known. FIGS. 20–23 together describe the major category and specific type determination routines 506 and 508.

Figure 20:
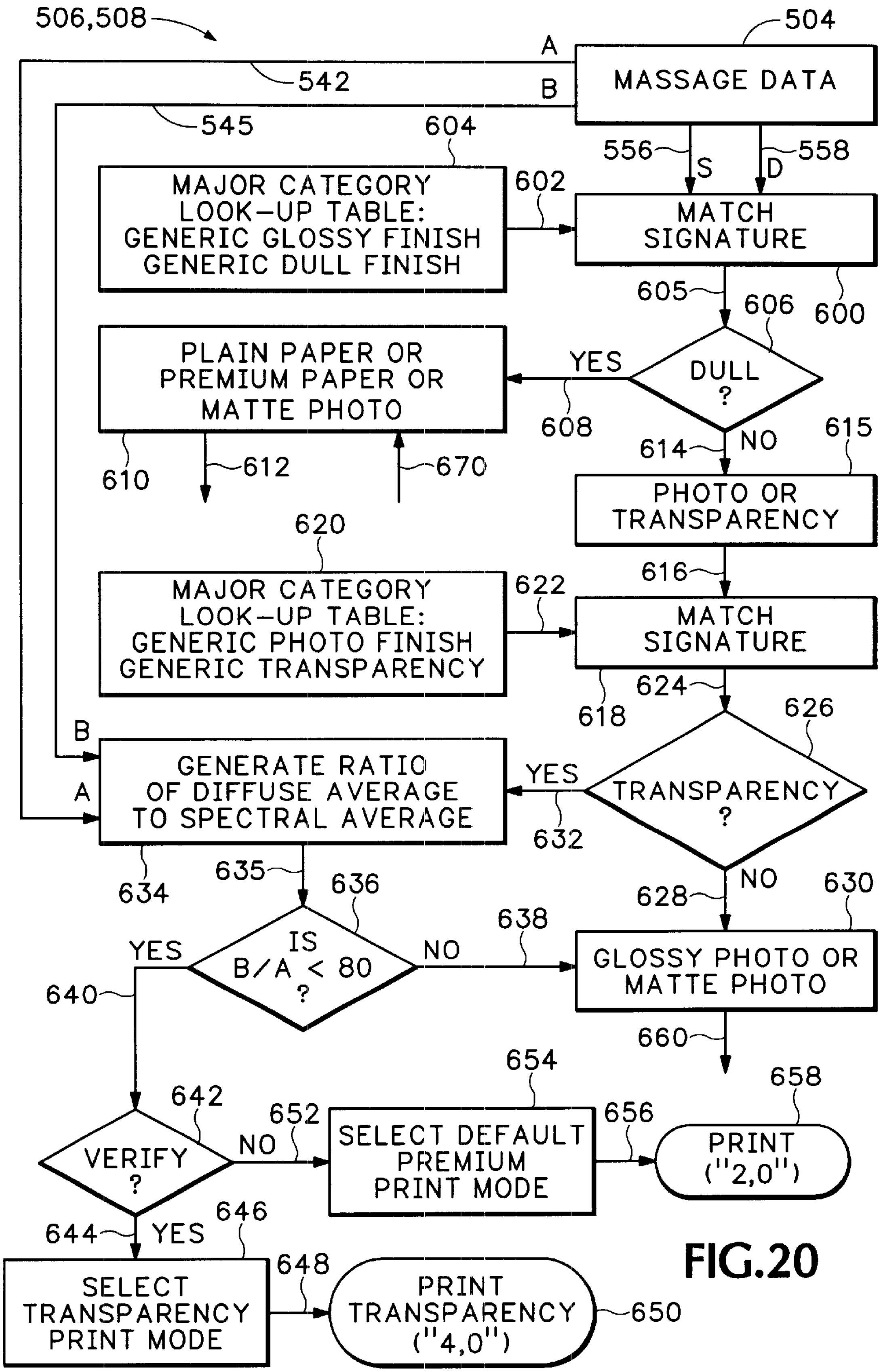

Referring first to FIG. 20, the massage data routine 504 is shown as first supplying the specular and diffuse spatial frequency data 556 and 558 to a match signature step 600. Step 600 receives an input signal 602 from a major category look-up table 604. Table 604 contains both specular and diffuse spatial frequency information for a generic glossy finish media and a generic dull finish media. The term "generic" here means an average or a general category of information, basically corresponding to a gross sorting routine. The match signature routine 600 then compares the incoming massaged data for both the specular and diffuse reflectances 556 and 558 with the reference values 602 from table 604, and then produces a match signal 605. In a comparison step 606, the question is asked whether the incoming matched data 605 corresponds to media having a dull finish. If it does, a YES signal 608 is issued to a plain paper, premium paper, or a matte photo branch routine 610. The photo branch routine 610 issues an output signal 612, which is further processed as described with respect to FIG. 22 below. However, if the dulled determination step 606 determines that the match signature output signal 605 is not dull, a NO signal 614 is issued to a photo or transparency decision branch 615.

The photo or transparency branch 615 sends a data signal 616 carrying the massaged specular and diffuse spatial frequency data 556 and 558 to another match signature step 618. A second major category look-up table 620 supplies an input 622 to the second match signature step 618. The data supplied by table 620 is specular and diffuse spatial frequency information for two types of media, specifically a generic photo finish media, and a generic transparency media. The match signature step 618 then determines whether the incoming data 616 corresponds more closely to a generic photo finish data, or a generic transparency data according to a gross sorting routine. An output 624 of the match signature step 618 is supplied to a comparison step 626, which asks whether the match signature output signal 624 corresponds to a transparency. If not, a NO signal 628 is issued to a glossy photo or a matte photo branch 630.

However, if the match signature output 624 corresponds to a transparency, then the comparison step 626 issues a YES signal 632. For the yes transparency signal 632 is received by a ratio generation step 634. In response to receiving the YES signal 632, the ratio generation step 634 receives the average specular (A) signal 542, and the average diffuse (B) signal 545 from the massage data routine 504. From these incoming signals 542 and 545, the ratio generation step 634 then generates a ratio of the diffuse average to the specular average (B/A) multiplied by 100 to convert the ratio to a percentage, which is supplied as a ratio output signal 635. In a comparison step 636, the value of the ratio signal 635 is compared to determine if the ratio B/A as a percentage is less than a value of 80 per cent (with the "%" sign being omitted in FIG. 20 for brevity). If not, the comparison step 636 issues a NO signal 638 to the glossy photo or matte photo branch 630.

Thus, the average specular and diffuse data are used as a check to determine whether the transparency determination was correct or not. If the ratio that the diffuse averaged to the specular average is determined by step 636 to be less than 80, a YES signal 640 is then supplied to a verification step 642. The verified step 642 may be performed as described above with respect to FIG. 18. During this verification routine, an assumption is made according to step 560 that the media in the printzone is a transparency, and if the verification routine 642 determines that it indeed is, a YES signal 644 is issued. The YES signal 644 is received by a select transparency mode step 646, which issues a transparency print signal 648 to initiate a transparency step 650. The print mode selected by step 646 corresponds to a "4,0" print mode, here selecting the default value for a transparency.

If a Hewlett-Packard transparency is identified, as described above with respect to FIG. 13, then a custom print mode may be employed for the specific HP transparency media, as described above with respect to the basic media determination system 400, resulting in a "4,1" print mode. If the verification step 642 determines that the media in the printzone is not a transparency, then a NO signal 652 is issued. Upon receiving the NO signal 652, a select default step 654 chooses the default premium print mode, and issues a print signal 656. Upon receiving signal 656, a print step 658 then prints upon the media according to the generic premium media print mode "2,0".

Figure 21:
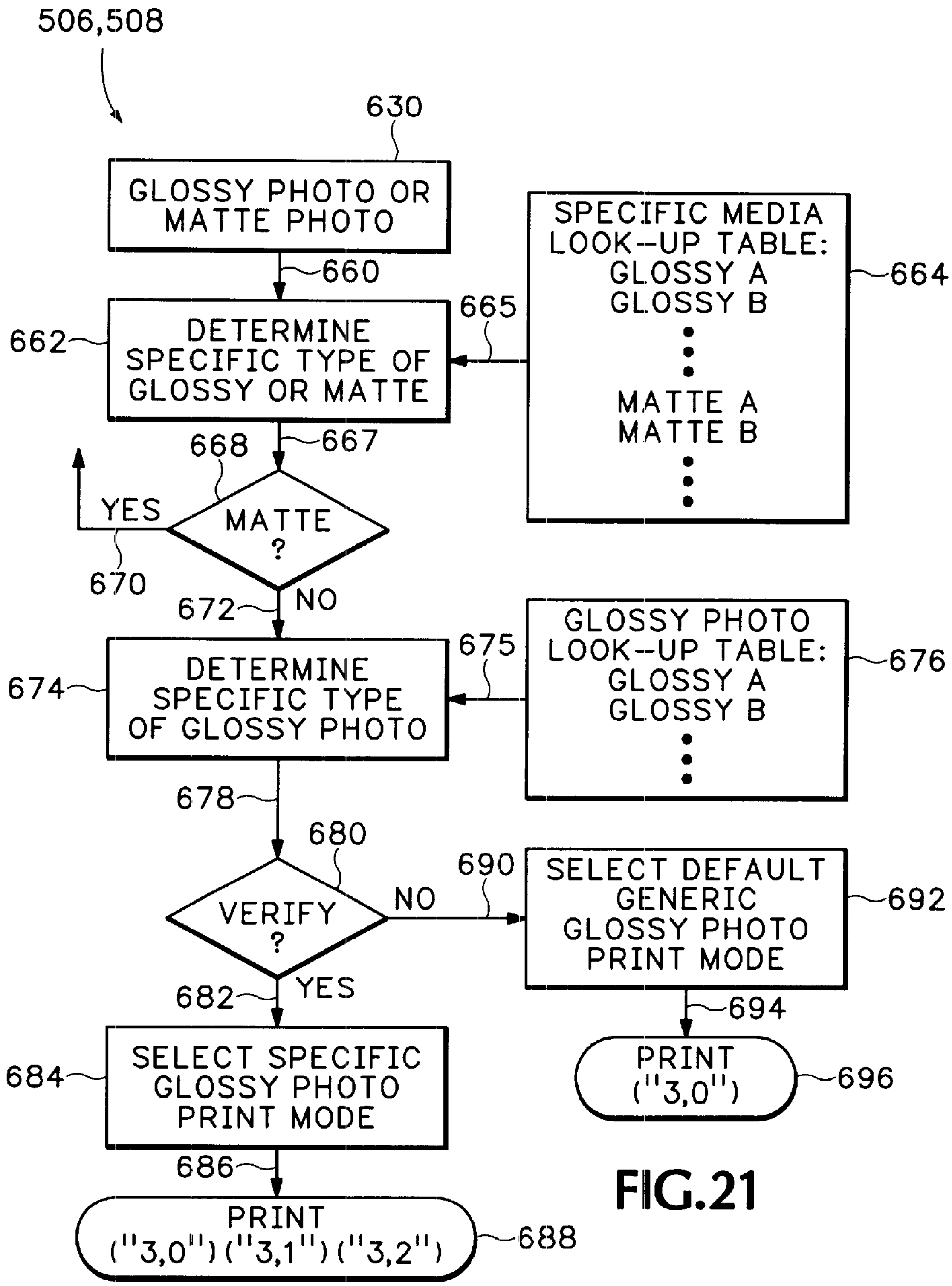

FIG. 21 begins with the glossy photo or matte photo branch 630 from FIG. 20, which issued an output signal 660, carrying through the massaged specular and diffuse spatial frequency data (S and D) signals 556 and 558. This input signal 660 is received by a determination step 662 which determines whether the incoming data 660 corresponds to a specific type of glossy media or a specific type of matte photo media. To accomplish this, a specific media look-up table 664 provides an input signal 665 to the determination step 662. Table 664 contains reference data corresponding to the specular and diffuse spatial frequencies corresponding to various types of glossy photo media and matte photo media, illustrated in table 664 as "glossy A", "glossy B", and so on through "matte A", "matte B", and so on. Several types of glossy photo media and matte photo media were described above with respect to Table 2.

Figure 22:
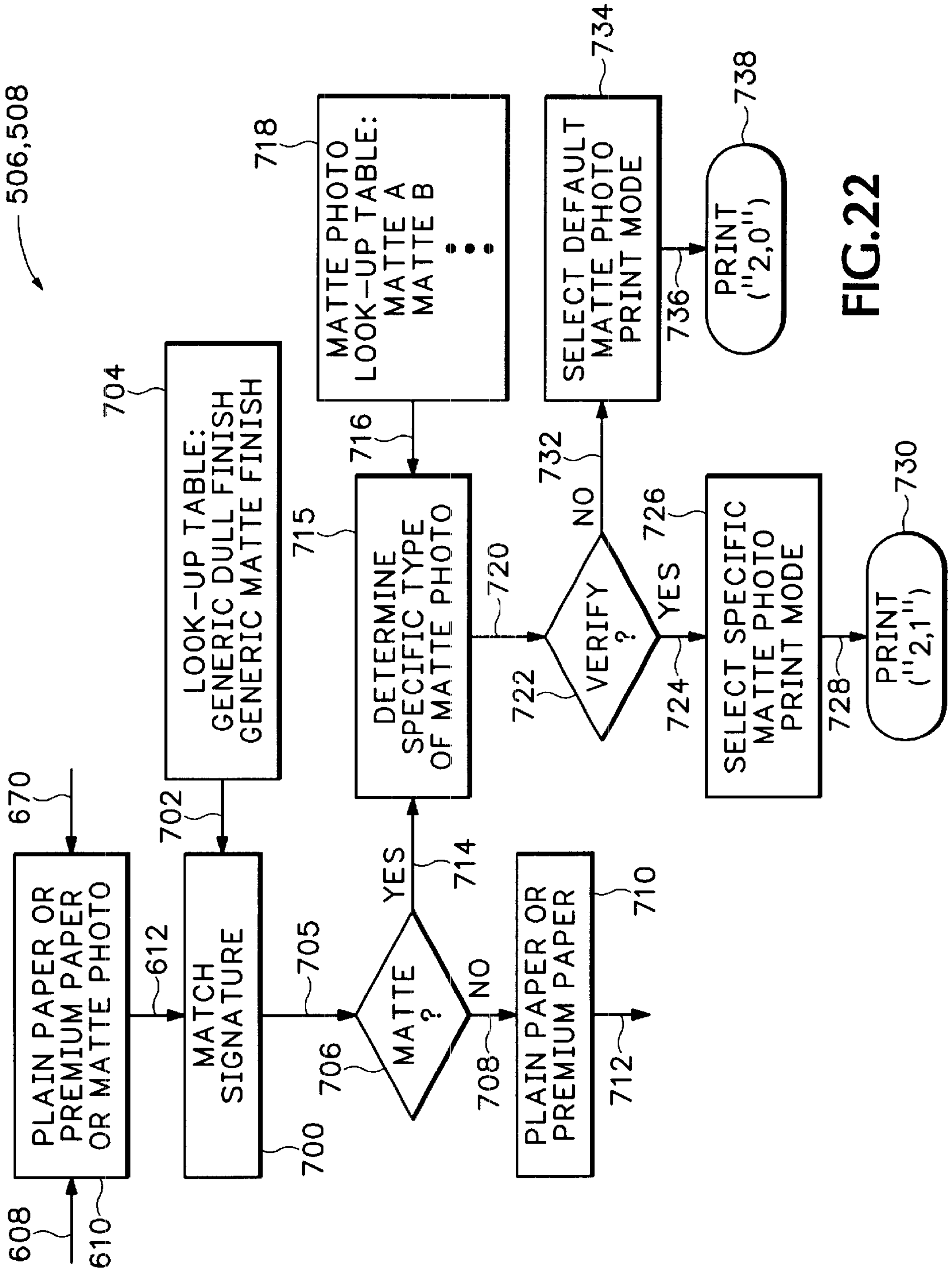

Once the determination step 662 finds a suitable match from the values stored in table 664, an output signal 667 is issued to a comparison step 668. The comparison step 668 asks whether the incoming signal 667 is for a matte photo media. If so, a YES signal 670 is issued. The YES signal 670 is then delivered to the plain paper/premium paper/matte photo branch 610, as shown in FIGS. 20 and 22. If the comparison step 668 finds that the output of determination step 662 does not correspond to a matte photo, then a NO signal 672 is issued. The NO signal 672 delivers the specular and diffuse spatial frequency data to another determination step 674. Step 674 determines which specific type of glossy photo media is entering the printzone 25 using data received via signal 675 from a glossy photo look-up table 676. While tables 664 and 676 are illustrated in the drawings as two separate tables, it is apparent that the determination step 674 could also query table 664 to obtain glossy photo data for each specific type.

After step 674 determines which specific type of glossy photo media is in the printzone 25, a signal 678 is issued to a verification routine 680 which proceeds to verify the assumption as described above with respect to FIGS. 18 and 19. If the verification routine 680 finds that the determination step 674 is correct, a YES signal 682 is issued to a select specific glossy photo print mode step 684. The selection step 684 generates a print mode signal 686 which initiates a print step 688. The printing step 688 then prints upon the sheet of glossy photo media using the print mode corresponding to the selected media, here according to "3,0" print mode for Gossimer media, a "3,1" print mode for the combination media, and a "3,2" print mode for the very glossy photo media.

If the verification routine 680 finds that the determination step 674 was wrong regarding the specific type of glossy photo selected, a NO signal 690 is issued. In response to receiving the NO signal 690, a select default step 692 selects a generic glossy photo print mode and issues signal 694 to a print step 696. The print step 696 then prints upon the media according to a generic print mode, here selected as "3,0" print mode.

Traveling now to FIG. 22, we see the plain paper/premium paper/matte photo branch 610 receiving an input signal 608 from FIG. 20, and another input signal 670 from FIG. 21. Both signals 608 and 670 carry the specular and diffuse spatial frequency data for the media entering printzone 25. In response to receiving either signal 608 or 670, the branch 610 issues an output signal 612 carrying the spatial frequency data to a match signature routine 700. The match signature routine 700 reviews reference data 702 received from a look-up table 704 where data is stored for a generic dull finish media and a generic matte photo finish media. When the matching step 700 has completed analyzing the incoming data 612 with respect to the data 702 stored in table 704, an output signal 705 is issued.

A comparison step 706 reviews the output signal 705 to determine whether the matching step 700 found the incoming media to have a matte finish. If not, the comparison step 706 issues a NO signal 708 which is delivered to a plain paper/premium paper branch 710. In response to receiving the NO signal 708, branch 710 issues an output signal 712 which transitions to the last portion of the major and specific type determination routines 506, 508 shown in FIG. 23. Before leaving FIG. 22 we will discuss the remainder of the steps shown there.

If the comparison step 706 determines that the matching step 700 found the incoming media to have a matte finish, a YES signal 714 is issued. A determination step 715 receives the YES signal 714, and then determines which specific type of matte photo media is entering the printzone 25. The determining step 715 receives a reference data signal 716 from a matte photo look-up table 718, which may store data for a variety of different matte photo medias. Note that while table 718 is shown as a separate table, the determination step 715 could also consult the specific media look-up table 664 of FIG. 21 to obtain this data. Note that for the purposes of illustration, data is shown in both tables 664 and 718 for a "Matte A" and "Matte B" media, to date the characteristics for only a single matte photo media has been identified, and further research is required to generate reference data to allow identification of other types of matte photo media.

Following the completion of the determination step 715, an output signal 720 is issued to a verification routine 722. If the verification routine 722 determines that the correct type of matte photo media has been identified, a YES signal 724 is issued. In response to the YES signal 724, a selecting step 726 chooses which specific matte photo print mode to use, and then issues a signal 728 to a printing step 730. The printing step 730 then uses a "2,1" print mode when printing on the incoming sheet. If the verification routine 722 finds that the determination step 715 was in error, a NO signal 732 is issued. A selecting step 734 responds to the incoming NO signal 732 by selecting a default matte photo print mode. After the selection is made, step 734 issues an output signal 736 to a printing step 738. In the printing step 738, the media is then printed upon using the default print mode, here a "2,0" print mode which corresponds to the default print mode for premium paper in the illustrated embodiment.

Figure 23:
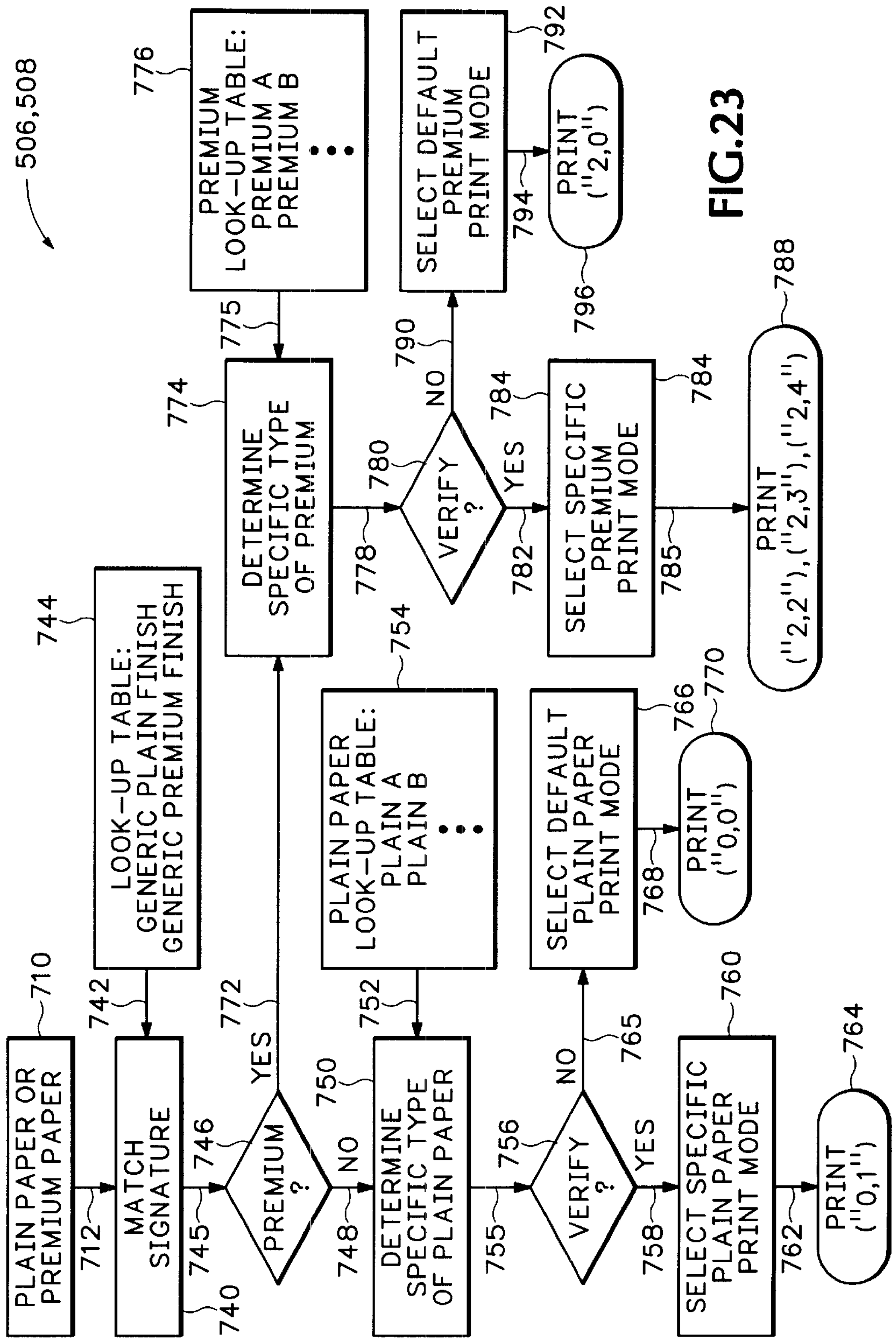

Turning now to FIG. 23, the plain paper/premium paper branch 710 is shown issuing an output signal 712 which includes data for both the specular and diffuse spatial frequency of the media entering the printzone 25. In response to receiving signal 712, a matching step 740 compares the incoming data with reference data received via a signal 742 from a look-up table 744. The look-up table 744 stores data corresponding to a generic plain finish media, and a generic premium finish media. The matching step 740 then decides whether the incoming data 712 more closely corresponds to a plain paper media, or a premium paper and issues an output signal 745. In a comparison step 746, the question is asked whether the output of the matching step 740 corresponds to a premium paper. If not, then a NO signal 748 is issued to a determination step 750.

The determination step 750 uses reference data received via a signal 752 from a plain paper look-up table 754. The look-up table 754 may store data corresponding to different types of plain paper media which have been previously studied. Once the determination step 750 decides which type of plain paper is entering the printzone, an output signal 755 is issued. A verification routine 756 receives the output signal 755 and then verifies whether or not the sheet of media entering the printzone 25 actually corresponds to the type of plain paper selected in the determination step 750. If the verification step 756 finds that a correct selection was made, a YES signal 758 is issued to a selecting step 760. In the selecting step 760, a print mode corresponding to the specific type of plain paper media identified is chosen, and an output signal 762 is issued to a printing step 764. The printing step 764 then prints on the incoming media sheet according to a "0,1" print mode.

If the verification step 756 finds that the determination step 750 was in error, a NO signal 765 is issued to a selecting step 766. In the selecting step 766, a default plain paper print mode is selected, and an output signal 768 is issued to a printing step 770. In the printing step 770, the incoming sheet of media is printed upon according to a "0," default print mode for plain paper.

Returning to the premium comparison step 746, if the media identified in the match signature step 740 is found to be a premium paper, a YES signal 772 is issued. In response to receiving the YES signal 772, a determination step 774 then determines which specific type of premium media is in the printzone 25. To do this, the determination step 774 consults reference data received via signal 775 from a premium look-up table 776. Upon determining which type of specific premium media is entering the printzone 25, the determination step 774 issues an output signal 778. Upon receiving signal 778, a verification step 780 is initiated to determine the correctness of the selection made by step 774. If the verification step 780 determines that yes indeed a correct determination was made by 774, a YES signal 782 is issued to a selecting step 784. The selecting step 784 then selects the specific premium print mode corresponding to the specific type of premium media identified in step 774. After the selection is made, an output signal 785 is issued to a printing step 788. The printing step 788 then prints upon the incoming sheet of media according to the specific premium print mode established by step 784, which may be a "2,2" print mode corresponding to premium media having a clay coating, a "2,3" print mode corresponding to a plain paper having a swellable polymer layer, or "2,4" print mode corresponding to a heavy greeting card stock, in the illustrated embodiments.

If the verification step 780 finds that the determination step 774 was in error, a NO signal 790 is issued to a selecting step 792. In the selecting step 792, a default premium print mode is selected and an output signal 794 is issued to another printing step 796. In the printing step 796, the incoming sheet of media is printed upon according to a default print mode of "2,0".

8. Operation of the Media Sensor

The next portion of our discussion delves into one preferred construction of the media sensor 100 (FIG. 2) and the differences between the advanced media type detection system 500 and the earlier basic media type determination system 400.

The basic media determination system 400 only uses the diffuse reflectance information. The basic system 400 extracted more information regarding the unique reflectance properties of media by performing a Fourier transform on the diffuse data. The spatial frequency components generated by the basic method 400 characterized the media adequately enough to group media into generic categories of (1) transparency media, (2) photo media, and (3) plain paper. One of the main advantages of the basic method 400 was that it used an existing sensor which was already supplied in a commercially available printer for ink droplet sensing. A more advanced media type determination was desired, using the spatial frequencies of only the diffuse reflectance with sensor 100 was not adequate to uniquely identify the specific types of media within the larger categories of transparency, photo media and plain paper. The basic determination system 400 simply could not distinguish between specialty media, such as matte photo media, and some premium media. To make these specific type distinctions, more properties needed to be measured, and in particular properties which related to the coatings on the media surface. The manner chosen to gather information about these additional properties was to collect the specular reflectance light 200', as well as the diffuse reflectance light 200.

In the advanced media sensor 100 uses a blue-violet LED 105 which has an output shown in FIG. 3 as graph 112. In graph 112, we see the blue-violet LED 105 has a peak amplitude output at about 428 nanometers. The output also extends down to approximately 340 nanometers, into the ultraviolet range past the end of the visible range, which is around 400 nanometers, with a dominant wavelength of 464 nanometers. While the illustrated peak wavelength of 428 nanometers is shown, it is believed that suitable results may be obtained with an LED having a peak wavelength of 400–430 nanometers.

The short wavelength of the blue-violet LED 105 serves two important purposes in the collecting raw data routine 502. First, the blue-violet LED 105 produces an adequate signal from all colors of ink including cyan ink, so sensor 100 may be used for ink detection, as described in U.S. Pat. No. 6,036,298, recited in the Related Applications section above. Thus, the diffuse reflection measured by photodiode 130 of sensor 100 may still be used for performing pen alignment. The second purpose served by the blue-violet LED 105 is that the shorter wavelengths, as opposed to a 700–1100 nanometer infrared LED, is superior for detecting subtleties in the media coding, as described above with respect to Table 2.

Figure 24:
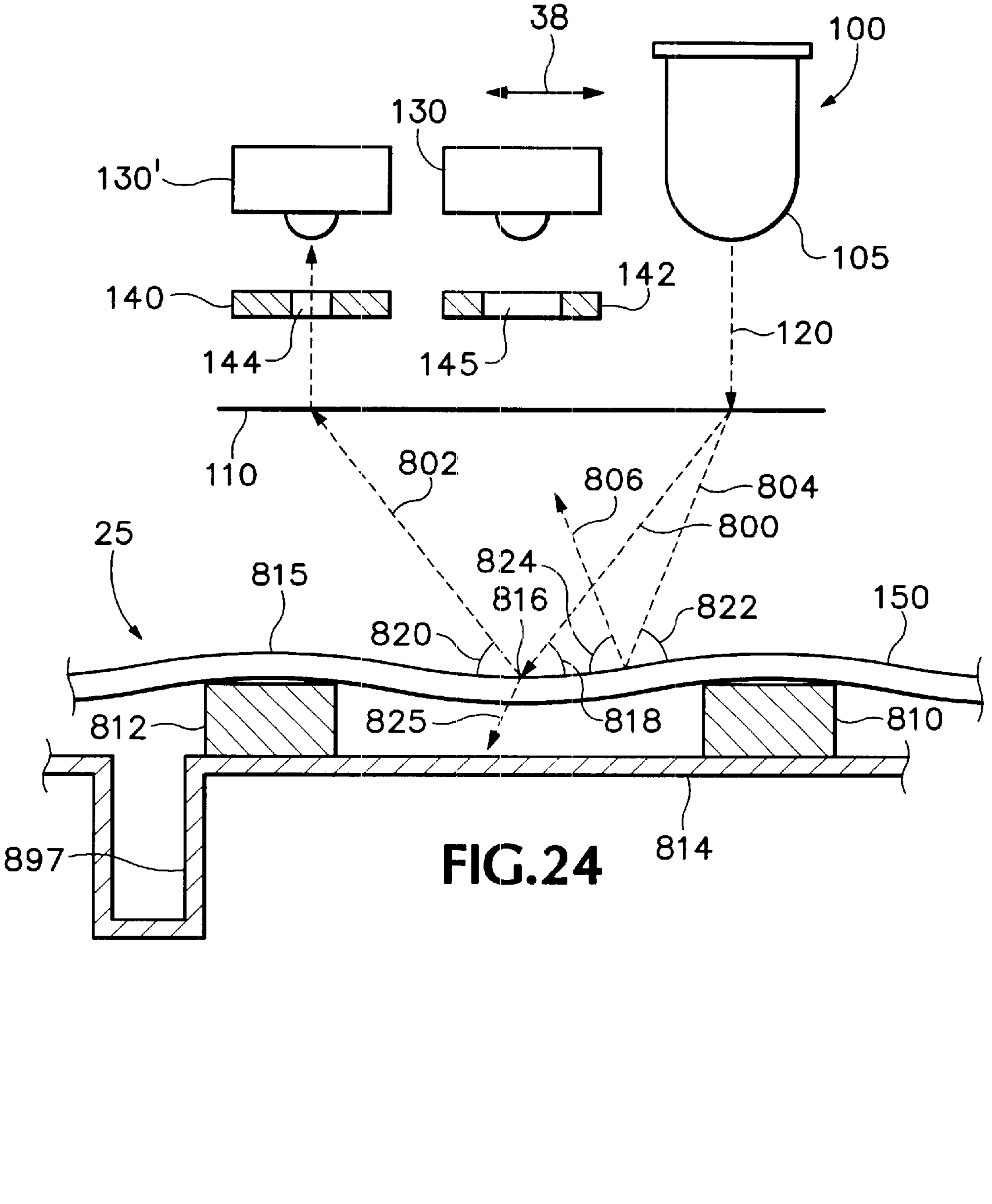
FIG. 24 is an enlarged schematic side elevational view of the media type optical sensor of FIG. 2, shown monitoring a sheet of plain paper or transparency media entering the printzone of the printer of FIG. 1.

FIG. 24 shows the media sensor 100 scanning over the top two millimeters of a sheet of media 150 entering the printzone 25. Here we see an incoming beam 800 generating a specular reflectance beam 802 which passes through the field stop window 144 to be received by the specular photodiode 130'. A second illuminating beam of light 804 is also shown in FIG. 24, along with its specular reflectance beam 806. As mentioned above, recall that the specular beam has an angle of reflection which is equal to the angle of incidence of the illuminating beam, with respect to a tangential surface of the media at the point of illumination. The sheet of media 150 is shown in FIG. 24 as being supported by a pair of cockle ribs 810 and 812, which project upwardly from a table-like portion of the platen or pivot 814. The cockle ribs 810, 812 support the media in the printzone 25, and provide a space for printed media which is saturated with ink to expand downwardly between the ribs, instead of upwardly where the saturated media might inadvertently contact and damage the printhead.

Some artistic license has been taken in configuring the views of FIGS. 24–26, 37 and 38 with respect to the orientation of the media sensor 100. The cockle ribs 810 and 812 are orientated correctly to be perpendicular to the scan axis 38; however, the LED 105 and sensors 130, 130' are oriented perpendicular to their orientation in the illustrated embodiment of printer 20. FIG. 4 shows the desired orientation of the media sensor 100 in printer 20 with respect to the XYZ coordinate axis system.

As the incoming sheet of media 150 rests on the ribs 810, 812 peaks are formed in the media over the ribs, such as peak 815, and valleys are also formed between the ribs, such as valley 816. The incoming beam 800 impacting along the valley 816 has an angle of incidence 818, and the specular reflected beam 802 has an angle of reflection 820, with angles 818 and 820 being equal. Similarly, the incoming beam 804 has an angle of incidence 822, and its specular reflected beam 806 has an angle of reflection 824, with angles 822 and 824 being equal. Thus, as the incoming light beams 800, 804 are moved across the media as the carriage 40 moves the media sensor 100 across the media in the direction of the scanning axis 38, the light beams 800, 804 traverse over the peaks 815, and through the valleys 816 which causes the specular reflectance beams 802 and 806 to modulate with respect to the specular photodiode 130'. Thus, this interaction of the media 150 with the cockle ribs 810, 812 on the media support platen 814 generates a modulating set of information which may be used by the advanced determination method 500 to learn more about the sheet of media 150 entering the printzone 25.

9. Energy Information

Information to identify an incoming sheet of media may be gleaned by knowing the amount of energy supplied by the LED 105 and the amount of energy which is received by the specular and diffuse photodiodes 130', 130. For example, assume that the media 150 in FIG. 24 is a transparency. In this case, some of the incoming light from beam 800 passes through the transparency 150 as a transmissive beam 825. Thus, the amount of energy left to be received by the diodes 130 and 130' is less than for the case of plain paper for instance. In between the plain paper and the transparency paper is the reflectance of the glossy photo media, which has a shinier surface that yields more specular energy to be received by diode 130', than diffuse energy to be received by photodiode 130.

These differences in energy are shown in Table 3 below and provide one way to do a gross sorting of the media into three major categories.

TABLE 3

Energy Received by Sensors 130 and 130'

| Media Category | Diffuse Sensor 130 | Specular Sensor 130' |
|---|---|---|
| Plain & Premium Papers | 1/2 | 1/2 |
| Glossy Photo | 1/3 | 2/3 |
| Transparency (w/o Tape) | 1/5 | 4/5 |

Furthermore, by knowing the input energy supplied by the blue-violet LED 105, and the output energy received by the specular and diffuse sensors 130 and 130', the value of the transmittance property of the media may be determined, that is the amount of energy within light beam 825 which passes through media sheet 150 (see FIG. 24). The magnitude of the transmittance is equal to the input energy of the incoming beam 800, minus the energy of the specular reflected beam 802 and the diffuse reflected beam, such as light 200 in FIG. 2. After assembly of the printer 20, during initial factory calibration, a sheet of plain paper is fed into the printzone 25, and the amount of input light energy from the LED 105 is measured, along with the levels of energy received by the specular and diffuse sensors 130' and 130. Given these known values for plain paper, the transmittance for photo paper and transparency media may then be determined as needed. However, rather than calculating the transmissivity of photo papers and transparency media, the preferred method of distinction between plain or premium paper, photo paper and transparency media is accomplished using the information shown in Table 3.

Thus in the case of a transparency, the majority of the diffuse energy travels directly through the transparency, with any ink retention layer coating over the transparency serving to reflect a small amount of diffuse light toward the photodiode 130. The shiny surface of the transparency is a good reflector of light, and thus the specular energy received by photodiode 130' is far greater than the energy received by the diffuse photodiode 130. This energy signature left by these broad categories of media shown in Table 3 may be used in steps 552 and 554 of the determination system 500. The energy ratios effectively dictate the magnitude of the frequency components. For a given diffuse and specular frequency, the energy balance may be seen by comparing their relative magnitudes.

10. Media Support Interaction Information

As mentioned above with respect to FIG. 24, interaction of the media with the printer's media support structure, here the pivot, may be used to gather information about the incoming sheet of media. In other implementations, this information may be gathered in other locations by supporting the media sensor 100 with another printing mechanism component, and backing the media opposite the sensor with a component having a known surface irregularity which imparts a degree of bending to the media, as well as changing the apparent transmissivity of the media. For instance, in plotters using media supplied in a continuous roll, a cutter traverses across the media following a print job to sever the printed sheet from the remainder of the supply roll. The sensor 100 may be mounted on the cutter carriage to traverse the media, although such a system may require the leading edge of the incoming sheet to be moved rearwardly into a top-of-form position under the printheads following scanning. Indeed, in other implementations, it may be desirable to locate the media scanner 100 remote from the printzone 25, such as adjacent the media supply tray, or along the media path between the supply tray and the printzone 25, provided that the media was located between the sensor and a backing or support member having a known surface irregularity opposite the media sensor 100.

In the illustrated printer 20, the cockle ribs 810 and 812 generate a modulating signature as the sensor 100 passes over peaks 815 and valleys 816 on the media sheet 150. The degree of bending of the media sheet 150 over the ribs 810 and 812 is a function of the media's modulus of elasticity (Young's Modulus). Thus, the degree of bowing in the media sheet 150 may be used to gather additional information about a sheet entering the printzone 25.

For example, some premium media have the same surface properties as plain paper media, such as the greeting card media and adhesive-backed sticker media. However, both the sticker media and the greeting card media are thicker than convention plain paper media so the bending signatures of these premium medias are different than the bending signature of plain paper. In particular, the spatial frequency signatures are different at the lower end of the spatial frequency spectrum, particularly in the range of 1.4 to 2.1 cycles per inch. In this lower portion of the spatial frequency spectrum, lower amplitudes are seen for the thicker premium media as well as for glossy photo and matte photo medias. Thus, the signature imparted by the effect of the cockle ribs

810, 812 may be used to distinguish premium media and plain paper, such as in steps 710 of the determination system 500. It is apparent that other printing mechanisms using different media support strategies in the printzone 25, other than ribs 810 and 812 or other configurations of media support members may generate their own unique set of properties which may be analyzed to impart a curvature to the media at a known location (S) and this known information then used to study the degree of bending imparted to the different media types.

11. Surface Coating Information

Figure 25:
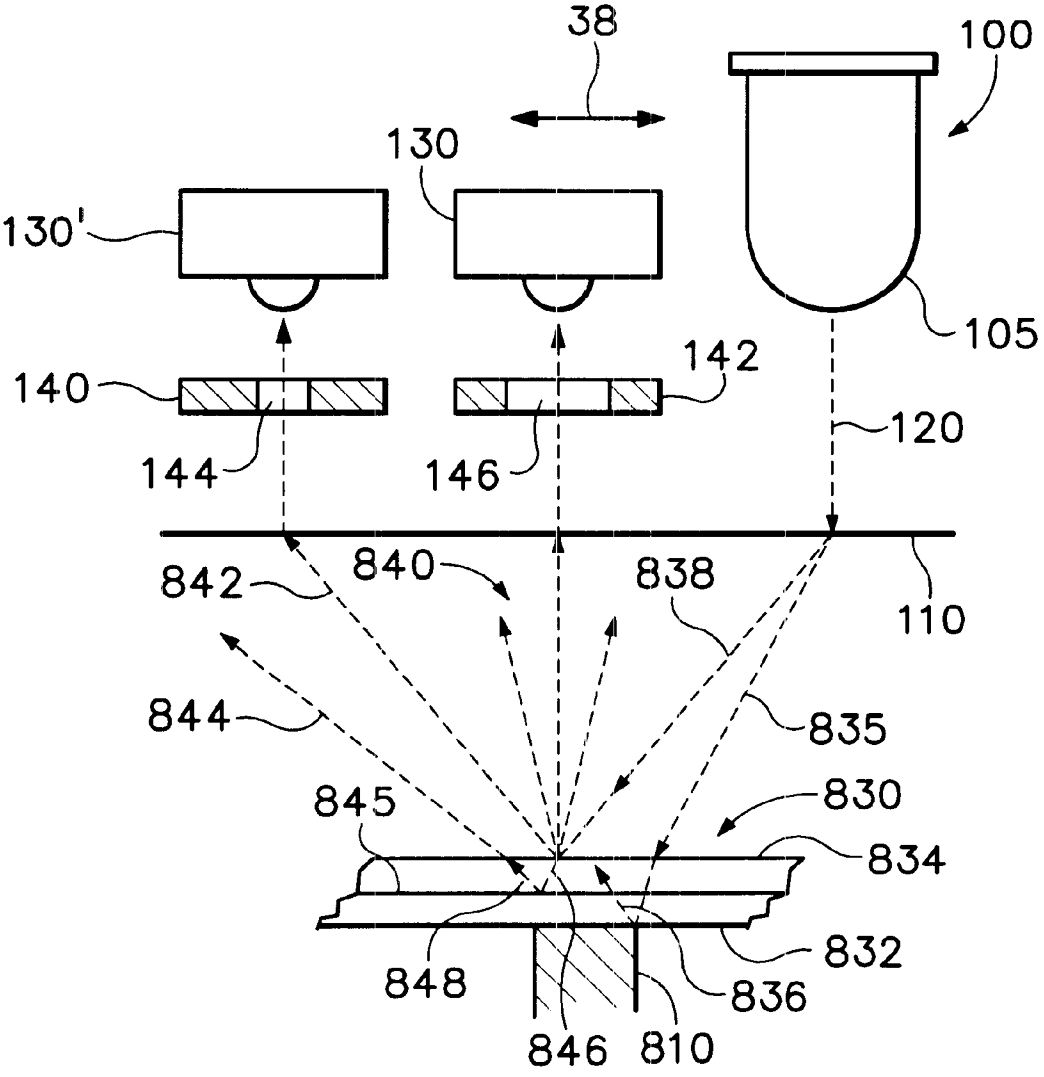
FIG. 25 is an enlarged schematic side-elevational view of the media type sensor of FIG. 2, shown monitoring a sheet of photo media with a uniform coating entering the printzone of the printer of FIG. 1.

While the effect of the cockle ribs 810, 812 is manifested in the lower spatial frequencies, such as those lower than approximately 10 cycles per inch, the effect of the surface coatings is seen by analyzing the higher spatial frequencies, such as those in the range of 10–40 cycles per inch. FIG. 25 illustrates a coated sheet of media 830, having a backing sheet or substrate 832 and a coating 834, such as an ink retention layer of a swellable material, or of a porous material, several examples of which are discussed above with respect to Table 2. In FIG. 25, we see one incoming light beam 835 which travels through the coating layer 834 and the substrate 832, and is reflected off of the rib 810 as a specular reflected beam 836. Another incoming beam 838 from the blue-violet LED 105 is shown generating three different types of reflected beams: (1) a group of diffuse beams 840 which are received by the diffuse sensor 130, (2) an upper surface reflected specular beam 842 which is received by the specular sensor 130', and (3) a boundary layer specular reflected beam 844 which is formed when a portion of the incoming beam 838 goes through the coating layer 834 and reflects off a boundary 845 defined between the substrate 832 and the coating layer 834. This boundary 845 may also be considered to be the upper surface of the substrate layer 832.

The characteristics provided by the boundary reflected beam 844 may be used to find information about the type of coating 834 which has been applied over the substrate layer 832. For example, the swellable coatings used on the glossy photo media and the slightly glossy premium media described above with respect to Table 2 are typically plastic polymer layers which are clear, to allow one to see the ink droplets trapped inside the ink retention layer 834. Different types of light transmissive solids and liquids have different indices of refraction, which is a basic principle in the study of optics. The index of refraction for a particular material, such as glass, water, quartz, and so forth is determined by the ratio of the speed of light in air versus the speed of light in the particular media. That is, light passing through glass moves at a slower rate than when moving through air. The slowing of the light beam entering a solid or liquid is manifested as a bending of the light beam at the boundary where the beam enters the media, and again at the boundary where the light beam exits the optic media. This change can be seen for a portion 846 of the incoming light beam 838. Rather than continuing on the same trajectory as the incoming beam 838, beam 846 is slowed by travel through the coating layer 834 and thus progresses at a more steep angle toward the boundary layer 845 than the angle at which the incoming beam 838 encountered the exterior surface of coating layer 834. The angle of incidence of the incoming beam 846 is then equal to the angle of reflection of the reflected beam 848 with respect to the boundary layer 845. As the reflected beam 848 exits the coating layer 834, it progresses at a faster rate in the surrounding air, as indicated by the angle of the remainder of reflected beam 844.

Now that the index of refraction is better understood, as the ratio of the speed of light in air versus the speed of light in a particular medium, this information can be used to discover properties of the coating layer 834. As mentioned above, "dispersion" is the change in the index of refraction with changes in the wavelength of light. In plastics, such as the polymer coatings used in the glossy photo media and some premium medias, this dispersion increases in the ultra-violet light range. Thus, the use of the blue-violet LED 105 instead of the blue LED 120 advantageously accentuates this dispersion effect. Thus, this dispersion effect introduces another level of modulation which may be used to distinguish between the various types of glossy photo media as the short wavelength ultra-violet light (FIG. 3) accentuates the change in the angle of the exiting beam 844, and this information is then used to distinguish specific photo glossy medias. This modulation of the dispersion may be used in step 574 of the media determination system 500.

Note in FIG. 24, that the transmissive beam 825 has been drawn with a bit of artistic license, in the fact that the angle of incidence has been ignored as the transmissive beam 825 is shown going straight through the sheet 150, although it is now better understood that a more correct illustration which show a steeper path through the sheet of media than through the surrounding air. Before moving on, one further point should be noted concerning the effect of the ribs 810, 812 on the information collected by the media sensor 100. FIG. 24 shows the transmissive beam 825 traveling through the sheet of media 150 between ribs 810 and 812, whereas FIG. 25 shows an incoming beam 835 being reflected off of rib 810 as the specular reflected beam 836. While the media shown in FIG. 25 is a coated substrate, even plain paper will reflect light off of the ribs 810 as shown for beam 836. Thus, more light is seen by the specular sensor 130' when the sensor 100 passes over a rib 810, 812 then the amount of light received when the sensor 100 passes through a valley 816 between the ribs. The lower energy received when traversing a valley 816 is due to the fact that not all of the energy supplied by the incoming beam 800 is reflected to sensor 130' at 802, because some of the incoming energy passes through the media 150 in the form of the transmissive beam 825. Thus, the variations in energy levels received by the specular sensor 130' varies with respect to the presence or absence of ribs 810, 812.

Figure 26:
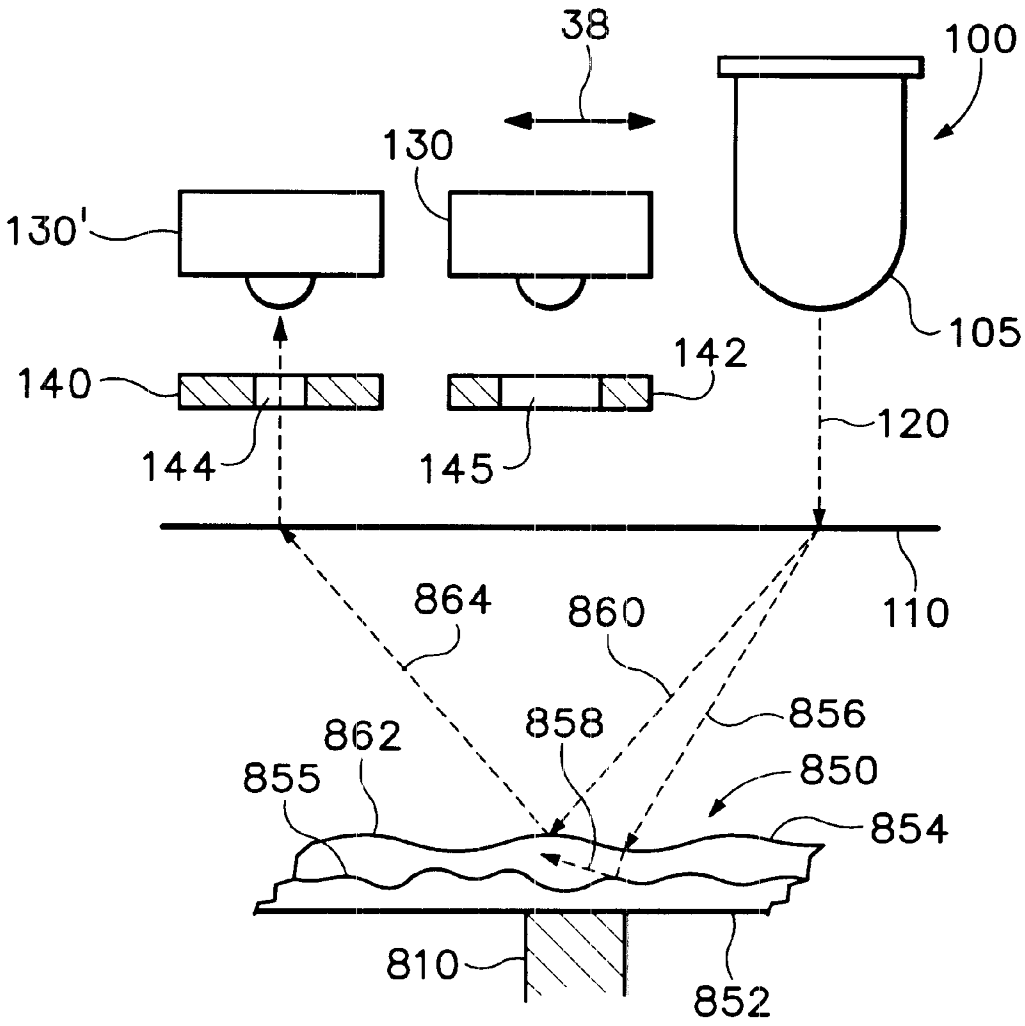
FIG. 26 is an enlarged schematic side-elevational view of the media type sensor of FIG. 2, shown monitoring a sheet of photo media with an irregular coating entering the printzone of the printer of FIG. 1.

FIG. 26 illustrates two other methods by which the various types of media may be classified using the determination system 500. In FIG. 26 we see a multi-layered sheet of media 850, which has a backing or substrate layer 852 and a clear swellable coating layer 854. Here we see a substrate layer 852 which has a rough surface, forming a rough boundary 855 between the coating layer 854 and the substrate 852. Depending upon at which point an incoming beam of light 856 impacts the boundary layer 855, the resulting reflected specular beam 858 has a high modulation as the beam traverses over the rough boundary layer 855 as moved by carriage 40 parallel to the scanning axis 38. The media 850 in FIG. 26 has a rough backing layer, whereas the illustrated media 830 in FIG. 25 has a backing layer which performs a smooth internal boundary 845. As described above with respect to Table 2, Gossimer media has a swellable polymer coating which is applied over a polymer photo substrate, with the substrate having a smooth surface more resembling media 830 of FIG. 25. The very glossy media which has two layers of a polymer coating over a plastic backing substrate also has a smooth boundary layer 845 as shown in FIG. 25. However, the combination photo media has the same polymer coating as the Gossimer media, but this coating is applied over a photo paper, which may have rougher boundary more closely resembling boundary layer 855 in FIG. 26. Thus, this information about the boundary layer 855 may be used to distinguish between specific types of photo media, such as in step 674 (FIG. 21) of the determination system 500.

The other phenomenon that may be studied with respect to FIG. 26 is the characteristics of the specular beam reflecting off of the upper surface of the coating layer 854. In FIG. 26, an incoming light beam 860 is shown reflecting off of an upper surface 862 of the coating layer 854, to produce a specular reflected beam 864. As mentioned above, the ink retention layers formed by coatings, such as coating 854 are clear layers, which are typically applied using rollers to spread the coating 854 over the substrate 852. In the medias under study thus far, it has been found that different manufacturers use different types of rollers to apply these coating layers 854. The uniqueness of each manufacturer's rollers imparts a unique signature to the upper surface 862 of the coating layer 854. That is, during this coating application process, the rollers create waves or ripples on the surface 862, as shown in FIG. 26. These ripples along the coating upper surface 862 have low magnitude, high frequency signatures which may be used to distinguish the various glossy photo media types.

Alternatively, rather than looking for specific modulation signatures in the specular spatial frequency graph, the ripples formed in the upper surface 862 also impart a varying thickness to the ink retention layer 854. This varying thickness in the coating layer 854 produces changes in the boundary reflected beam 858, as the incoming beam 856 and the reflected beam 858 traverse through varying thicknesses of the ink retention layer 854. It should be noted here, that the swellable coatings on the photo medias, such as the Gossimer media, the combination media, and the very glossy photo media experience this rippling effect along the coating upper surface 862. In contrast, the porous coatings used on the premium medias, such as the matte photo media, or the clay coated media are very uniform coatings, having substantially no ripple along their upper surfaces, as shown for the media sheet 830 in FIG. 25. Thus, the surface properties of the coatings may be used to distinguish the swellable coatings which have a rippled or rough upper surface from the porous premium coatings which have very smooth surface characteristics. The one exception in the premium category of Table 2 is the slightly glossy media which has a swellable ink retention layer like coating 854 of FIG. 26, but which is applied over a plain paper. This slightly glossy media having a swellable ink retention layer (IRL) applied over plain paper may be distinguished from media having a swellable IRL over photo paper by comparing the rough nature of the plain paper and with the smoother surface of the photo paper at the boundary layer 855 in FIG. 26. Alternatively, the peaks 815 and valleys 816 formed by ribs 810 and 812 may be used to make this distinction, knowing that the photo paper substrate is stiffer and bends less than the plain paper substrate when traveling through the printzone 25, yielding different reflectance signatures.

Another advantage of using the ultra-violet LED 105, is that refraction through the polymer coating layers 834, 854 increases as the wavelength of the incoming light beams decreases. Thus, by using the shorter wavelength ultra-violet LED 105 (FIG. 3), the refraction is increased. As the thickness of the coating 854 thickens, or the index of the refraction varies, for instance due to composition imperfections in the coating, the short wavelength ultra-violet light refracts through a sufficient angle to move in and out of the field of view of the specular sensor 130'. As shown in FIGS. 4, 24 and 25–26, the specular field stop 140 has the window 144 oriented with the minor axis 149 aligned along a central axis of the sensor 100. Thus, the specular field stop 140 provides a very small field of view in the axis of illumination, which is shown parallel to the page in FIGS. 24–26. Thus, this modulation of the specular reflected beams 802, 858 and 864 is more acutely sensed by the specular photodiode 130' as these beams move in and out of the field stop window 144.

12. Raw Data Analysis

Now it is better understood how the advanced media determination system 500 uses the data collected by the media sensor 100, several examples of raw data collected for various media types will be discussed with respect to FIGS. 27–33. The next section will discuss the resulting Fourier spectrum components which are generated from this raw data in the massaging data routine 504.

Figure 27:
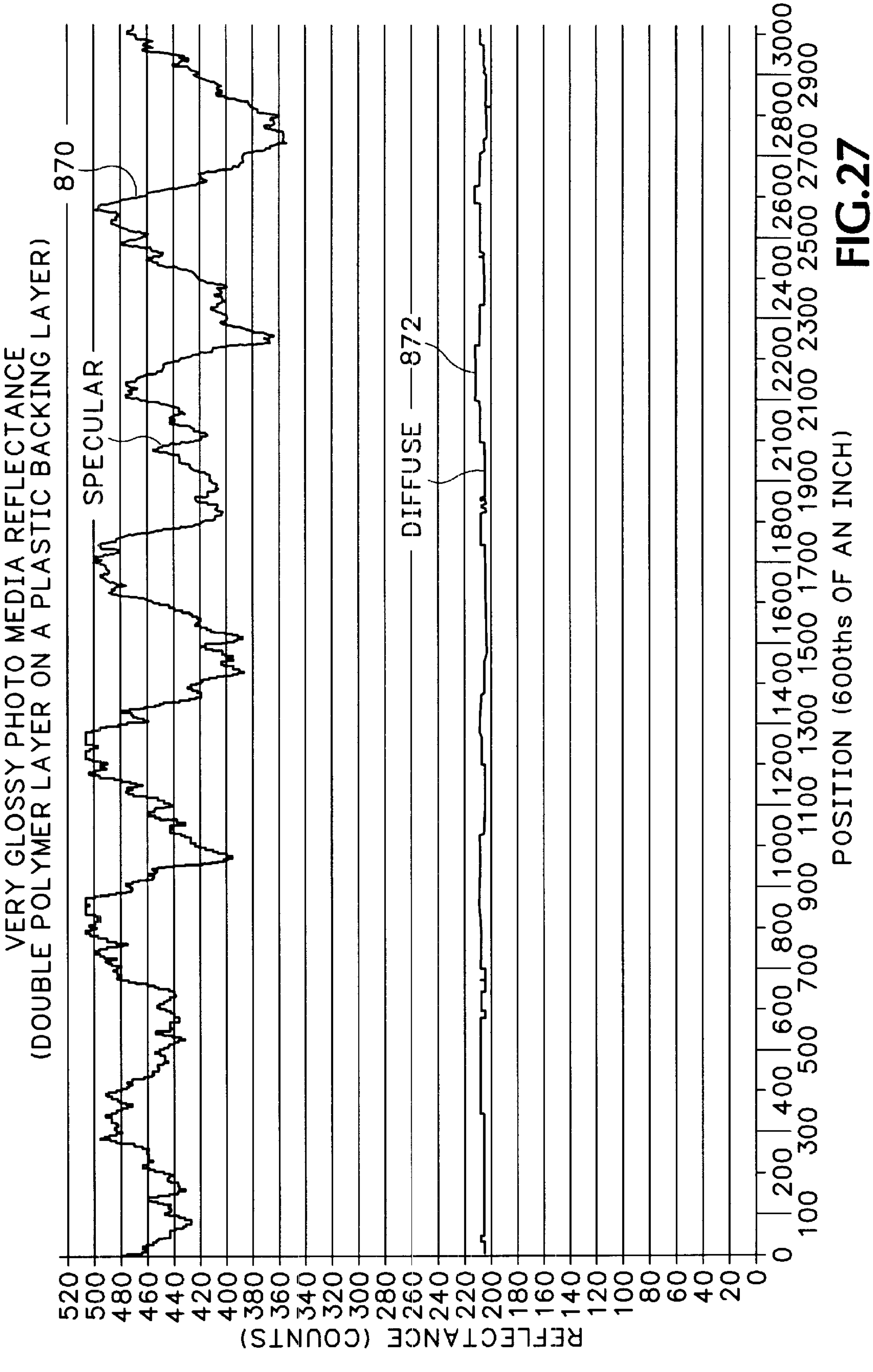
Figure 28:
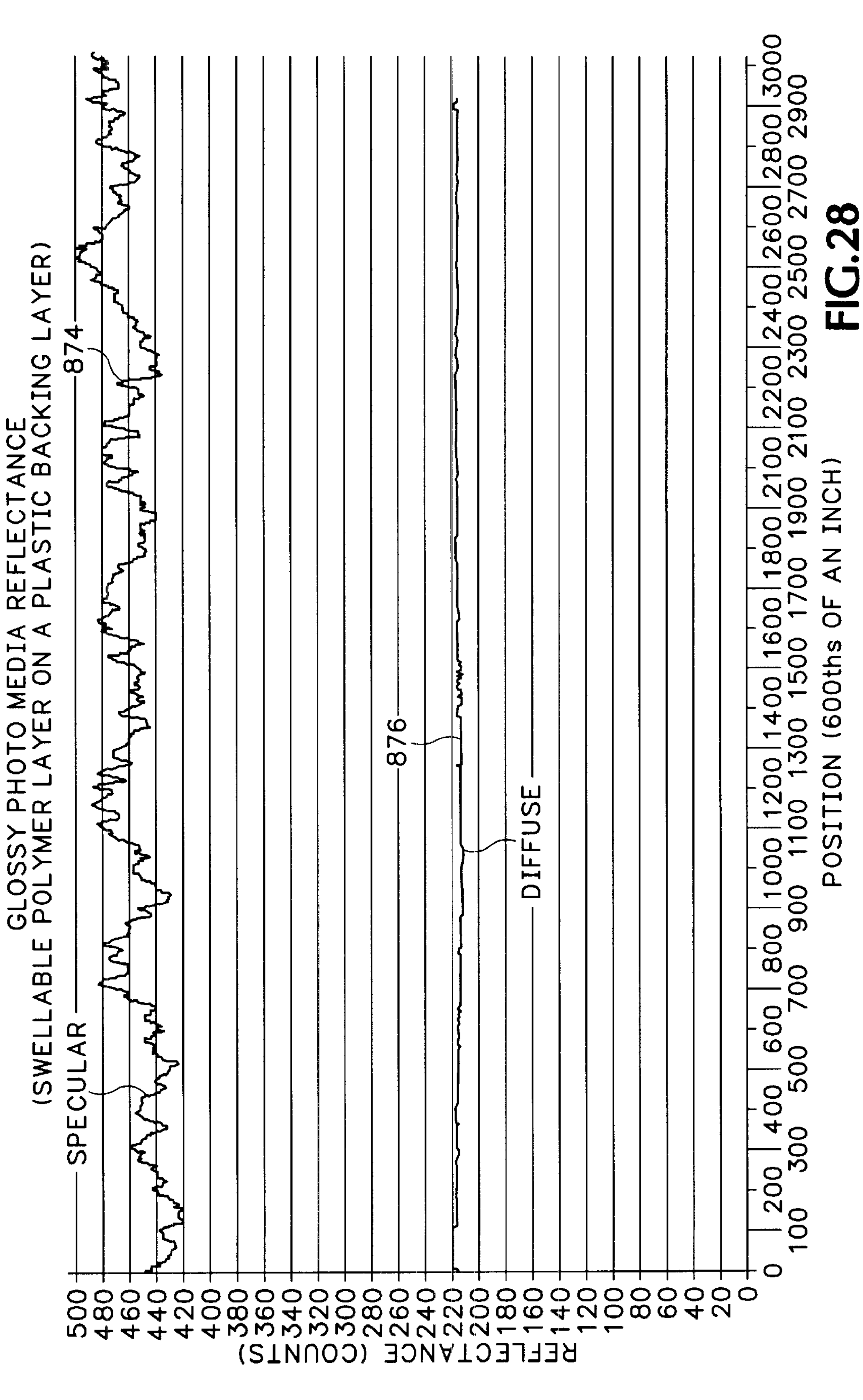
Figure 29:
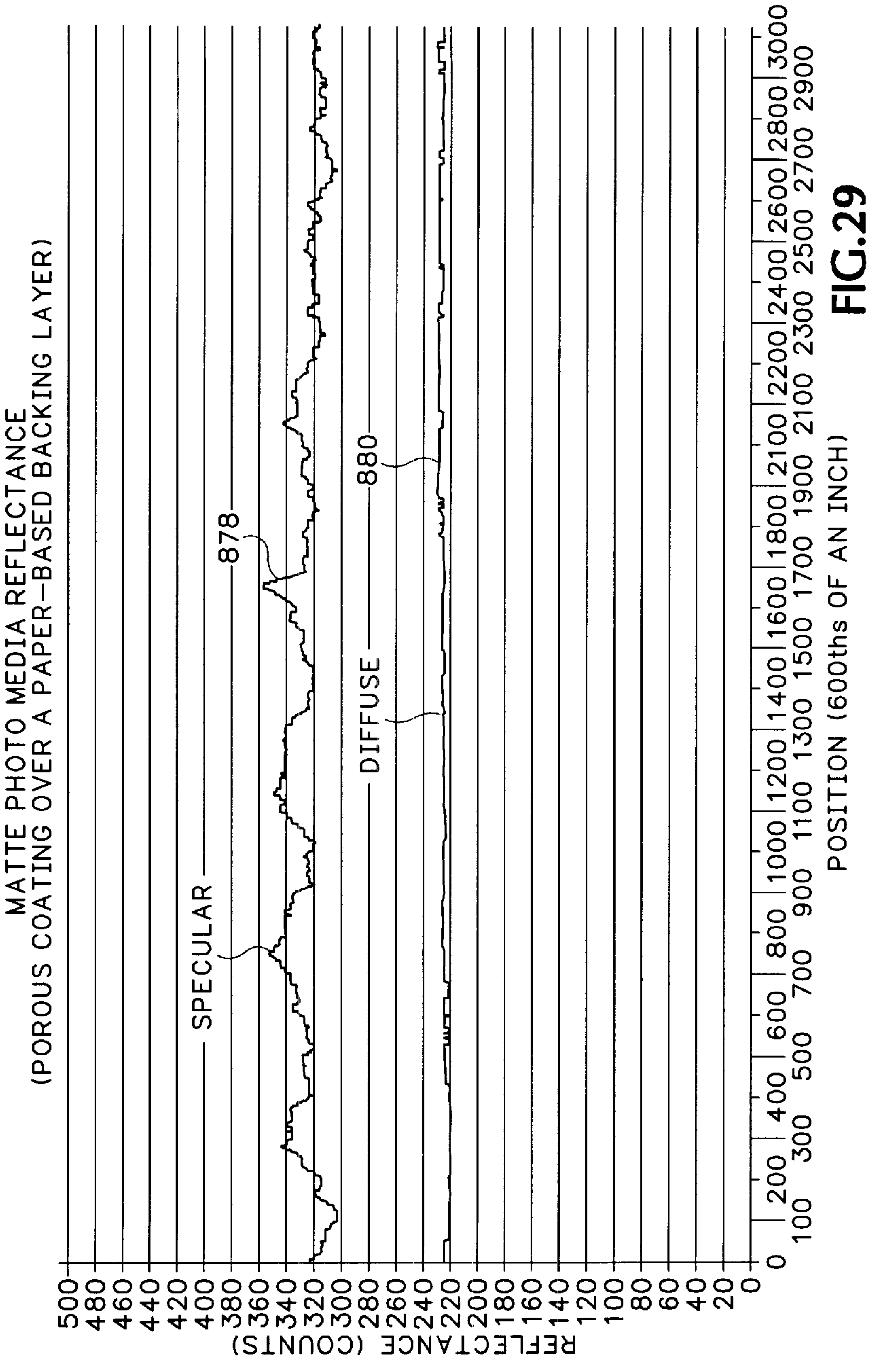
Figure 30:
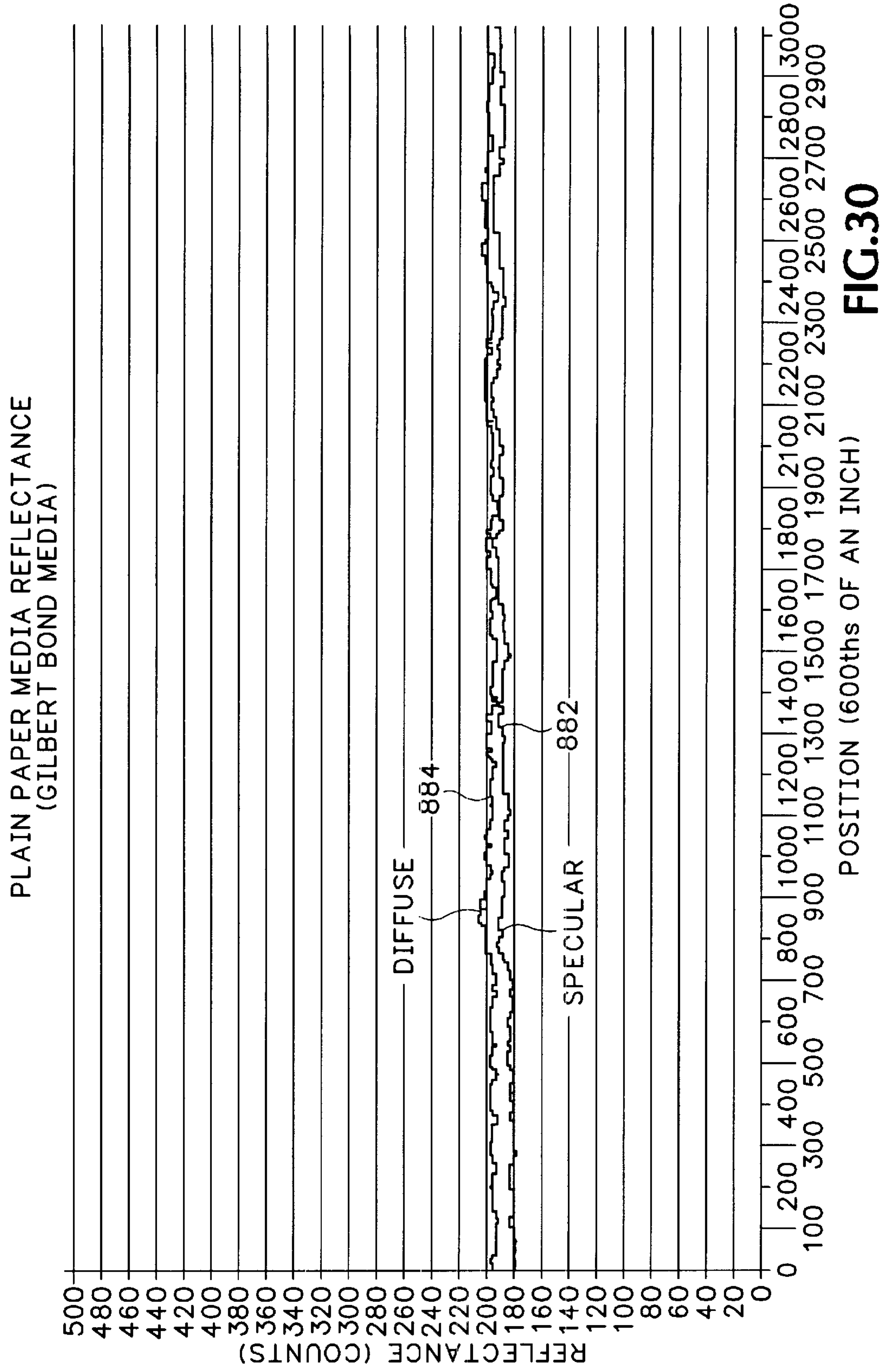
Figure 31:
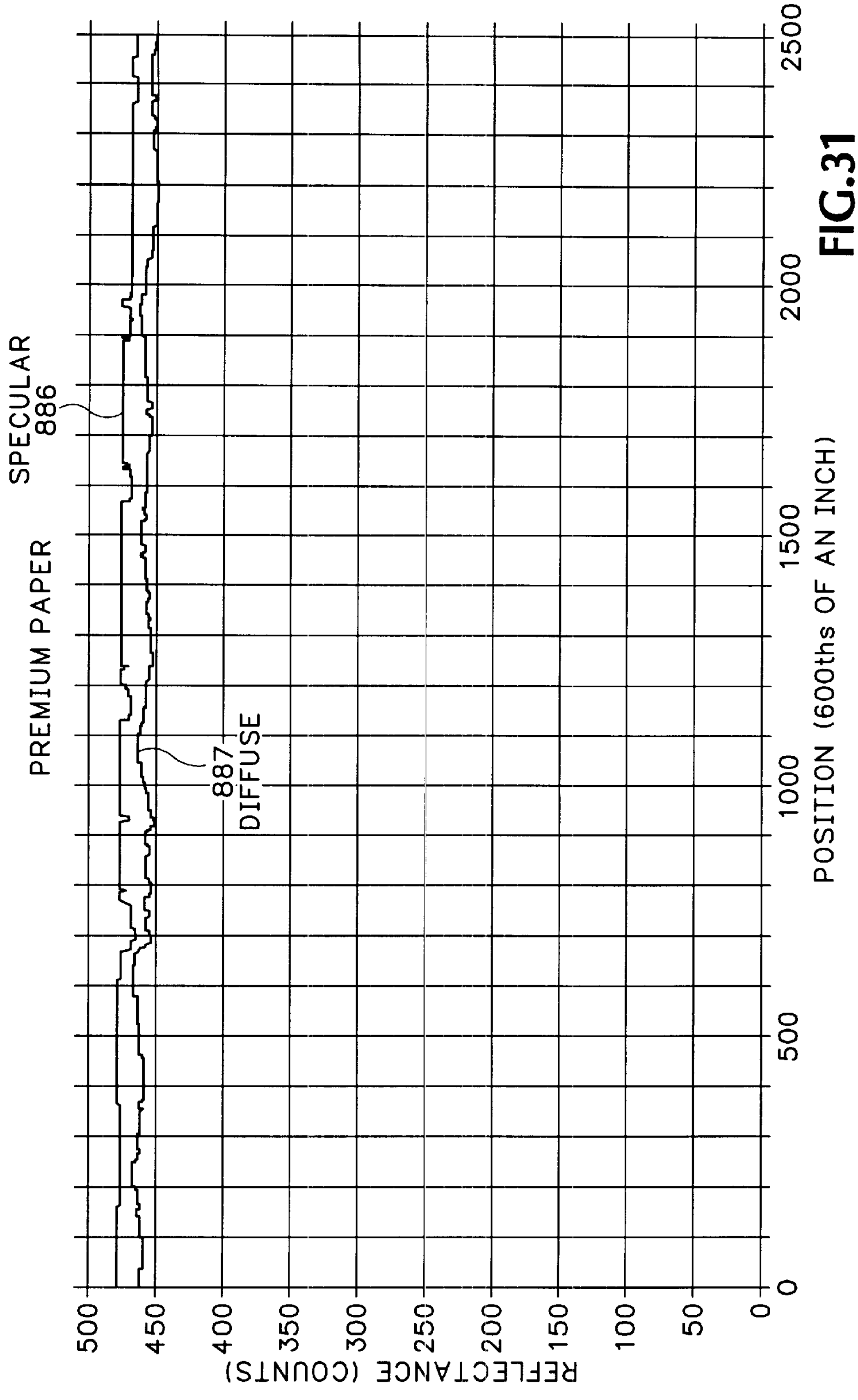
Figure 32:
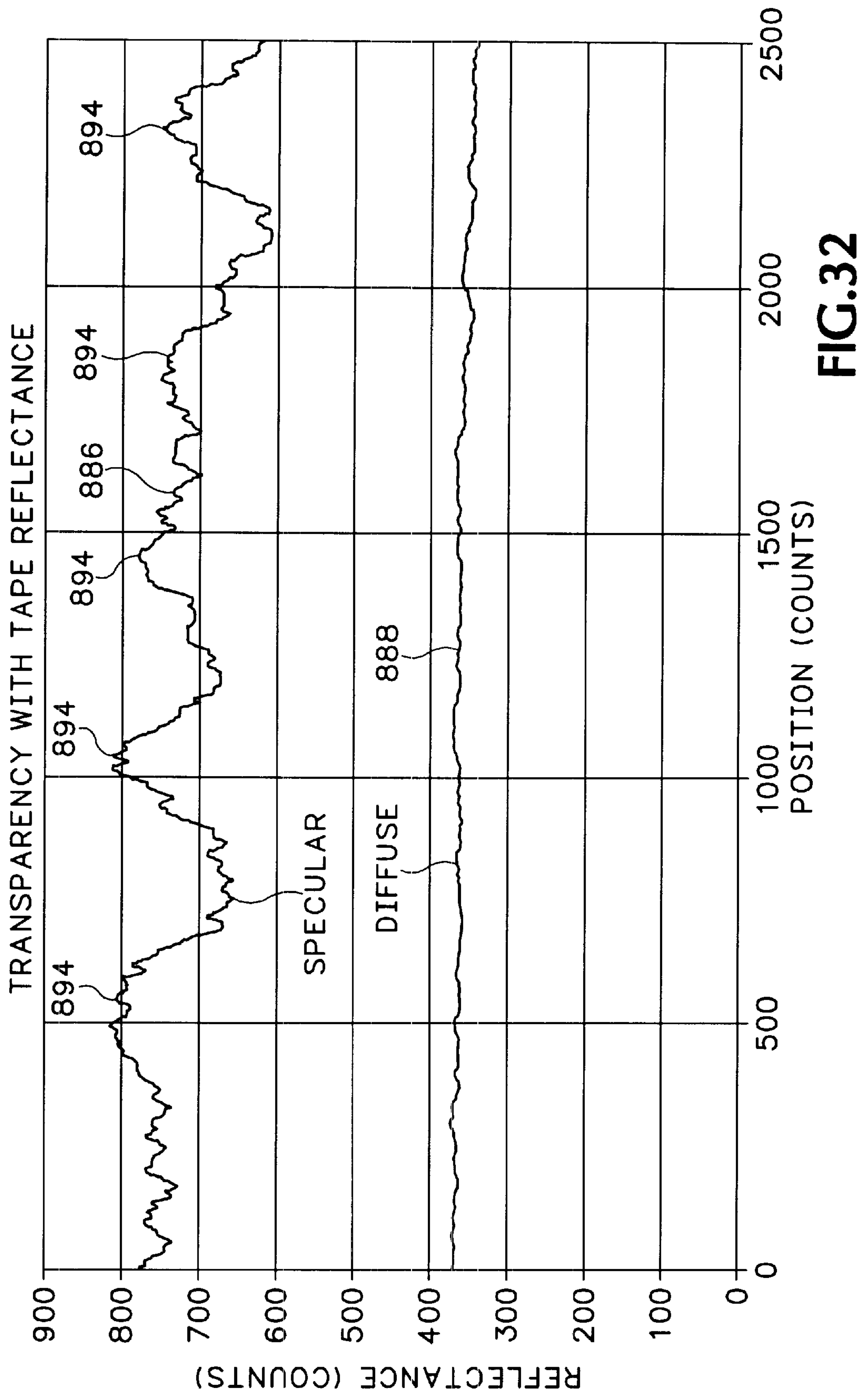
Figure 33:
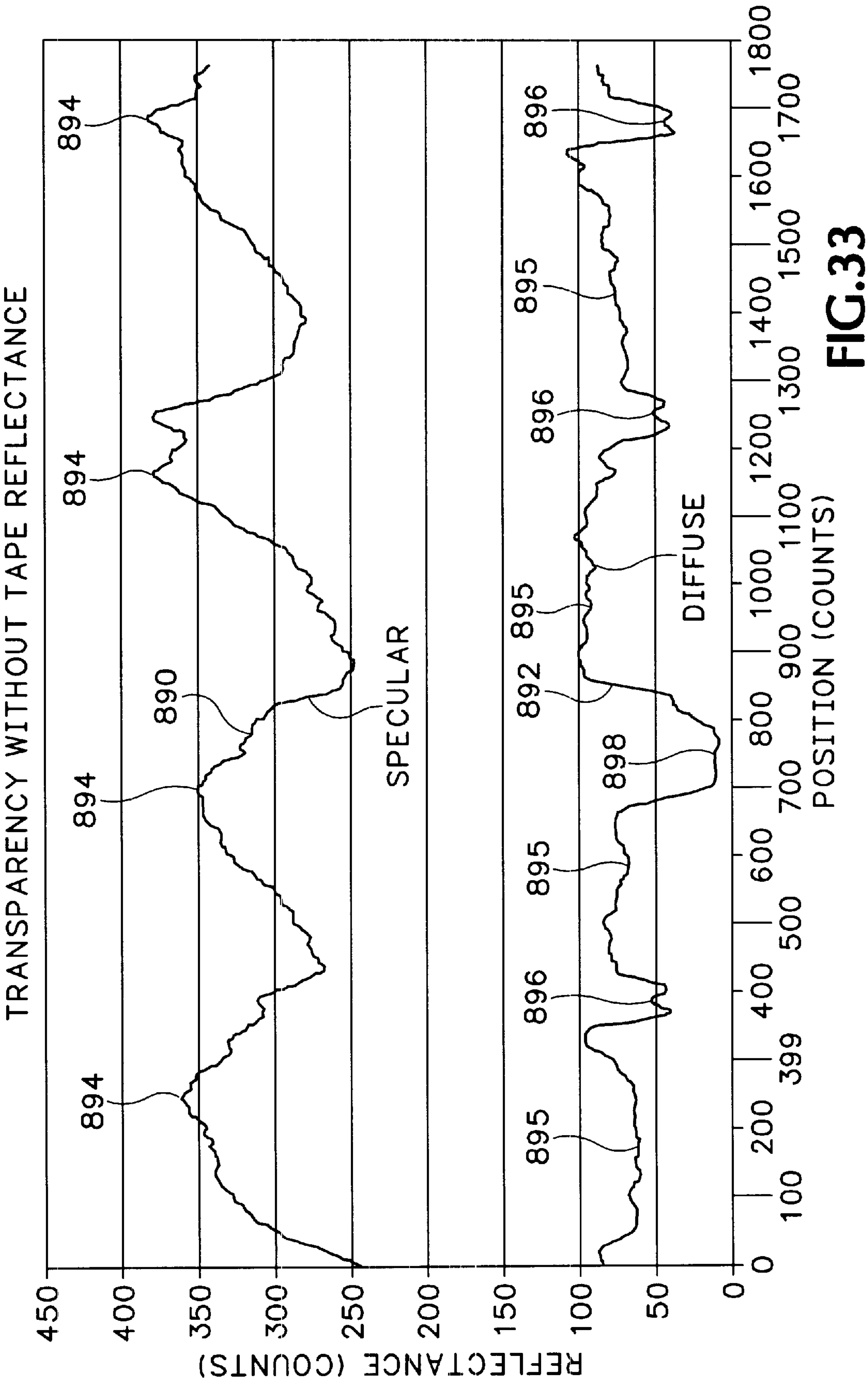

FIG. 27 shows the raw data collected during routine 502 for the very glossy photo media. Here we see the specular data curve 870. FIG. 27 also shows a diffuse curve 872. FIG. 28 shows the raw data for a glossy photo media, and in particular Gossimer, with a specular data being shown by curve 874, and the diffuse data being shown by curve 876. FIG. 29 shows the raw data for a matte photo media, with the specular data being shown as curve 878, and the diffuse data shown as curve 880. FIG. 30 shows the raw data for a plain paper media, specifically Gilbert® bond media, with the specular data being shown as curve 882, and the diffuse data being shown as curve 884. FIG. 31 shows the raw data for a premium media, with the specular data being shown as curve 886, and the diffuse data being shown as curve 887. FIG. 32 shows the raw data for HP transparency media, with the specular data being shown as curve 888, and the diffuse data being shown as curve 889. FIG. 33 shows the raw data for a generic transparency media, with the specular data being shown as curve 890, and the diffuse data being shown as curve 892.

As described above with respect to Table 2, the very glossy photo media has two layers of a swellable polymer applied over a plastic backing substrate layer, resembling the media 850 in FIG. 26. The specular curve 870 of the very glossy photo media (FIG. 27) has much greater swings in amplitude than the specular curve 874 for the glossy (Gossimer) photo media of FIG. 28 due to the double polymer coating layer on the very glossy media. Thus, the specular curves 870 and 874 may be used to distinguish the very glossy photo media from glossy photo media, while the diffuse 872 and 876 are roughly the same magnitude and shape, although the very glossy photo media curve 872 has a slightly greater amplitude than the glossy photo media diffuse curve 876.

In comparing the curves of FIGS. 27 and 28 with the matte photo curves of FIG. 29, it can be seen that the specular reflectance curve 878 for the photo media resides at a much lower amplitude than either of the photo media specular curves 870 and 874. Moreover, there is less variation or amplitude change within the matte photo specular curve 878, which is to be expected because the porous coating over the matte photo substrate, which is a paper substrate, has a much smoother surface than the swellable coatings applied over the glossy and very glossy photo media, as discussed above with respect to FIGS. 25 and 26. The diffuse curve 880 for the matte photo media is of similar shape to the diffuse curves 872 and 876 for the very glossy and glossy photo medias, although the amplitude of the matte photo diffuse curve 880 is closer to the amplitude of the very glossy diffuse curve 872.

FIG. 30 has curves 882 and 884 which are very different from the curves shown in FIGS. 27–29. One of the major differences in the curves of FIG. 42 versus the curves of FIGS. 27–29 is that the specular curve 882 is lower in magnitude than the diffuse curve 884, which is the opposite of the orientations shown in FIGS. 27–29 where the specular curves 870, 874 and 878 are of greater amplitude than the diffuse curves 872, 876 and 880, respectively. Indeed, use of the relative magnitudes of the specular and diffuse curves of FIGS. 27–30 has been described above with respect to Table 3. Another significant difference in the plain paper curves 882–884 is the similarity in wave form shapes of the specular and diffuse curves 882, 884. In FIGS. 27–29, there is a vast difference in the shapes of the specular curves 870, 874 and 878 versus the diffuse curves 872, 876 and 880.

FIG. 31 shows the reflectances for a premium media. While the premium specular and diffuse curves 886 and 887 most closely resemble the plain paper curves 882 and 884 of FIG. 30, they can be distinguished from one another, and indeed they are in the match signature step 740 of FIG. 23. A close examination of the specular curves 882 and 886 shows that the premium specular curve 886 is much smoother than the plain paper specular curve 882. This smoother curve 886 is to be expected due to the smoother IRL surface coating on the premium media versus the rougher non-coated plain paper.

At this point it should be noted that the relative magnitudes of the specular and diffuse curves may be adjusted to desired ranges by modifying the media sensor 100. For instance, by changing the size of the field stop windows 526 and 528, more or less light will reach the photodiode sensors 130' and 130, so the magnitude of the resulting reflectance curves will shift up or down on the reflectance graphs 39–45. This magnitude shift may also be accomplished through other means, such as by adjusting the gain of the amplifier circuitry. Indeed, the magnitude of the curves may be adjusted to the point where the specular and diffuse curves actually switch places on the graphs. For instance in FIG. 31, by downsizing the specular field stop window 526, the magnitude of the specular curve 886 may be dropped from the illustrated 475-count range to a position closer to the 225-count range. Such a change in the field stop size or the amplifier gain would of course also affect the other reflectance curves in FIGS. 27–30 and 32–33.

FIGS. 32 and 33 show the reflectances of an HP transparency media with a tape header 456, and a transparency media without a tape header, respectively. FIG. 32 shows a specular curve 888 and a diffuse curve 889. FIG. 33 shows a specular curve 890, and a diffuse curve 892. In both FIGS. 32 and 33, the specular curves 888 and 890 lie above the diffuse curves 889 and 892. However, the magnitude of the signals received by the transparency with reflective tape in FIG. 32 are much greater than the magnitudes of the transparency without the reflective tape in FIG. 33, which is to be expected due to the transmissive loss through the transparency without tape, leaving less light to be received by sensors 130 and 130' when viewing a plain transparency.

Besides the relative magnitudes between the graphs of FIGS. 32 and 33 there is a vast difference in the diffuse waveform 889 and 892, although the specular waveforms have roughly the same shape, with the location of ribs 810, 812 being shown at wave crest 894 in FIGS. 32 and 33. Regarding the diffuse waveforms 889 and 892, the HP transparency media with the tape header has a relatively level curve 889 because the undersurface of the tape is reflecting the incoming beams back up toward the diffuse sensor 130. The diffuse waveform of FIG. 33 is more interesting due to the transmissive loss experienced by the incoming beam, such as beam 800 in FIG. 24, losing energy in the form of the transmissive beam 825 leaving less energy available to reflect off the media surface upwardly into the diffuse sensor 130. Indeed, the locations of the valleys 816 between ribs 810 and 812 are shown at point 895 in FIG. 33, and the ribs are shown at point 896.

Another interesting feature of the media support structure of printer 20 is the inclusion of one or more kicker or pusher members in the paper handling system 24. These kickers are used to push an exiting sheet of media onto the media drying wings 28. To allow these kicker members to engage the media and push an exiting sheet out of the printzone, the platen 814 is constructed with a kicker slot or gap, such as slot 897 shown in FIG. 24. As the optical sensor 100 transitions over the slot 897, the transmissive loss caused by beam 825 increases, leaving even less light available to be received by the diffuse sensor 130, resulting in a very large valley or canyon appearing in the diffuse waveform 892 at location 898 in FIG. 33.

Thus, from a comparison of the graphs of FIGS. 27–33, a variety of distinctions may be easily made to separate the various major categories of media by merely analyzing the raw data collected by sensor 100.

13. Spatial Frequency Analysis

Figure 34:
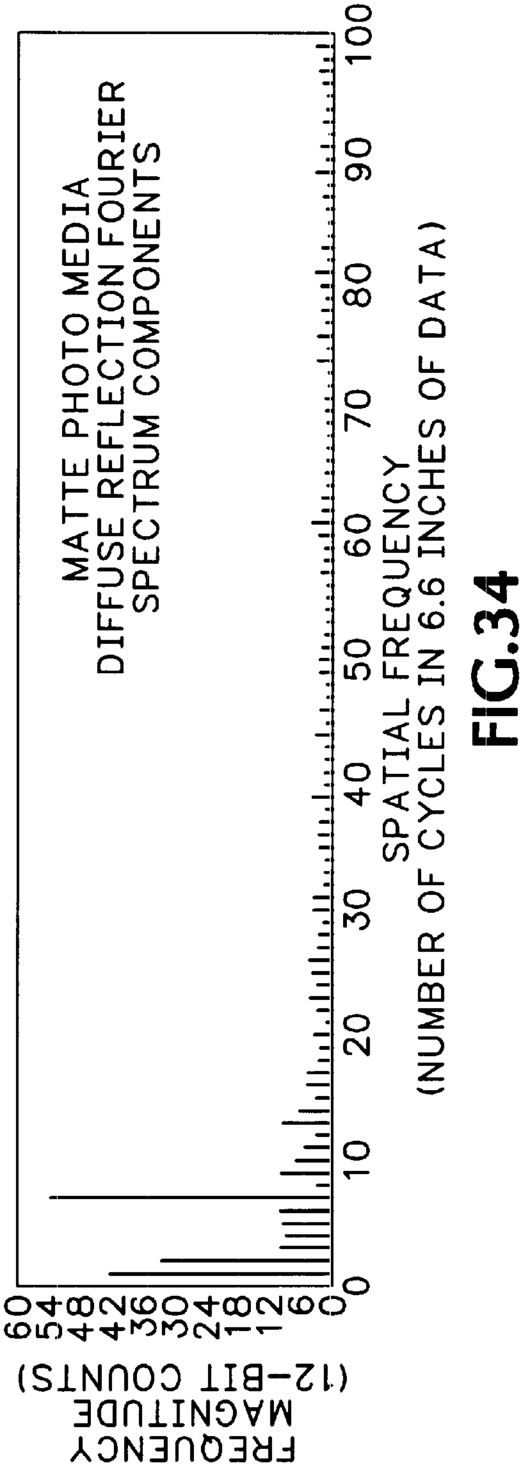
Figure 35:
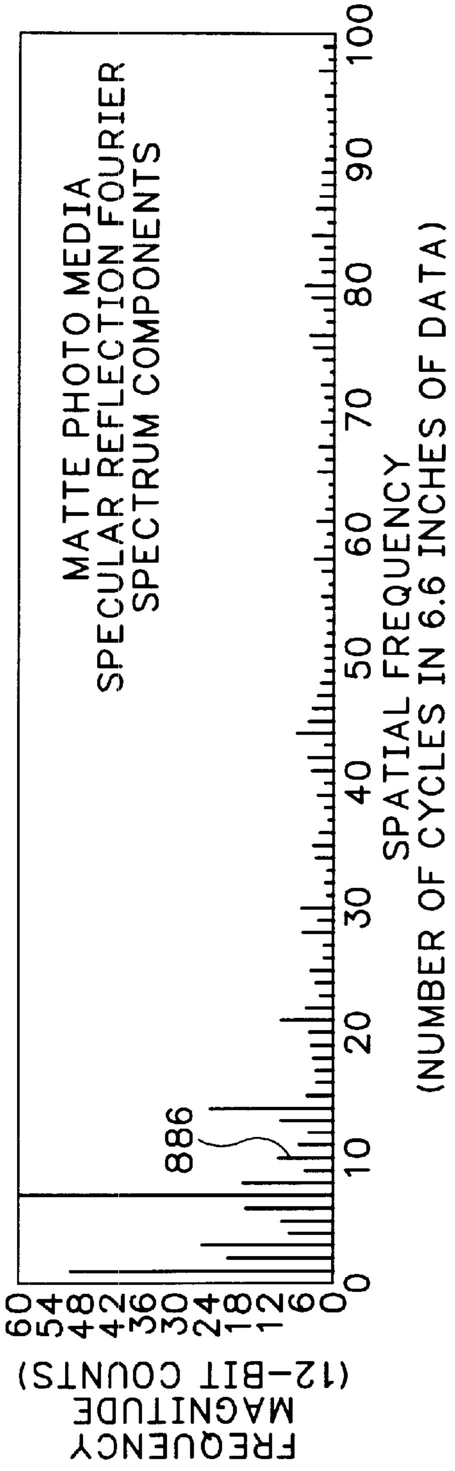
Figure 36:
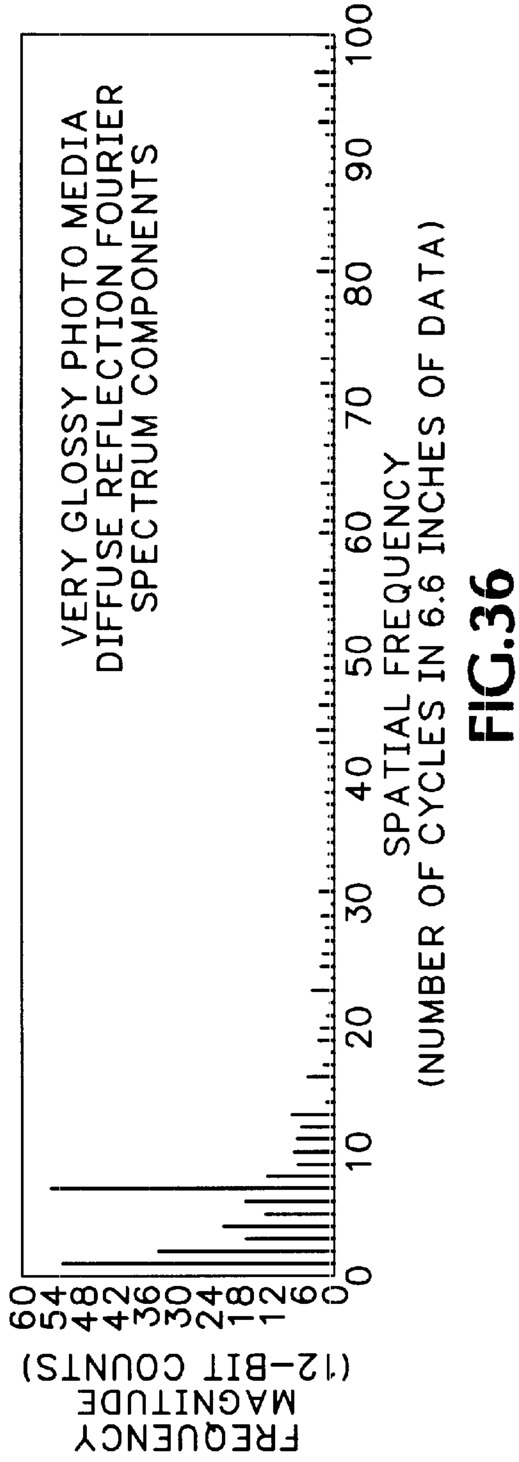
Figure 37:
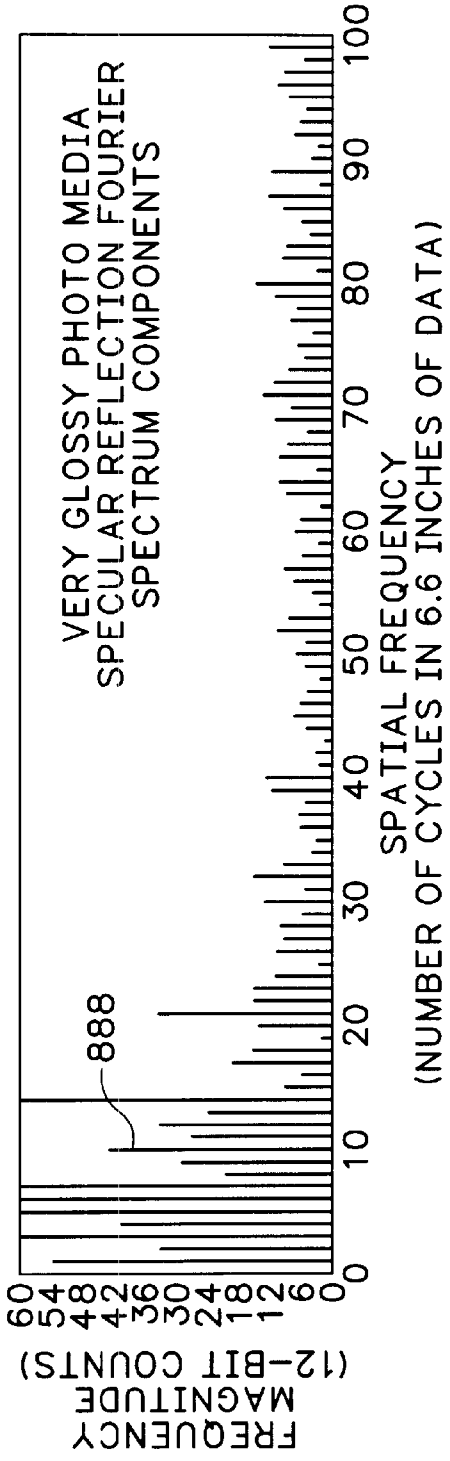
Figure 38:
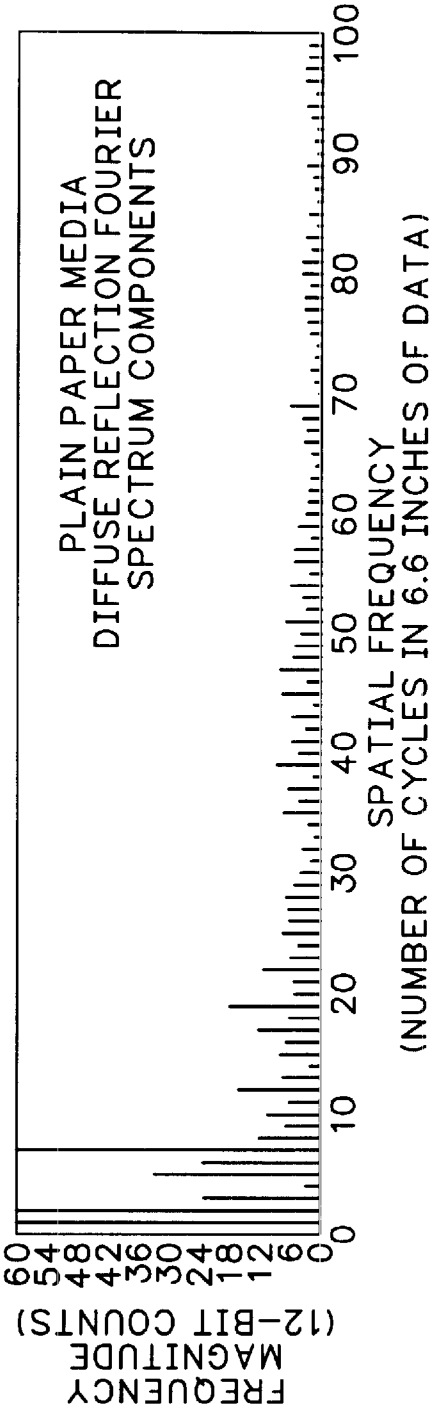
Figure 39:
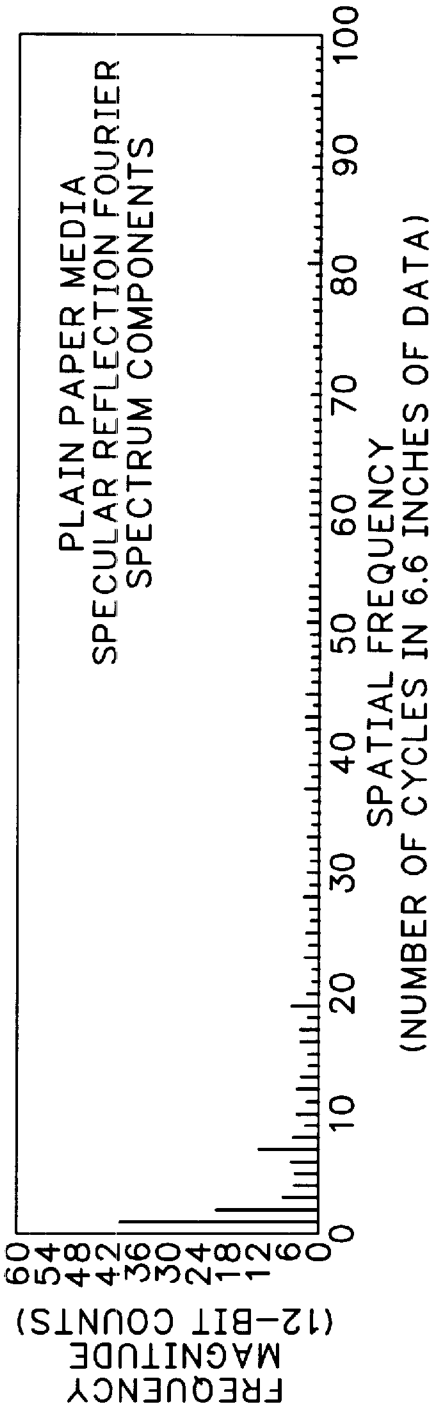

To find out more information about the media, the massage data routine 504 uses the raw data of FIGS. 27–33 in steps 552 and 554 to generate the Fourier spectrum components, such as those illustrated in FIGS. 34–39. In steps 546 and 548, the massage data routine 504 generated the curves shown in FIGS. 27–33. FIGS. 34 and 35 show the Fourier spectrum components for the diffuse reflection and the specular reflection, respectively, of a premium media, here the matte photo media. FIGS. 36 and 37 show the Fourier spectrum components for the diffuse reflection and the specular reflection, respectively, of a premium media, here the very glossy photo media. FIGS. 38 and 39 show the Fourier spectrum components for the diffuse reflection and the specular reflection, respectively, of a premium media, here the plain paper media, specifically, Gilbert® bond.

In comparing the graphs of FIGS. 34–39, remember to compare the values for the diffuse reflection with the other diffuse reflection curves (FIGS. 34, 36 and 38) and to compare the specular reflection curves with other specular reflection curves (FIGS. 35, 37 and 39). For instance, to distinguish between the matte photo media and the very glossy photo media, the frequency of 10 cycles per inch for the specular curves of FIGS. 35 and 37 may be compared. In FIG. 35, the matte photo has a frequency magnitude of around 10 counts as shown at item number 888 in FIG. 35. In comparison, in FIG. 37 for the very glossy photo media, the frequency magnitude at a spatial frequency of 10 cycles per inch is nearly a magnitude of 42 counts, as indicated by item number 889 in FIG. 37.

Figure 40:
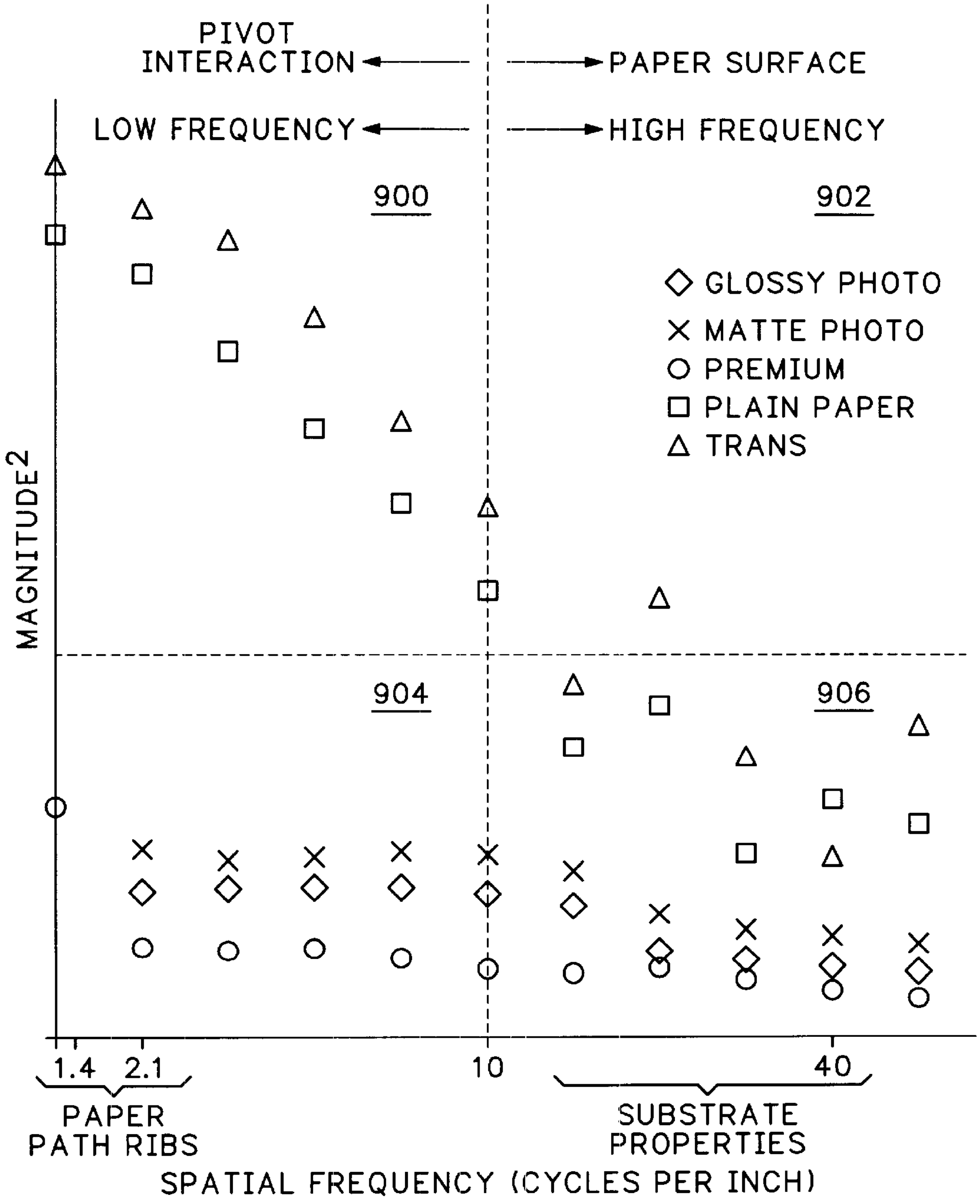
FIG. 40 is a graph of the diffuse spatial frequencies of several generic media, including plain paper media, premium paper media, matte photo media, glossy photo media, and transparency media.
Figure 41:
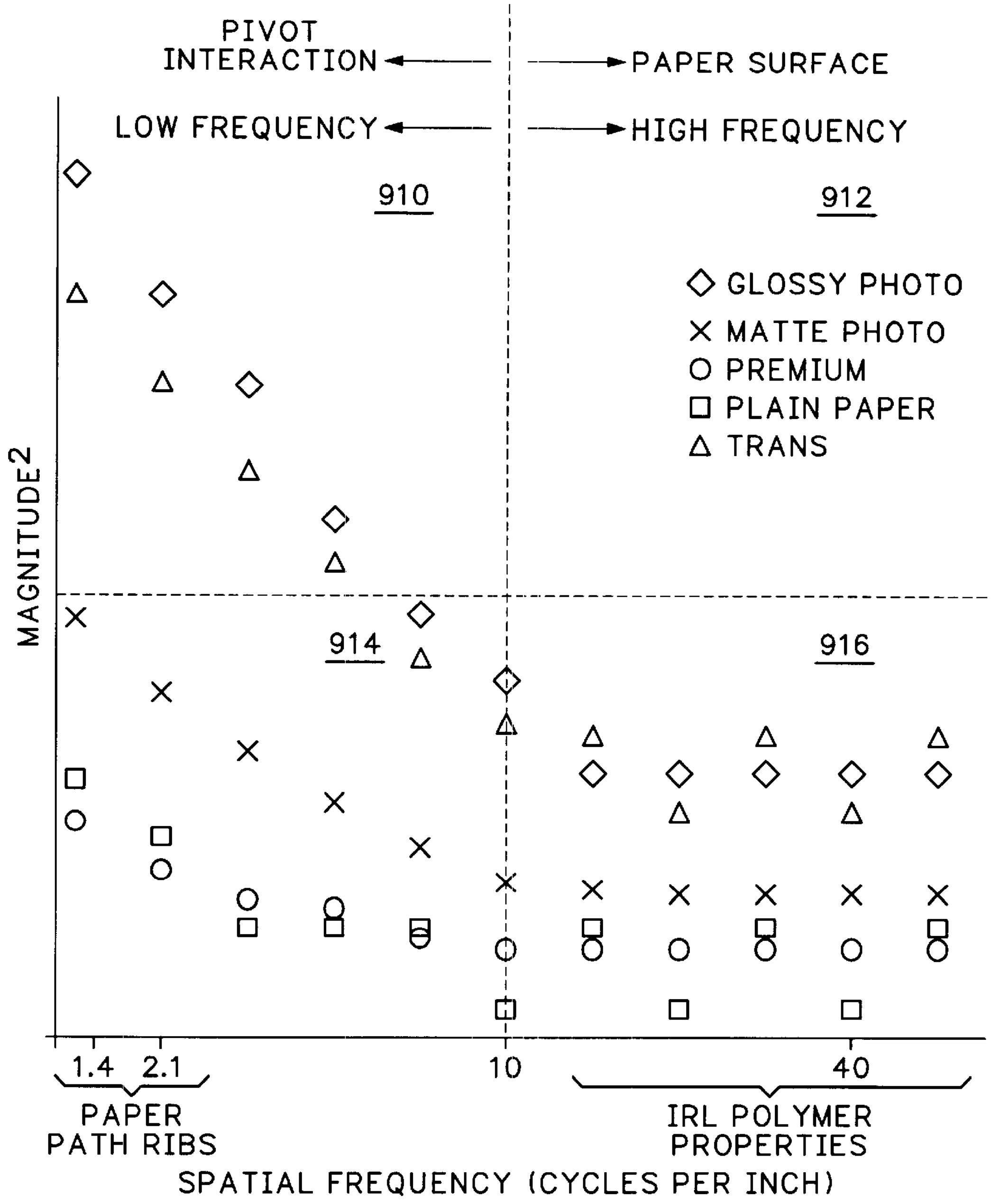
FIG. 41 is a graph of the specular spatial frequencies of several generic media, including plain paper media, premium paper media, matte photo media, glossy photo media, and transparency media.

A better representation of the Fourier spectrum components for five basic media types is shown by the graphs of FIGS. 40 and 41. In the graphs of FIGS. 40 and 41, the various data points shown correspond to selected frequency magnitude peaks taken from generic bar graphs like those shown in FIGS. 34–39 for the Fourier spectrum components. Thus, the points shown in the graphs of FIGS. 40 and 41 represent maximum frequency magnitudes corresponding to selected spatial frequencies up to 40 cycles per inch, which comprises the useful data employed by the advanced determination system 500. In FIGS. 40 and 41, selected spectrum components are shown for five generic types of media: plain paper media, premium media, matte photo media, glossy photo media, transparency media, each of the graphs in FIGS. 40 and 41 has a left half corresponding to low spatial frequency values, toward the left, and high frequency spatial values toward the right, with the border between the low frequency and high frequency portions of each graph occurring around 10 or 20 cycles per inch Now that the roadmap of the media determination method 500 has been laid out with respect to FIGS. 15–23, as well as the intricacies of the manner in which information is extracted from the media with respect to FIGS. 24–39, the interrelation between the roadmap and these intricacies will be described. Indeed, to draw on the roadmap analogy, the various branches in the major category determinations and specific type determinations of FIGS. 20–23 may be considered as branches or forks in the road, with the various schemes used to make these determinations considered to be points of interest along our journey.

Table 4 below lists some of our various points of interest and destinations where our journey may end, that is ending by selecting a specific type of media.

TABLE 4

Media Determinations

| # | Medias Compared | FIG. No. - Step No. | Result |
|---|---|---|---|
| 1 | Transparency (Tape or Not) | 8-426, 430 | No Tape Transp. |
| 2 | Photo vs. Transparency | 20-626, 636 | Tape Transparency |
| 3 | Glossy Photo vs. Matte Photo | 21-668 | Glossy Photo |
| 4 | Plain vs. Premium vs. Matte | 22-706 | Matte Photo |
| 5 | Plain vs. Premium | 23-746, 772 | Premium Paper |
| 6 | Plain vs. Premium | 23-746, 748 | Plain Paper |
| 7 | Matte Swellable vs. Matte Porous | 22-715 | Swellable IRL Matte |
| 8 | Matte Swellable vs. Matte Porous | 22-715 | Porous IRL Matte |
| 9 | Very Glossy vs. Glossy Photo | 21-674 | Very Glossy Photo |
| 10 | Very Glossy vs. Glossy Photo | 21-674 | Glossy Photo |

Figure 42:
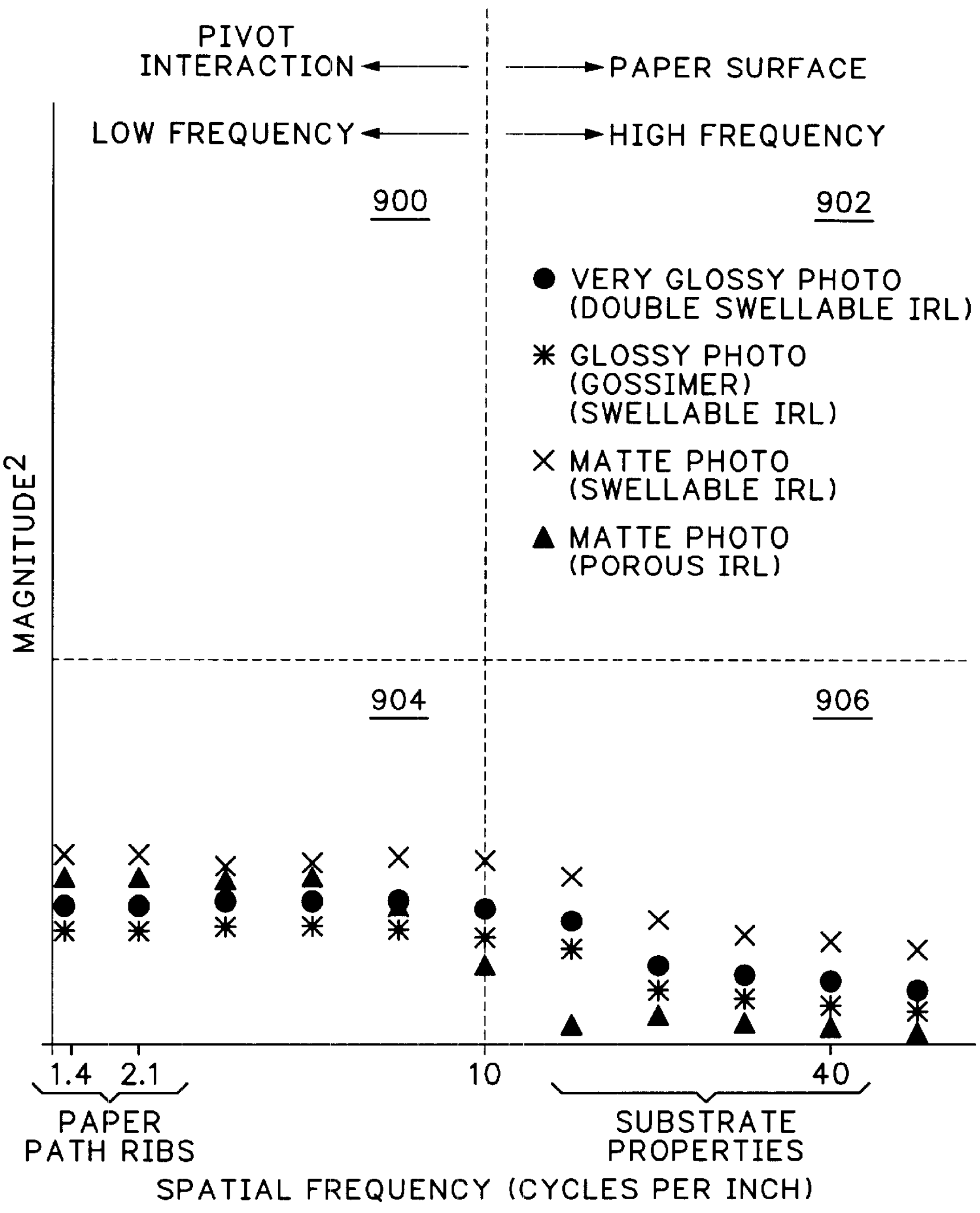
FIG. 42 is a graph of the diffuse spatial frequencies of several specific photo media, including photo media with swellable and porous ink retention layers.

The graphs of FIGS. 40–43 have been broken down into four quadrants, with the generic diffuse spatial frequency graphs of FIGS. 40 and 42 having: (1) a first quadrant 900 which has a low frequency and high magnitude, (2) a second quadrant 902 which has a high frequency and high magnitude, (3) a third quadrant 904 which has a low frequency and low magnitude, and a fourth quadrant 906 which has a high frequency and low magnitude. The generic specular spatial frequency graphs of FIGS. 41 and 43 have four quadrants: (1) a first quadrant 910 which has a low frequency and a low magnitude, (2) a second quadrant 912 which has a high frequency and high magnitude, (3) a third quadrant 914 which has a low frequency and high magnitude, and a fourth quadrant 916 which has a high frequency and low magnitude.

By comparing the data for the various types of media shown in the graphs of FIGS. 40–43, the determinations made in operations #3–10 of Table 4 may be determined. Other more basic data as described earlier may be used to determine whether an incoming sheet of media is a transparency (Δ), with or without a tape header as described earlier, according to operations #1 and #2 of Table 4. Table 5 below shows which quadrant of which graph is used to determine the media types of operations #3–10 of Table 4.

TABLE 5

Media Categorization Steps by Region of Spatial Frequency Graphs (FIGS. 40–43)

| Graph | Low Frequency | High Frequency |
|---|---|---|
| Diffuse | High Magnitude (Region #900) 5 | High Magnitude (Region #902) — |
| Diffuse | Low Magnitude (Region #904) 6 (maybe 3) | Low Magnitude (Region #906) 7 and 8 |
| Specular | High Magnitude (Region #910) 3, 9 and 10 | High Magnitude (Region #912) — |
| Specular | Low Magnitude (Region #914) 4 | Low Magnitude (Region #916) — |

In the third operation (#3) of Table 4, the distinction between glossy photo media and matte photo media may be made by examining the data in quadrant 904 of FIG. 40, or in quadrants 910 and 914 of FIG. 41. In FIG. 40, the magnitude of the matte photo spatial frequencies (X) are greater than the magnitude of the glossy photo spatial frequencies (◇). Perhaps even better than FIG. 40, the difference is shown in FIG. 41 for the specular spatial frequencies, where we find the matte photo spatial frequencies (X) falling within quadrant 914, and the glossy photo (◇) spatial frequencies falling in quadrant 910. Thus, while the information supplied by the diffuse sensor 130 may be used to make a determination between glossy and matte photos, as shown in FIG. 41, a much clearer distinction is made using the data collected by the specular sensor 130', as shown with respect to FIG. 41.

In operation #4 of Table 4, the method distinguishes between plain paper versus premium paper versus matte photo. This distinction may be accomplished again using the data in quadrant 914 of FIG. 41. In quadrant 914, we see the matte photo (X) spatial frequencies are far greater in magnitude than the plain paper (□) spatial frequencies, and the premium paper (○) spatial frequencies. Thus, the selection of matte media in operation #4 is quite simple.

In operations #5 and #6 of Table 4, the characteristics of plain paper and premium paper are compared. Referring to the diffuse spatial frequency graph of FIG. 40, the premium paper (○) spatial frequencies appear in quadrant 904, whereas the plain paper (□) spatial frequencies appear in quadrant 900.

Following operation #6 of Table 4, a sheet of media entering printzone 25 has been classified according to its major category type: transparency (with or without a header tape), glossy photo media, matte photo media, premium paper, or plain paper. Note that in the original Table 2 above, matte photo was discussed as a sub-category of premium medias, but to the various characteristics of matte photo media more readily lend themselves to a separate analysis when working through the major category and specific type determination routines 506 and 508, as illustrated in detail with respect to FIGS. 20–23.

Following determination of these major categories, to provide even better results in terms of the image ultimately printed on a sheet of media, it would be desirable to make at least two specific type determinations. While other distinctions may be made between specific types of media, such as between specific types of plain paper (FIG. 23, table 754) in practice so far, no particular advantage has been found which would encourage different printing routines for the different types of plain paper media because basically, of the plain paper medias studied thus far, they all provide comparable results when printed upon according to a plain paper default print mode ("0,0"), as shown in step 770 of FIG. 23. However, if in the future it becomes desirable to tailor print routines for different types of plain paper, the method 500 has been designed to allow for this option, by including steps 760 and 764 to allow for tailored plain paper print modes (FIG. 23). Two of the major categories, specifically matte photo and glossy photo lend themselves better to specific type media determinations, allowing for different print modes.

Figure 43:
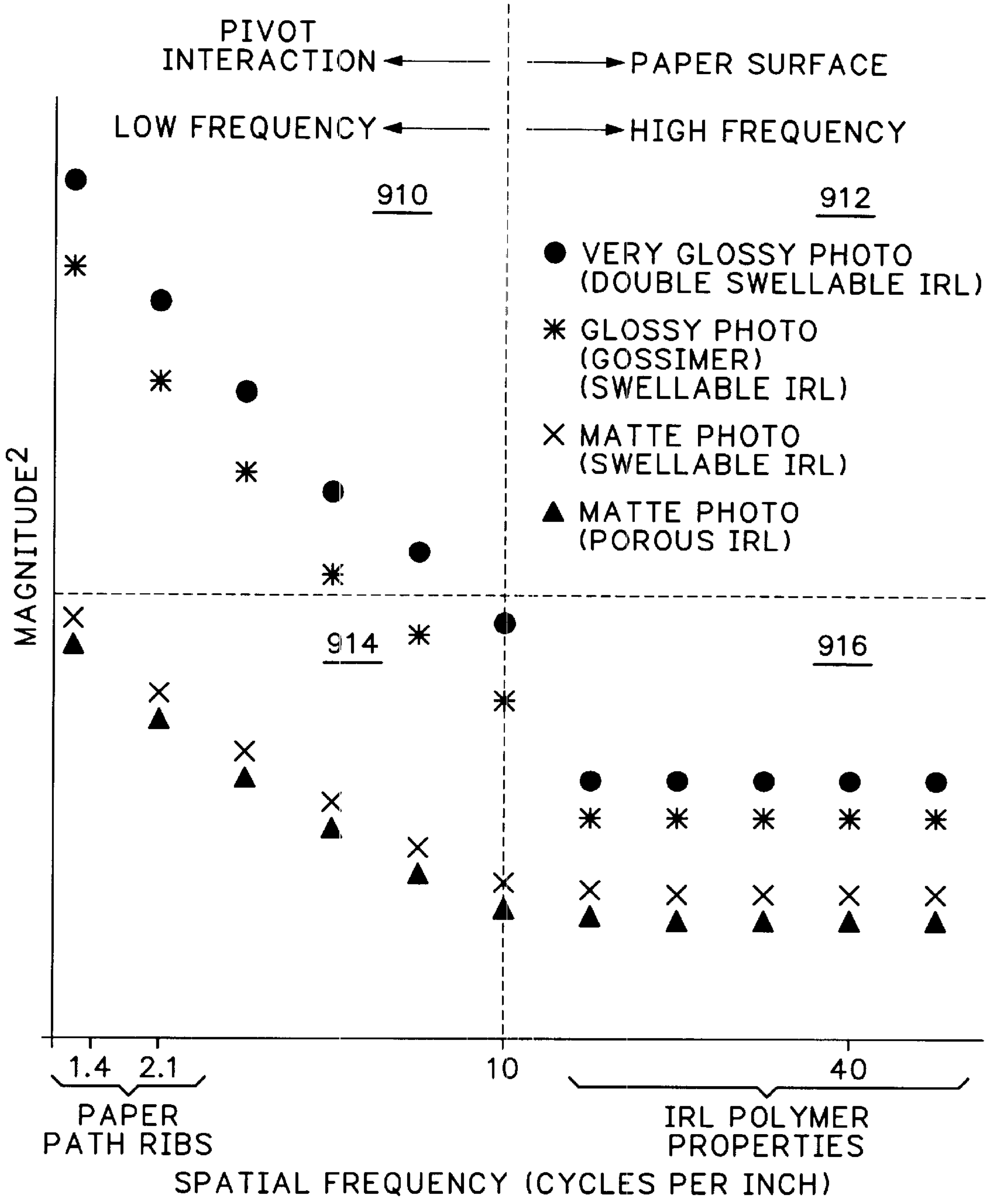
FIG. 43 is a graph of the specular spatial frequencies of several specific photo media, including photo media with swellable and porous ink retention layers.

The specific type determinations will be made according to the data shown in FIGS. 42 and 43. Thus, operations #7 and #8 of Table 4 are used to distinguish matte photo medias having swellable coatings from those having porous coatings. The matte photo (X) data from FIGS. 40 and 41 has been carried over into FIGS. 42 and 43. The matte photo data depicted with the X's in FIGS. 40–43 is for a swellable coating, or ink retention layer ("IRL"). The specular frequencies for a matte photo media with a porous coating or IRL is shown in FIGS. 42 and 43 as "♦". While the specular data of FIG. 43 could be used to distinguish the matte photo swellable coatings (X) from the porous coatings (♦), the diffuse data shown in quadrant 906 lends itself to an easier distinction. In quadrant 906, we see the swellable coating matte photo (X) spatial frequencies as having a magnitude greater than the matte photo porous coated media (♦). Thus, the information in quadrant 906 best lends itself for making the determination of operations #7 and #8 in Table 4.

The other desired specific type media distinction is between glossy photo media (Gossimer) and very glossy photo media (double polymer IRL coatings). While the diffuse data of FIG. 42 could be used to determine the distinction between the very glossy media (●) and the glossy Gossimer media (*), an easier distinction is made with respect to the specular data shown in FIG. 43. As shown in quadrant 910, the very glossy (●) specular frequencies have a greater magnitude than the glossy Gossimer (*) spatial frequencies. Thus, the data shown in quadrant 910 allows for the distinctions made in the ninth and tenth operations #9 and #10 of Table 4.

14. Early Transparency Detection System

While the advanced media determination system 500 described above with respect to FIGS. 15–23 works well in general, a refinement concerning transparency detection speeds may be implemented by performing a quick initial scan of the media to determine whether it may be a transparency, either with or without a tape header 456. In using the advanced media determination system 500 as described thus far, in practice it was found that occasionally non-transparency media was misidentified as a transparency. In these cases, because transparency print modes typically print with one of the heavier applications of ink than other print modes, the non-transparency media was over saturated, degrading the quality of the resulting hardcopy print. For instance, some media, especially various types of photo media, were often misidentified as transparencies having a tape header 456.

Figure 44:
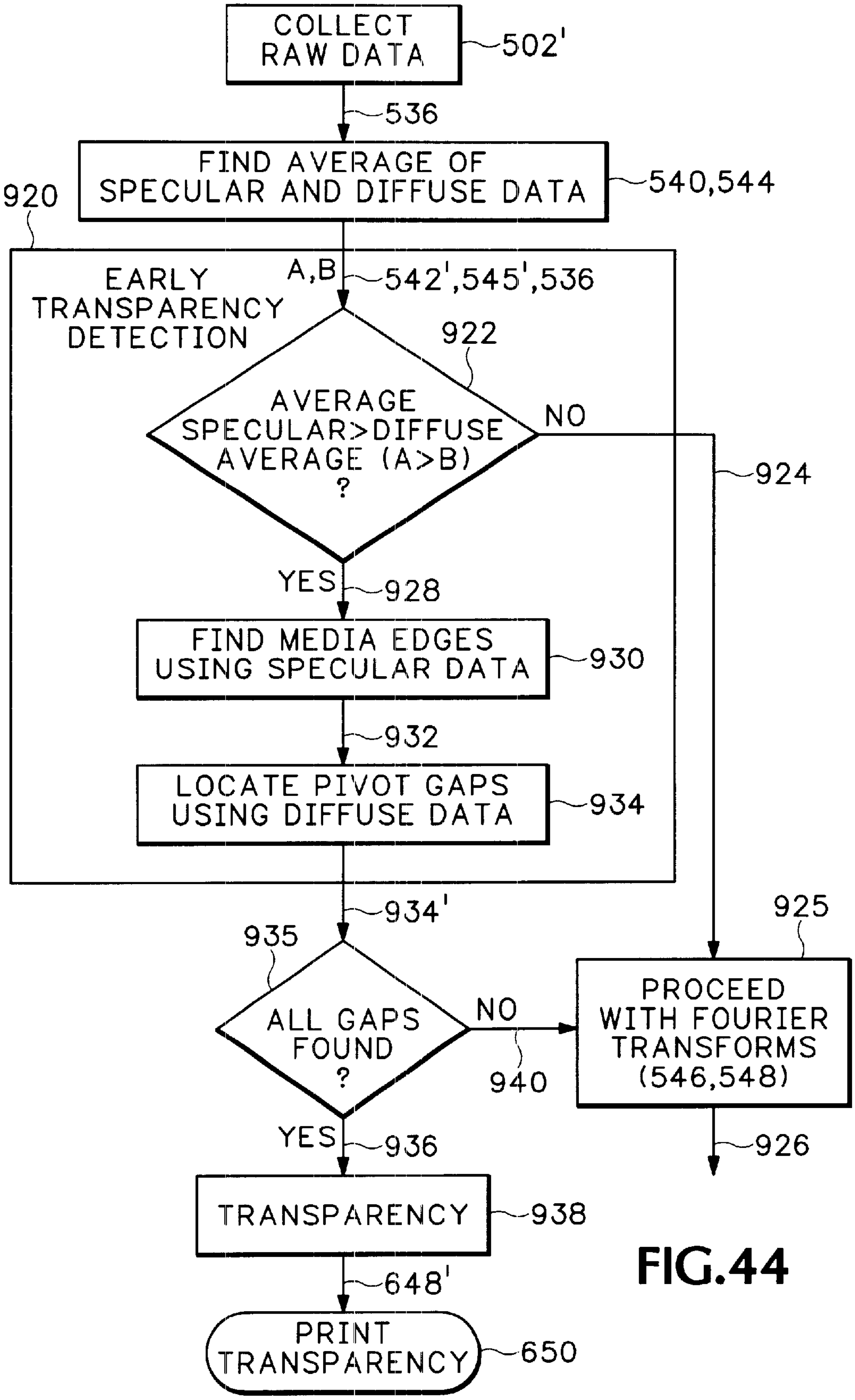
FIG. 44 is a flowchart of one form of an early transparency detection system of the present invention, which may be used in conjunction with the optical sensing system of FIG. 1 and the advanced media determination system of FIG. 15.

FIG. 44 illustrates one form of an early transparency detection system 920, constructed in accordance with the present invention. Here, a collect raw data step 502' is conducted as described above with respect to step 502 shown in FIG. 16, except the media is advanced under the optical sensor 100 until any tape header 546 clears and moves beyond the LED 105 and sensors 130, 130'. Otherwise, the raw data is collected as described above, and the raw data signal 536 is sent to the "find specular and diffuse average" steps 540 and 544 as described above with respect to FIG. 17. The specular average signal "A" 542 is generated as described above, but for purposes which will become apparent later, it is preferable to label this signal as 542' to better distinguish signal flows. Similarly, step 544 generates a diffuse average signal 545' which contains the same information as signal 545 described above with respect to FIG. 17. Both of the specular and diffuse average signals 542' and 545' are received by the early transparency detection routine 920, and in particular, by a comparing step 922. In the comparing step 922, the specular average "A" is compared with the magnitude of the diffuse average "B", to determine whether the specular average is greater than the diffuse average. If the specular average is not greater than the diffuse average, a NO signal 924 is issued to a "proceed with Fourier transforms" step 925, which upon receiving this signal issues a proceed signal 926.

If the comparator step 922 finds the specular average to be greater than the diffuse average (A>B), then a YES signal 928 is issued to a "find media edges" step 930. As mentioned above, one unique property of transparent media is that the specular scan data detects the media 170, while the diffuse scan data looks through the media to see the pivot or platen 814 below which is supporting the media, as shown in FIG. 24. Thus, the find the media edges step 930 uses the specular scan data to look for the characteristic low-to-high edge transition to find both the left and right edges of the media. Once the media width is known by locating the edges in step 930, an edge location signal 932 is sent to a "locate pivot gaps" step 934. As mentioned above, the media support surface opposite the optical detector 100 may be constructed in a variety of different fashions, having different types of known surface irregularities which may be monitored by the sensor 100. For the illustrated inkjet printer 20, the media pusher gaps 897 (FIG. 24) are used as an example which creates variations in the diffuse data, such as shown by graph 892 in FIG. 33, where the gap 897 (FIG. 24) creates data shown as a wide valley 898 in curve 892. Thus, in a more broadly stated fashion, step 934 may be known as "locate a surface irregularity in a media support surface" step. Indeed, the surface irregularity may not be a particular slot or ridge, but in some implementations it might be a reflective surface or a surface having other distinguishable reflective properties, such as a smooth surface versus a rough surface. Details of the "locate pivot gaps" step 934 will be discussed further below, but upon locating all of the pivot gaps, a gap location signal 934' is issued.

The gap location signal 934' is received by a checking step 935 which determines whether all gaps have been detected. If step 935 determines all the gaps have been found, a YES signal 936 is issued to a transparency confirmed step 938. The transparency confirmed step 938 then issues a select transparency print mode signal 648' to the print transparency step 650 (see FIG. 20). The transparency confirmed step 938 selects a transparency print mode, for instance as described above for step 646 in FIG. 20. If the "all gaps found" checking step 935 finds that all the gaps have not been found, a NO signal 940 is issued to the proceed with Fourier transform step 925.

Figure 45:
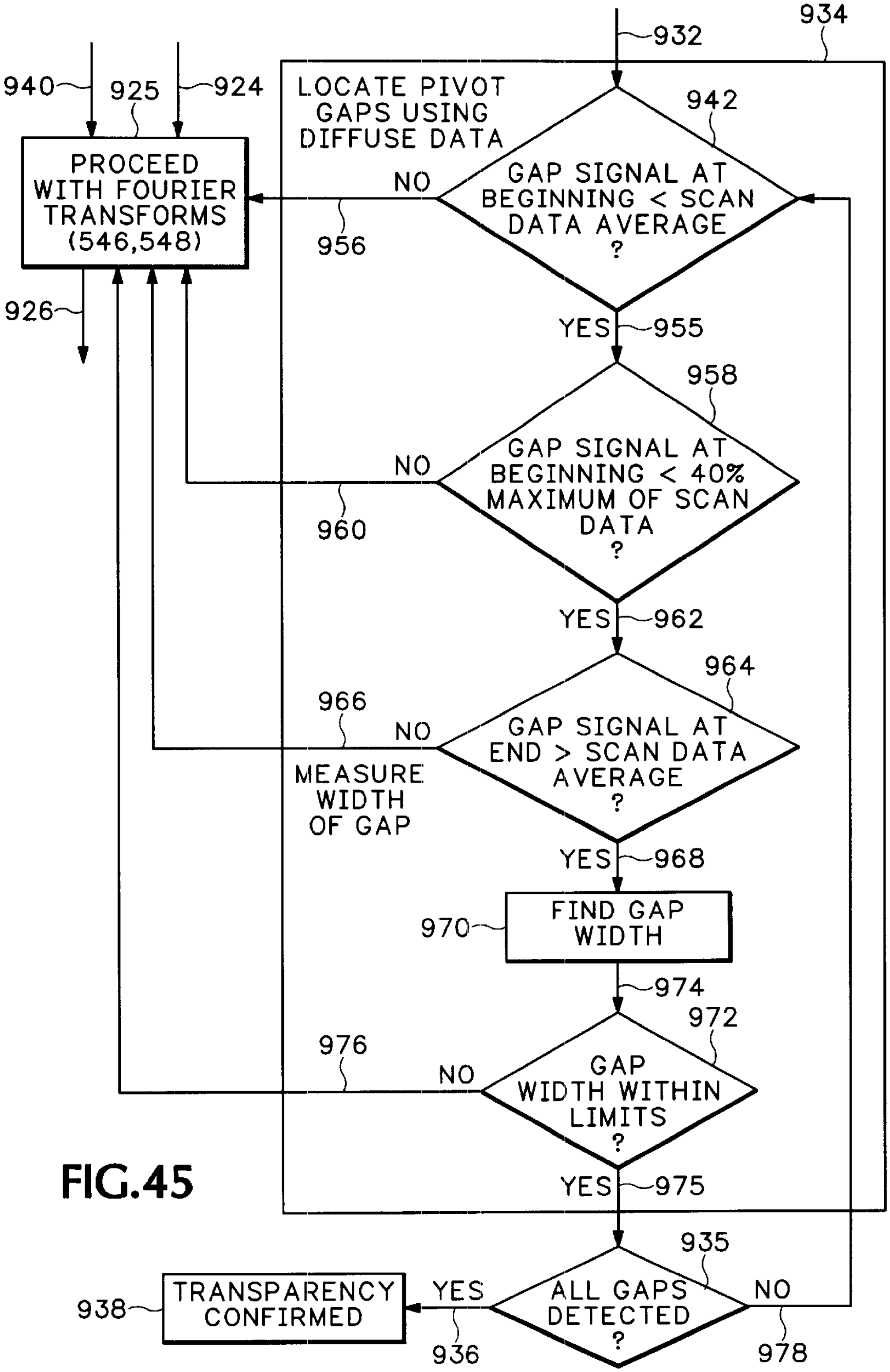
FIG. 45 is a flowchart illustrating the operation of one portion of the flowchart of FIG. 44.

FIG. 45 shows the "locate pivot gaps" step 934 in greater detail. Again as stated above, this is merely an illustrated embodiment of identifying and locating known features "seen" through the transparency by the diffuse data, such as various surface irregularities which are identifiable features under the path of the optical sensor 100, here illustrated as the pivot gaps which are useful for facilitating other printing mechanism operations like print media handling features.

FIG. 45 shows the edge location signal 932 being received by a comparison step 942 portion of the locating step 934. The comparison step 942 compares the magnitude of the gap signal at the beginning with the scanned diffuse data average value, to determine whether the gap signal is less than this average. As mentioned above, the locating pivot gap step 934 uses the diffuse data, such as that shown for curve 944 in FIG. 46.

Figure 46:
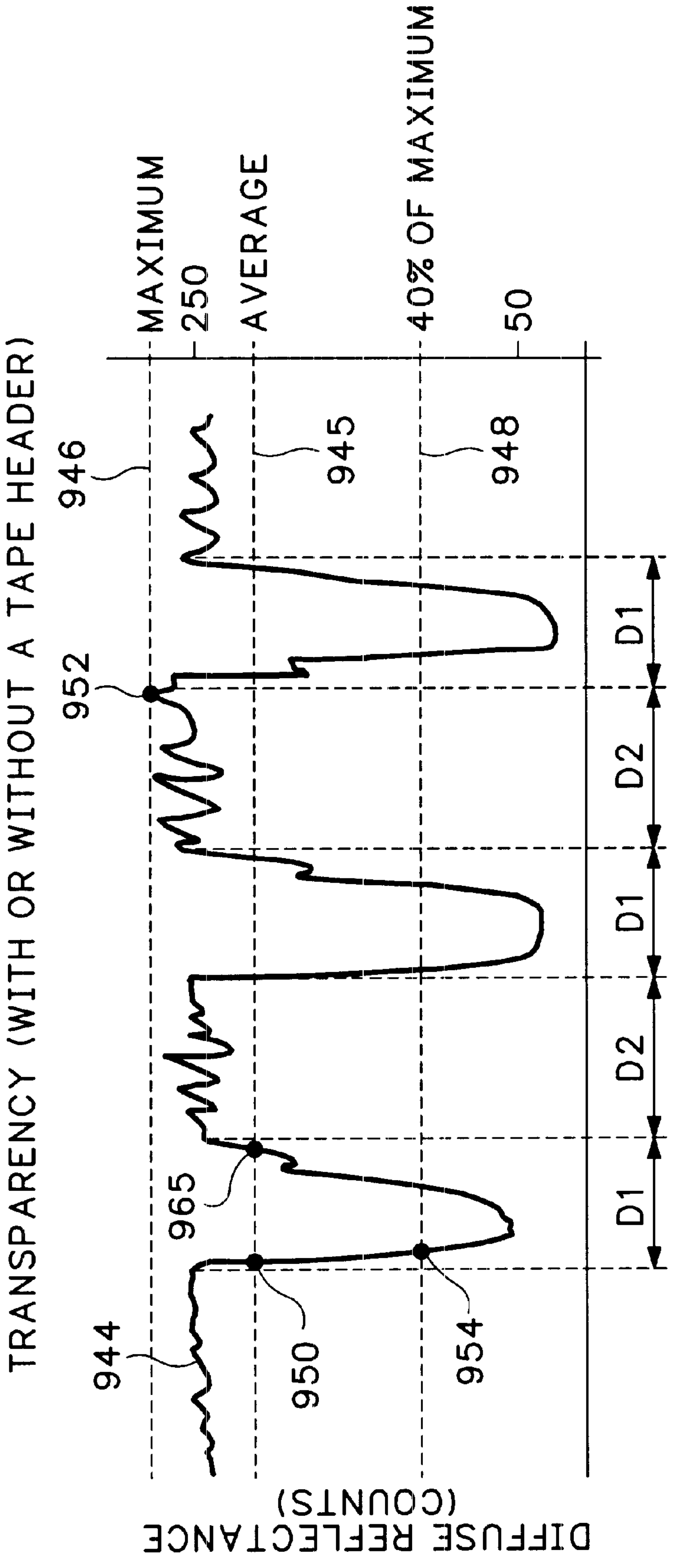
FIG. 46 is a graph of the raw data accumulated during the "collect raw data" portion of the method of FIG. 15, showing data for transparency media either with or without a tape header.

In the graph of FIG. 46, the diffuse scan data average is shown at dashed line 945, the maximum scan data is shown at dashed line 946, and 40% of the maximum value is shown at dashed line 948. Thus, at the beginning of the gap at point 950, the magnitude of curve 944 falls below the scan data average line 945. Thus, at point 950 which is the beginning of the gap signal, a YES signal 955 is issued by the comparison step 942. If the gap signal never falls below the diffuse scan data average 945, then a NO signal 956 is issued to the proceed Fourier transform step 925. The YES signal 955 is received by a second comparator step 958, which determines when the gap signal at the beginning is lower than 40% of the maximum, shown as dashed line 948 in FIG. 46. As mentioned above, this 40% value is shown for curve 944 at point 954 for the first gap. With reference to FIGS. 24 and 33, one reason for selecting the 40% value in step 958 is to distinguish the presence of valleys 816 in the media between peaks 815 formed by the anti-cockle ribs 810, 812 which in turn form peaks 895 and valleys 896 in curve 892 of FIG. 33. As shown in FIG. 33, the gap valley 898 has a much greater magnitude than the trace for the rib valleys 896, so this 40% value helps distinguish a rib-induced valley from a pusher gap or slot 897. Of course, it is apparent that other media support surfaces beyond the illustrated support surface having three pusher gaps 897 and multiple anti-cockle ribs 810, 812 may require other types of checking routines to distinguish the desired surface irregularities or transparency identification indicia on the media support from other types of media induced bending or bowing features. If the curve 944 never drops below the 40% of maximum value 948, then it is assumed that a ribbed valley 896 has been encountered, and a NO signal 960 is issued to the "proceed with Fourier transform" step 925. When point 954 is reached in the graph 944, then the comparator step 958 issues a YES signal 962 to a third comparator step 964.

The third comparator step 964 determines whether the end of the gap has been reached, such as at point 965 in FIG. 46 where curve 944 rises above the scan data average line 945. If the data never rises above point 965, then a NO signal 966 is issued to the "proceed with Fourier transforms" step 925. However, when the point 965 is reached, the comparator step 964 issues a YES signal 968 to a "find gap width" routine 970. In the find gap width step 970, in the particular example the distance D1 in FIG. 46, which corresponds to the width of the illustrated gap, must be between maximum and minimum values, here for the illustrated printer, to be at least $^{15}/_{600}$ of an inch, and not more than $^{250}/_{600}$ of an inch. This determination is made by a "gap width within limits (?)" comparator 972, which receives a gap width signal 974 from step 970. If the gap width is found to be within limits by step 972, a YES signal 975 is issued to the all gaps detected comparator step 935.

If no gap is found within the size of the illustrated width limit of $15^{250}/_{600}{}^{th}$ of an inch, then a NO signal 976 is issued by comparator 972 to "the proceed with Fourier transforms" step 925. The "all gaps detected (?)" comparator step 935 not only looks for all three gaps 897 (FIG. 24) in the illustrated embodiment, but it also determines whether the gaps are located at least $^{700}/_{600}{}^{th}$ of an inch away from one another. Thus, in FIG. 46 a distance D2 between the gaps must meet or exceed this minimum criteria. If any gaps have not been detected, or if the required distance between gaps has not been found, a NO signal 978 is issued to the first comparator step 942 of the "locate pivot gap" step 934. If all three gaps have been detected at the expected separation, then the YES signal 936 is issued to the transparency confirmed step 938, as described above with respect to FIG. 44.

Figure 47:
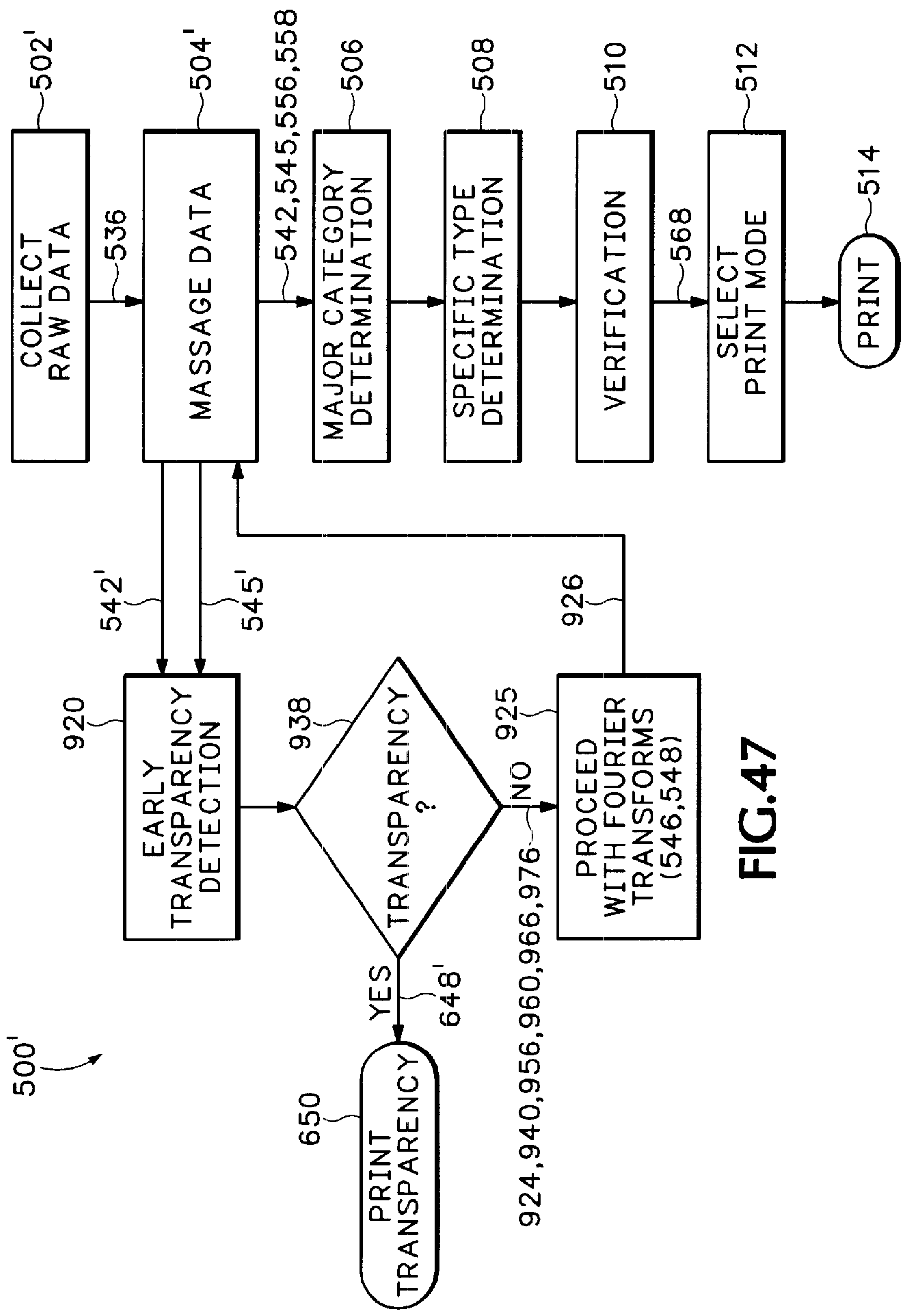
FIG. 47 is a flowchart of an alternate embodiment of an advanced media determination system using the early transparency detection system of FIG. 44.
Figure 48:
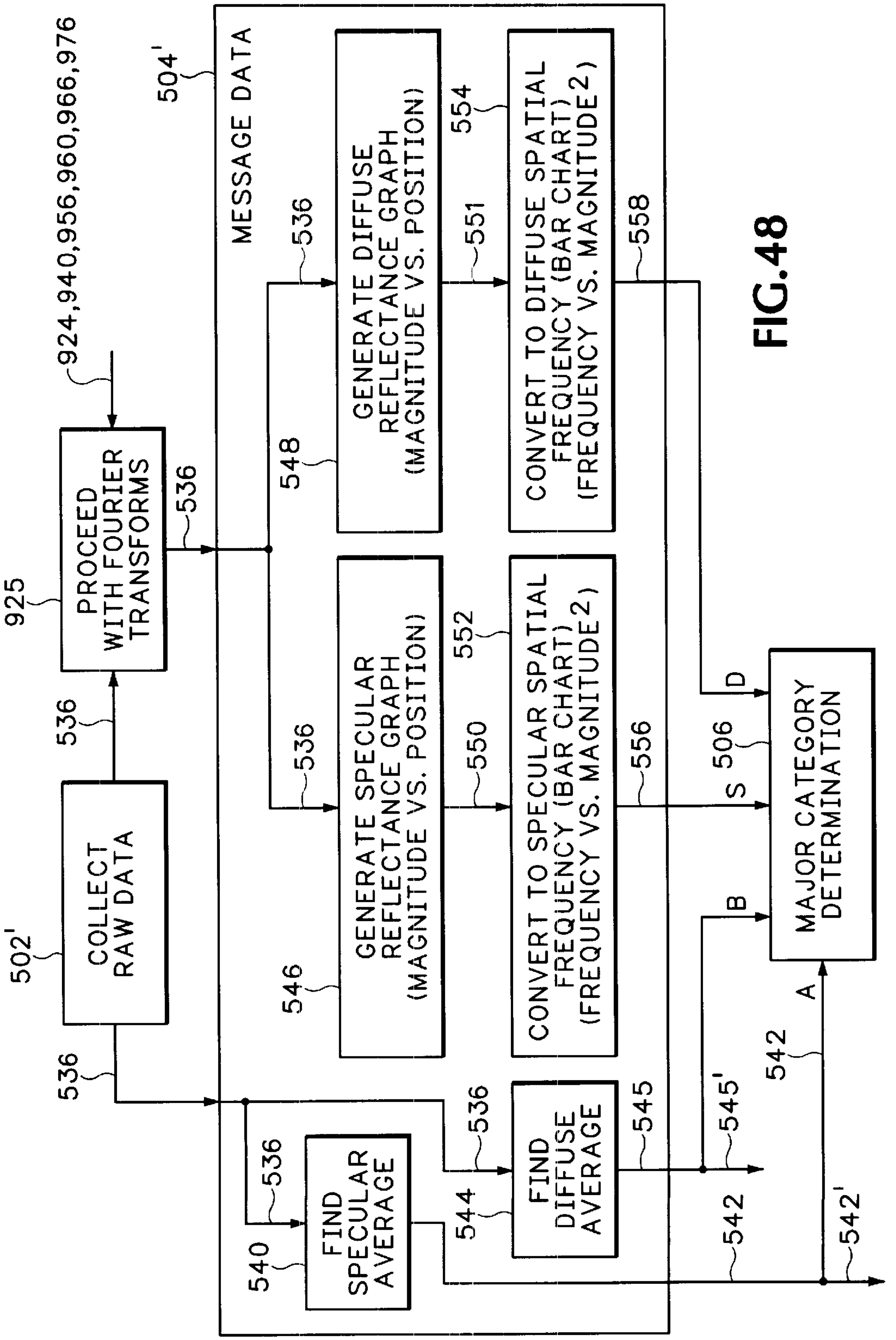
FIG. 48 is a flowchart illustrating an alternate embodiment of the massage data portion of the method of FIG. 47.

To better understand how the early transparency detection system 920 fits into the modified advanced media detection system 500', FIGS. 47 and 48 show the early detour which the early transparency detection system 920 may provide to reach the print transparency step 950 and bypass the Fourier transform steps 946, 948, 952 and 954 of the massage data routine 504'. Moreover, beyond avoiding the normal massage data routine 504, the remaining major and specific category determination steps 506 and 508 are avoided, along with the verification step 510. This early routing speeds the throughput of the printing mechanism 20, which is a printer rating measured in pages per minute, so a consumer obtains a faster transparency printout. For people in business giving presentations, quickly getting transparencies for display on an overhead projector can often be critical when last minute changes are needed before a meeting. Moreover, by using the early transparency detection routine 920, photo medias are no longer inadvertently interpreted as being transparency media, thus avoiding poor print quality from over saturating such photo media with the heavier inks used on transparencies. This feature helps all consumers printing on the usually more expensive photo medias from needlessly wasting the photo paper, or from accepting less than optimal quality prints. Finally, the illustrated embodiment of FIGS. 44–48 is shown to illustrate the principles and concepts of the invention as set forth in the claims below, and a variety of modifications and variations may be employed in various implementations while still falling within the scope of the claims below.

What is claimed is:

1. A method of classifying incoming media entering a printing mechanism, comprising the steps of:

advancing the incoming media to a selected location;

optically scanning said media at the selected location;

collecting raw specular data and raw diffuse data while scanning;

averaging said raw specular data and raw diffuse data;

determining whether the averaged specular data is greater than the averaged diffuse data;

when the averaged specular data is greater than the averaged diffuse data, identifying the media as a transparency; and locating a surface irregularity in a media support which supports the media during said optically scanning.

2. A method according to claim 1 further including locating another surface irregularity in the media support, and determining whether said surface irregularity and said another surface irregularity are spaced an expected spacing apart.

3. A method according to claim 1 wherein said surface irregularity comprises a recess defined by the media support.

4. A method according to clan/wherein said surface irregularity comprises a ridge projecting from the media support.

5. A method according to claim 1 wherein said surface irregularity comprises a reflective portion of the media support.

6. A method according to claim 1, wherein:

said surface irregularity comprises a portion having a color different from the majority of the media support.

7. A method according to claim 1 wherein said surface irregularity comprises a textured portion of the media support.

8. A method according to claim 1 further including locating plural other surface irregularities in the media support, and determining whether all expected surface irregularities have been located.

9. A method of classifying incoming media entering a printing mechanism, comprising the steps of:

advancing the incoming media to a selected location;

optically scanning said media at the selected location;

locating plural surface irregularities in a media support which supports the media during said optically scanning;

determining whether all expected surface irregularities have been located; and when all expected surface irregularities have been located, identifying the media as a transparency.

10. A method according to claim 9 further including;

gathering raw specular data and raw diffuse data during said optically scanning; and when all expected surface irregularities have not been located, performing Fourier transforms on the raw specular data and raw diffuse data and analyzing the results thereof to determine the type of incoming media.

11. A method according to claim 10 further including;

averaging said raw diffuse data;

wherein said surface irregularity comprises a recess defined by the media support; and determining whether a magnitude of raw diffuse data gathered upon encountering said surface irregularity is less than the averaged diffuse data.

12. A method according to claim further including;

maximum value of said raw diffuse data; and determining whether a magnitude of raw diffuse data gathered while scanning and said surface irregularity is less than a selected percentage of the maximum value.

13. A method according to claim 12 wherein the selected percentage of the maximum value comprises a value below 50%.

14. A method according to claim 13 further including determining whether the magnitude of raw diffuse data gather upon leaving said surface irregularity is greater than the averaged diffuse data.

15. A method according to claim 14 further including:

comparing the location where the surface irregularity was encountered with the location where the surface irregularity was left; and from said comparing, determining the size of said surface irregularity.

16. A method according to claim 15 further including determining whether the size of said surface irregularity is of an expected size.

17. A method according to claim 9 further including determining whether adjacent surface irregularities are spaced apart at an expected spacing.

18. A method according to claim 17 further including determining whether the sizes of the plural surface irregularities are of expected sizes.

* * * * *